(12) United States Patent
Reynolds et al.

(10) Patent No.: US 12,490,996 B2
(45) Date of Patent: Dec. 9, 2025

(54) MODULAR GUIDE SYSTEM FOR SURGICAL PROCEDURES

(71) Applicant: WRIGHT MEDICAL TECHNOLOGY, INC., Memphis, TN (US)

(72) Inventors: David G. Reynolds, Memphis, TN (US); Julia C. Alspaugh, Memphis, TN (US); Paul M. Stemniski, Memphis, TN (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 374 days.

(21) Appl. No.: 18/041,822

(22) PCT Filed: Oct. 28, 2021

(86) PCT No.: PCT/US2021/057014
§ 371 (c)(1),
(2) Date: Feb. 16, 2023

(87) PCT Pub. No.: WO2022/094052
PCT Pub. Date: May 5, 2022

(65) Prior Publication Data
US 2023/0310012 A1    Oct. 5, 2023

Related U.S. Application Data

(60) Provisional application No. 63/108,577, filed on Nov. 2, 2020.

(51) Int. Cl.
*A61B 17/17* (2006.01)
*A61B 17/56* (2006.01)
*A61B 34/10* (2016.01)

(52) U.S. Cl.
CPC .......... *A61B 17/1775* (2016.11); *A61B 17/56* (2013.01); *A61B 34/10* (2016.02); *A61B 2017/568* (2013.01); *A61B 2034/105* (2016.02)

(58) Field of Classification Search
CPC .................. A61B 17/1775; A61B 17/1682
See application file for complete search history.

(56) References Cited

U.S. PATENT DOCUMENTS 3,839,742 A    10/1974    Link
3,872,519 A    3/1975    Giannestras et al.
(Continued)

FOREIGN PATENT DOCUMENTS

CA    2836651    3/2016
CN    101790353    7/2010
(Continued)

OTHER PUBLICATIONS

Search report issued for European patent application No. 13198280 dated Feb. 5, 2014.
(Continued)

*Primary Examiner* — Andrew Yang
(74) *Attorney, Agent, or Firm* — DUANE MORRIS LLP

(57) ABSTRACT

A medical device has a guide locator and a guide element. The guide locator has a mount body having a conformal surface that is shaped to be complementary to a natural anatomical surface of a patient bone and defining a mount receptacle. The mount body defines a guide receptacle. The guide element includes a guide body having a shape configured to fit with to attach the guide receptacle of the guide locator and a guide slot formed in the guide body. The guide slot includes at least one opening for receiving a tool therethrough. A retention mechanism is configured to hold the guide element within the guide receptacle of the guide locator.

34 Claims, 55 Drawing Sheets

(56) References Cited

U.S. PATENT DOCUMENTS

| | | |
|---|---|---|
| 3,886,599 A | 6/1975 | Schlein |
| 3,889,300 A | 6/1975 | Smith |
| 3,896,502 A | 7/1975 | Lennox |
| 3,896,503 A | 7/1975 | Freeman et al. |
| 3,975,778 A | 8/1976 | Newton, III |
| 3,987,500 A | 10/1976 | Schlein |
| 4,021,864 A | 5/1977 | Waugh |
| 4,069,518 A | 1/1978 | Groth, Jr. et al. |
| 4,156,944 A | 6/1979 | Schreiber et al. |
| 4,166,292 A | 9/1979 | Bokros |
| 4,204,284 A | 5/1980 | Koeneman |
| 4,232,404 A | 11/1980 | Samuelson et al. |
| 4,309,778 A | 1/1982 | Buechel et al. |
| 4,470,158 A | 9/1984 | Pappas et al. |
| 4,755,185 A | 7/1988 | Tarr |
| 4,968,316 A | 11/1990 | Hergenroeder |
| 5,041,139 A | 8/1991 | Brånemark |
| 5,312,412 A | 5/1994 | Whipple |
| 5,326,365 A | 7/1994 | Alvine |
| 5,354,300 A | 10/1994 | Goble et al. |
| 5,395,188 A | 3/1995 | Bailey et al. |
| 5,423,825 A | 6/1995 | Levine |
| 5,476,466 A | 12/1995 | Barrette et al. |
| 5,601,563 A | 2/1997 | Burke et al. |
| 5,628,749 A | 5/1997 | Vendrely et al. |
| 5,634,927 A | 6/1997 | Houston et al. |
| 5,667,511 A | 9/1997 | Vendrely et al. |
| 5,674,223 A | 10/1997 | Cipolletti et al. |
| 5,735,904 A | 4/1998 | Pappas |
| 5,766,259 A | 6/1998 | Sammarco |
| 5,768,134 A | 6/1998 | Swaelens et al. |
| 5,776,200 A | 7/1998 | Johnson et al. |
| 5,817,097 A | 10/1998 | Howard et al. |
| 5,824,106 A | 10/1998 | Fournal |
| 5,879,389 A | 3/1999 | Koshino |
| 5,885,299 A | 3/1999 | Winslow et al. |
| 5,888,203 A | 3/1999 | Goldberg |
| 5,897,559 A | 4/1999 | Masini |
| 5,935,132 A | 8/1999 | Bettuchi et al. |
| 6,002,859 A | 12/1999 | DiGioia, III et al. |
| 6,033,405 A | 3/2000 | Winslow et al. |
| 6,053,922 A | 4/2000 | Krause et al. |
| 6,102,952 A | 8/2000 | Koshino |
| 6,183,519 B1 | 2/2001 | Bonnin et al. |
| 6,245,109 B1 | 6/2001 | Mendes et al. |
| 6,342,056 B1 | 1/2002 | Mac-Thiong et al. |
| 6,344,043 B1 | 2/2002 | Pappas |
| 6,409,767 B1 | 6/2002 | Perićet al. |
| 6,436,146 B1 | 8/2002 | Hassler et al. |
| 6,478,800 B1 | 11/2002 | Fraser et al. |
| 6,520,964 B2 | 2/2003 | Tallarida et al. |
| 6,530,930 B1 | 3/2003 | Marino et al. |
| 6,602,259 B1 | 8/2003 | Masini |
| 6,610,067 B2 | 8/2003 | Tallarida et al. |
| 6,610,095 B1 | 8/2003 | Pope et al. |
| 6,620,168 B1 | 9/2003 | Lombardo et al. |
| 6,645,215 B1 | 11/2003 | McGovern et al. |
| 6,663,669 B1 | 12/2003 | Reiley |
| 6,673,116 B2 | 1/2004 | Reiley |
| 6,679,917 B2 | 1/2004 | Ek |
| 6,719,799 B1 | 4/2004 | Kropf |
| 6,824,567 B2 | 11/2004 | Tornier et al. |
| 6,852,130 B2 | 2/2005 | Keller et al. |
| 6,860,902 B2 | 3/2005 | Reiley |
| 6,863,691 B2 | 3/2005 | Short et al. |
| 6,875,222 B2 | 4/2005 | Long et al. |
| 6,875,236 B2 | 4/2005 | Reiley |
| 6,926,739 B1 | 8/2005 | O'Connor et al. |
| 6,939,380 B2 | 9/2005 | Guzman |
| 6,942,670 B2 | 9/2005 | Heldreth et al. |
| 6,964,663 B2 | 11/2005 | Grant et al. |
| 7,001,394 B2 | 2/2006 | Gundlapalli et al. |
| 7,011,687 B2 | 3/2006 | Deffenbaugh et al. |
| 7,025,790 B2 | 4/2006 | Parks et al. |
| 7,163,541 B2 | 1/2007 | Ek |
| 7,238,190 B2 | 7/2007 | Schon et al. |
| 7,252,684 B2 | 8/2007 | Dearnaley |
| 7,314,488 B2 | 1/2008 | Reiley |
| 7,323,012 B1 | 1/2008 | Stone et al. |
| 7,476,227 B2 | 1/2009 | Tornier et al. |
| 7,481,814 B1 | 1/2009 | Metzger |
| 7,485,147 B2 | 2/2009 | Papps et al. |
| 7,534,246 B2 | 5/2009 | Reiley et al. |
| 7,534,270 B2 | 5/2009 | Ball |
| 7,615,082 B2 | 11/2009 | Naegerl et al. |
| 7,618,421 B2 | 11/2009 | Axelson, Jr. et al. |
| 7,625,409 B2 | 12/2009 | Saltzman et al. |
| 7,641,697 B2 | 1/2010 | Reiley |
| 7,678,151 B2 | 3/2010 | Ek |
| 7,713,305 B2 | 5/2010 | Ek |
| 7,717,920 B2 | 5/2010 | Reiley |
| 7,763,080 B2 | 7/2010 | Southworth |
| 7,803,158 B2 | 9/2010 | Hayden |
| 7,850,698 B2 | 12/2010 | Straszheim-Morley et al. |
| 7,896,883 B2 | 3/2011 | Ek et al. |
| 7,896,885 B2 | 3/2011 | Miniaci et al. |
| 7,909,882 B2 | 3/2011 | Stinnette |
| 7,914,533 B2 | 3/2011 | Nelson et al. |
| 7,963,996 B2 | 6/2011 | Saltzman et al. |
| 8,002,841 B2 | 8/2011 | Hasselman |
| 8,012,217 B2 | 9/2011 | Strzepa et al. |
| 8,034,114 B2 | 10/2011 | Reiley |
| 8,034,115 B2 | 10/2011 | Reiley |
| 8,048,164 B2 | 11/2011 | Reiley |
| 8,110,006 B2 | 2/2012 | Reiley |
| 8,114,091 B2 | 2/2012 | Ratron et al. |
| 8,128,627 B2 | 3/2012 | Justin et al. |
| 8,167,888 B2 | 5/2012 | Steffensmeier |
| 8,172,850 B2 | 5/2012 | McMinn |
| 8,177,841 B2 | 5/2012 | Ek |
| 8,192,434 B2 | 6/2012 | Huebner et al. |
| 8,268,007 B2 | 9/2012 | Barsoum et al. |
| 8,303,667 B2 | 11/2012 | Younger |
| 8,313,492 B2 | 11/2012 | Wong et al. |
| 8,317,797 B2 | 11/2012 | Rasmussen |
| 8,323,346 B2 | 12/2012 | Tepic |
| 8,337,503 B2 | 12/2012 | Lian |
| 8,361,159 B2 | 1/2013 | Ek |
| 8,366,559 B2 | 2/2013 | Papenfuss et al. |
| 8,430,879 B2 | 4/2013 | Stoneburner et al. |
| 8,475,463 B2 | 7/2013 | Lian |
| 8,491,596 B2 | 7/2013 | Long et al. |
| 8,579,980 B2 | 11/2013 | DeLurio et al. |
| 8,715,362 B2 | 5/2014 | Reiley et al. |
| 8,808,297 B2 | 8/2014 | Stemniski et al. |
| 8,808,303 B2 | 8/2014 | Stemniski et al. |
| 8,911,444 B2 | 12/2014 | Bailey |
| 9,259,250 B2 | 2/2016 | Saravia et al. |
| 9,480,571 B2 | 11/2016 | McGinley et al. |
| 9,492,281 B2 | 11/2016 | Rouyer et al. |
| 9,566,075 B2 | 2/2017 | Carroll et al. |
| 9,629,726 B2 | 4/2017 | Reiley et al. |
| 9,629,730 B2 | 4/2017 | Reiley |
| 9,675,365 B2 | 6/2017 | Lancianese et al. |
| 9,907,561 B2 | 3/2018 | Luna et al. |
| 10,034,678 B2 | 7/2018 | Park et al. |
| 10,039,558 B2 | 8/2018 | Park et al. |
| 10,080,573 B2 | 9/2018 | McGinley et al. |
| 10,111,674 B2 | 10/2018 | Crainich et al. |
| 10,136,904 B2 | 11/2018 | McGinley et al. |
| 10,149,687 B2 | 12/2018 | McGinley et al. |
| 10,182,832 B1 | 1/2019 | Saltzman et al. |
| 10,206,688 B2 | 2/2019 | Park et al. |
| 10,213,309 B2 | 2/2019 | Lindsey et al. |
| 10,743,999 B2 | 8/2020 | Reiley |
| 10,940,012 B2 | 3/2021 | Sander et al. |
| 11,013,520 B2 | 5/2021 | Gareiss et al. |
| 2002/0068977 A1 | 6/2002 | Jackson |
| 2002/0082607 A1 | 6/2002 | Heldreth et al. |
| 2002/0133164 A1 | 9/2002 | Williamson |
| 2002/0173853 A1 | 11/2002 | Corl, III et al. |
| 2003/0208280 A1 | 11/2003 | Tohidi |
| 2003/0236522 A1 | 12/2003 | Long et al. |
| 2004/0015173 A1 | 1/2004 | Irving |

(56) References Cited

U.S. PATENT DOCUMENTS

| | | |
|---|---|---|
| 2004/0030399 A1 | 2/2004 | Asencio |
| 2004/0039394 A1 | 2/2004 | Conti et al. |
| 2004/0068322 A1 | 4/2004 | Ferree |
| 2004/0167631 A1 | 8/2004 | Luchesi et al. |
| 2004/0186585 A1 | 9/2004 | Feiwell |
| 2004/0193268 A1 | 9/2004 | Hazebrouck |
| 2004/0216259 A1 | 11/2004 | Ponziani |
| 2004/0236431 A1 | 11/2004 | Sekel |
| 2005/0004676 A1 | 1/2005 | Schon et al. |
| 2005/0165408 A1 | 7/2005 | Puno et al. |
| 2005/0192674 A1 | 9/2005 | Ferree |
| 2005/0267481 A1 | 12/2005 | Carl et al. |
| 2006/0009857 A1 | 1/2006 | Gibbs et al. |
| 2006/0020345 A1 | 1/2006 | O'Connor et al. |
| 2006/0036257 A1 | 2/2006 | Steffensmeier et al. |
| 2006/0116679 A1 | 6/2006 | Lutz et al. |
| 2006/0142870 A1 | 6/2006 | Robinson et al. |
| 2006/0229730 A1 | 10/2006 | Reiley et al. |
| 2006/0235541 A1 | 10/2006 | Hodorek |
| 2006/0247788 A1 | 11/2006 | Ross |
| 2007/0038303 A1 | 2/2007 | Myerson et al. |
| 2007/0100346 A1 | 5/2007 | Wyss et al. |
| 2007/0112431 A1 | 5/2007 | Kofoed |
| 2007/0162025 A1 | 7/2007 | Tornier et al. |
| 2007/0173944 A1 | 7/2007 | Keller et al. |
| 2007/0173947 A1 | 7/2007 | Ratron |
| 2007/0213830 A1 | 9/2007 | Ammann et al. |
| 2007/0233129 A1 | 10/2007 | Bertagnoli et al. |
| 2007/0276400 A1 | 11/2007 | Moore et al. |
| 2007/0288030 A1 | 12/2007 | Metzger et al. |
| 2008/0015602 A1 | 1/2008 | Axelson |
| 2008/0097617 A1 | 4/2008 | Fellinger et al. |
| 2008/0103603 A1 | 5/2008 | Hintermann |
| 2008/0109081 A1 | 5/2008 | Bao et al. |
| 2008/0195233 A1 | 8/2008 | Ferrari et al. |
| 2008/0215156 A1 | 9/2008 | Duggal et al. |
| 2008/0287954 A1 | 11/2008 | Kunz et al. |
| 2008/0312745 A1 | 12/2008 | Keller et al. |
| 2009/0024131 A1 | 1/2009 | Metzger et al. |
| 2009/0043309 A1 | 2/2009 | Rasmussen |
| 2009/0043310 A1 | 2/2009 | Rasmussen |
| 2009/0054992 A1 | 2/2009 | Landes et al. |
| 2009/0082875 A1 | 3/2009 | Long |
| 2009/0105767 A1 | 4/2009 | Reiley |
| 2009/0105840 A1 | 4/2009 | Reiley |
| 2009/0182433 A1 | 7/2009 | Reiley et al. |
| 2009/0198341 A1 | 8/2009 | Choi et al. |
| 2009/0234360 A1 | 9/2009 | Alexander |
| 2009/0276052 A1 | 11/2009 | Regala et al. |
| 2010/0010493 A1 | 1/2010 | Dower |
| 2010/0023066 A1 | 1/2010 | Long et al. |
| 2010/0023126 A1 | 1/2010 | Grotz |
| 2010/0042215 A1 | 2/2010 | Stalcup et al. |
| 2010/0057216 A1 | 3/2010 | Gannoe et al. |
| 2010/0069910 A1 | 3/2010 | Hasselman |
| 2010/0198355 A1 | 8/2010 | Kofoed et al. |
| 2010/0212138 A1 | 8/2010 | Carroll et al. |
| 2010/0241237 A1 | 9/2010 | Pappas |
| 2010/0256773 A1 | 10/2010 | Thijs et al. |
| 2010/0262150 A1 | 10/2010 | Lian |
| 2010/0305572 A1 | 12/2010 | Saltzman et al. |
| 2010/0318088 A1 | 12/2010 | Warne et al. |
| 2010/0331984 A1 | 12/2010 | Barsoum et al. |
| 2011/0029090 A1 | 2/2011 | Zannis et al. |
| 2011/0035018 A1 | 2/2011 | Deffenbaugh et al. |
| 2011/0035019 A1 | 2/2011 | Goswami et al. |
| 2011/0071645 A1 | 3/2011 | Bojarski et al. |
| 2011/0106093 A1 | 5/2011 | Romano et al. |
| 2011/0106268 A1 | 5/2011 | Deffenbaugh et al. |
| 2011/0112542 A1 | 5/2011 | Gross |
| 2011/0125200 A1 | 5/2011 | Hanson et al. |
| 2011/0125275 A1 | 5/2011 | Lipman et al. |
| 2011/0125284 A1 | 5/2011 | Gabbrielli et al. |
| 2011/0152868 A1 | 6/2011 | Kourtis et al. |
| 2011/0152869 A1 | 6/2011 | Ek et al. |
| 2011/0166608 A1 | 7/2011 | Duggal et al. |
| 2011/0190829 A1 | 8/2011 | Duggal et al. |
| 2011/0218542 A1 | 9/2011 | Lian |
| 2011/0245835 A1 | 10/2011 | Dodd et al. |
| 2011/0253151 A1 | 10/2011 | Tochigi et al. |
| 2011/0276052 A1 | 11/2011 | Hasselman |
| 2011/0295380 A1 | 12/2011 | Long |
| 2012/0010718 A1 | 1/2012 | Still |
| 2012/0046753 A1 | 2/2012 | Cook et al. |
| 2012/0053591 A1 | 3/2012 | Haines et al. |
| 2012/0053644 A1 | 3/2012 | Landry et al. |
| 2012/0083789 A1 | 4/2012 | Blakemore et al. |
| 2012/0109131 A1 | 5/2012 | Vasarhelyi et al. |
| 2012/0109326 A1 | 5/2012 | Perler |
| 2012/0130376 A1 | 5/2012 | Loring et al. |
| 2012/0136443 A1 | 5/2012 | Wenzel |
| 2012/0185057 A1 | 7/2012 | Abidi et al. |
| 2012/0191210 A1 | 7/2012 | Ratron et al. |
| 2012/0239045 A1 | 9/2012 | Li |
| 2012/0245701 A1 | 9/2012 | Zak et al. |
| 2012/0271314 A1* | 10/2012 | Stemniski ........... A61B 17/1775 606/87 |
| 2012/0271430 A1 | 10/2012 | Arnett et al. |
| 2012/0277745 A1 | 11/2012 | Lizee |
| 2013/0041473 A1 | 2/2013 | Rouyer et al. |
| 2013/0116797 A1 | 5/2013 | Coulange et al. |
| 2014/0020690 A1 | 1/2014 | Triplett |
| 2014/0039565 A1 | 2/2014 | Martineau et al. |
| 2014/0163570 A1* | 6/2014 | Reynolds ........... A61B 17/1703 606/86 R |
| 2014/0236157 A1 | 8/2014 | Tochigi et al. |
| 2014/0276853 A1 | 9/2014 | Long et al. |
| 2014/0296995 A1 | 10/2014 | Reiley et al. |
| 2014/0309640 A1 | 10/2014 | Smith et al. |
| 2014/0336658 A1 | 11/2014 | Luna et al. |
| 2015/0045801 A1 | 2/2015 | Axelson et al. |
| 2015/0257900 A1* | 9/2015 | Dees, Jr. ............... A61F 2/4684 606/88 |
| 2016/0135815 A1 | 5/2016 | Loring et al. |
| 2016/0135857 A1 | 5/2016 | Marrero, Sr. |
| 2016/0361071 A1 | 12/2016 | Mahfouz |
| 2016/0367371 A1 | 12/2016 | De Beaubien et al. |
| 2017/0189198 A1 | 7/2017 | Reiley et al. |
| 2018/0177511 A1 | 6/2018 | Luna et al. |
| 2018/0177513 A1 | 6/2018 | Stemniski et al. |
| 2018/0263639 A1 | 9/2018 | McGinley et al. |
| 2019/0059917 A1 | 2/2019 | Saltzman |
| 2019/0059918 A1 | 2/2019 | Saltzman et al. |
| 2019/0076261 A1 | 3/2019 | Mutchler et al. |
| 2019/0133612 A1 | 5/2019 | McGinley |
| 2019/0150957 A1* | 5/2019 | Wilkinson ............. A61B 17/16 |
| 2019/0350717 A1 | 11/2019 | Tuttle |
| 2020/0046374 A1 | 2/2020 | Luttrell et al. |
| 2020/0297353 A1* | 9/2020 | Bomar ................. A61B 17/157 |
| 2022/0316504 A1 | 10/2022 | Kubacki |

FOREIGN PATENT DOCUMENTS

| | | |
|---|---|---|
| EP | 2967697 | 4/2018 |
| EP | 3354233 | 10/2019 |
| GB | 2480846 | 12/2011 |
| JP | H11-500035 | 1/1999 |
| JP | 2006150055 | 6/2006 |
| JP | 2007508123 | 4/2007 |
| JP | 2007518453 | 7/2007 |
| JP | 2007519477 | 7/2007 |
| JP | 2007536011 | 12/2007 |
| JP | 2009148597 | 7/2009 |
| JP | 2011526189 | 10/2011 |
| JP | 2012518517 | 8/2012 |
| JP | 2013500810 | 1/2013 |
| JP | 2013511358 | 4/2013 |
| JP | 5412334 | 2/2014 |
| JP | 2014131738 | 7/2014 |
| WO | WO 9625106 | 8/1996 |
| WO | WO 0166021 A1 | 9/2001 |
| WO | WO 2005011523 A2 | 2/2005 |
| WO | WO 2005037135 | 4/2005 |
| WO | WO 2006022923 | 3/2006 |

(56) References Cited

FOREIGN PATENT DOCUMENTS

| WO | WO 2006023824 | 3/2006 |
| WO | WO 2006099270 | 9/2006 |
| WO | WO 2007084846 | 7/2007 |
| WO | WO 2009143374 | 11/2009 |
| WO | WO 2009158522 | 12/2009 |
| WO | WO 2010099142 | 9/2010 |
| WO | WO 2010135156 | 11/2010 |
| WO | WO 2011015863 | 2/2011 |
| WO | WO 2011063281 | 5/2011 |
| WO | WO 2011151657 | 12/2011 |
| WO | 2012024323 A2 | 2/2012 |
| WO | WO 2012088036 | 6/2012 |
| WO | WO 2012116089 | 8/2012 |
| WO | WO 2012158917 | 11/2012 |
| WO | WO 2013169475 | 11/2013 |
| WO | WO 2014152535 | 9/2014 |
| WO | WO 2015167581 | 11/2015 |
| WO | WO 2016005722 | 1/2016 |
| WO | WO 2016039762 | 3/2016 |
| WO | 2016138913 A1 | 9/2016 |
| WO | WO 2016181168 | 11/2016 |

OTHER PUBLICATIONS

International Search Report for International patent application No. PCT/US2014/027448 dated Jul. 7, 2014.
International Preliminary Report on Patentability issued for International patent application No. PCT/US2014/027448, Sep. 15, 2015, 8 pages.
Partial European Search Report issued in connection with European patent application No. 14768333.8, Oct. 26, 2016, 6 pages.
Patent Examination Report No. 1 issued in connection with Australian patent application No. 2015202080, Jul. 5, 2016, 4 pages.
First Office Action issued for Japanese patent application No. 2016-117842, Sep. 12, 2017, 5 pages.
First Office Action issued in connection with corresponding Japanese Patent Application No. 2020-016447, Apr. 6, 2021, 4 pages.
Office Action in corresponding Canadian Patent Application No. 2,904,652, Jun. 2, 2020, 6 pages.
First Examination Report issued in corresponding Australian Patent Application No. 2019213412, Sep. 3, 2020, 5 pages.
First Office Action in corresponding Canadian Patent Application No. 2,904,652, Jan. 28, 2020, 5 pages.
Final Office Action issued in connection with corresponding Japanese Patent Application No. 206-502443, May 15, 2018, 3 pages.
Extended European Search Report issued in connection with corresponding European Patent Application No. 18160378.8, Jun. 29, 2018, 7 pages.
Second Office Action issued in connection with corresponding Chinese Patent Application No. 2018071101785100, dated Jul. 16, 2016, 6 pages.
First Office Action in corresponding Japanese Patent Application No. 2018-178853, Sep. 3, 2018, 3 pages.
Examination Report No. 1 issued in connection with corresponding Australian Patent Application No. 20182000073, Dec. 24, 2018, 3 pages.
First Office Action issued in connection with corresponding Japanese Patent Application No. 2018-092289, Mar. 5, 2019, 2 pages.
Extended European Search Report and Opinion in connection with European Patent Application No. 14768333.8, dated Jan. 30, 2017, 10 pages.
First Office Action issued in connection with Chinese Patent Application No. 2017800899442 dated Apr. 6, 2022, 8 pages.
International Search Report and Written Opinion issued in connection with International Patent Application No. PCT/US2021/025873, Sep. 2, 2021.
Orthopedic Designs North America, Inc., http://odi-na.com/?service=talon-distalfix-fermoral-nail-system, accessed via Internet, Jul. 22, 2022.
Arthrex, "Arthrex—Intramedullary Nails," https://Www.arthrex.com/foot-ankle/intramedullary-nails, accessed via Internet, Jul. 22, 2022.
Inbone II Total Ankle Surgical Technique, Wright Medical Technology, Inc., Mar. 12, 2014, 64 pages.
Infinity Total Ankle System Surgical Technique, Wright Medical Techology, Inc., Aug. 8, 2015, 76 pages.
First Examination Report issued in connection with Australian Patent Application No. 2020277219, Nov. 19, 2021, 7 pages.
International Search Report and Written Opinion issued in connection with International Patent Application No. PCT/US2016/023729, Feb. 14, 2017, 14 pages.
First Examination Report issued in connection with Australian Patent Application No. 2019246766, Apr. 17, 2020, 9 pages.
Supplementary European Search Report issued in connection with corresponding European Patent Application No. 16895669.6, Oct. 21, 2019, 6 pages.
Office Action in connection with corresponding Canadian Patent Application No. 3,014,284, Jun. 17, 2019, 4 pages.
First Examination issued in connection with Australian Patent Application No. 2016398429, Jan. 21, 2019, 4 pages.
International Search Report and Written Opinion issued in connection with International Patent Application No. PCT/US2021/071308, Dec. 27, 2021, 10 pages.
Prophecy Inbone Preoperative Navigation Guides Surgical Technique, Wright Medical Technology, Inc., 64 pages.
Sidekick Coretrak Tube Fixator, Wright Medical Technology, Inc., 8 pages.
Extended European Search Report issued in connection with European Patent Application No. 22185245.2, Nov. 28, 2022, 9 pages.
International Search Report and Written Opinion issued in connection with International Patent Application No. PCT/US2021/057014, Mar. 17, 2022, 19 pages.
Partial Supplementary European Search Report dated Jul. 31, 2024, Jul. 31, 2024, 12 pages.
Extended European Search Report issued in connection with European Patent Application No. 21887499.8, Sep. 27, 2024, 13 pages.

\* cited by examiner

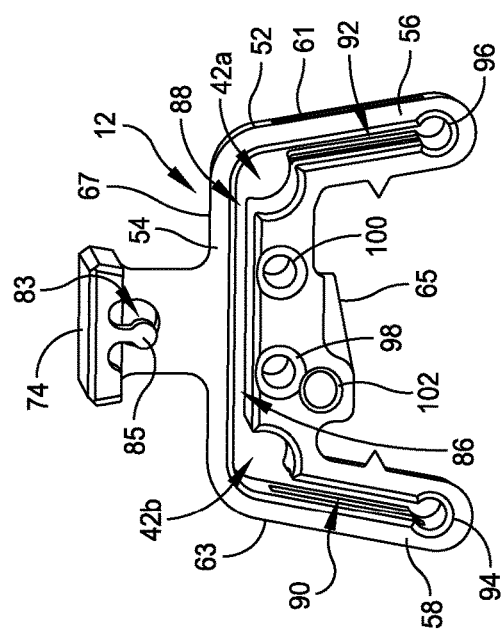

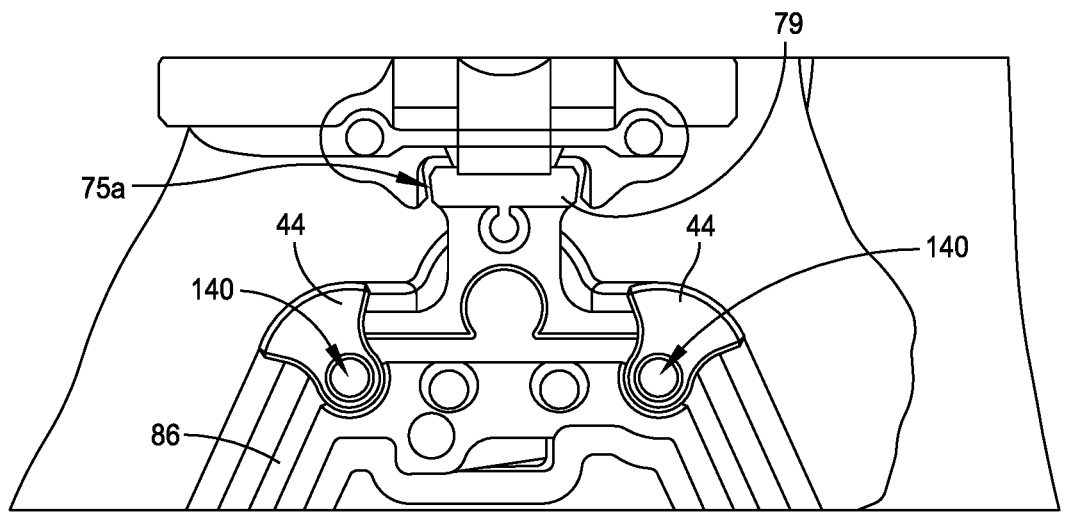
FIG. 13
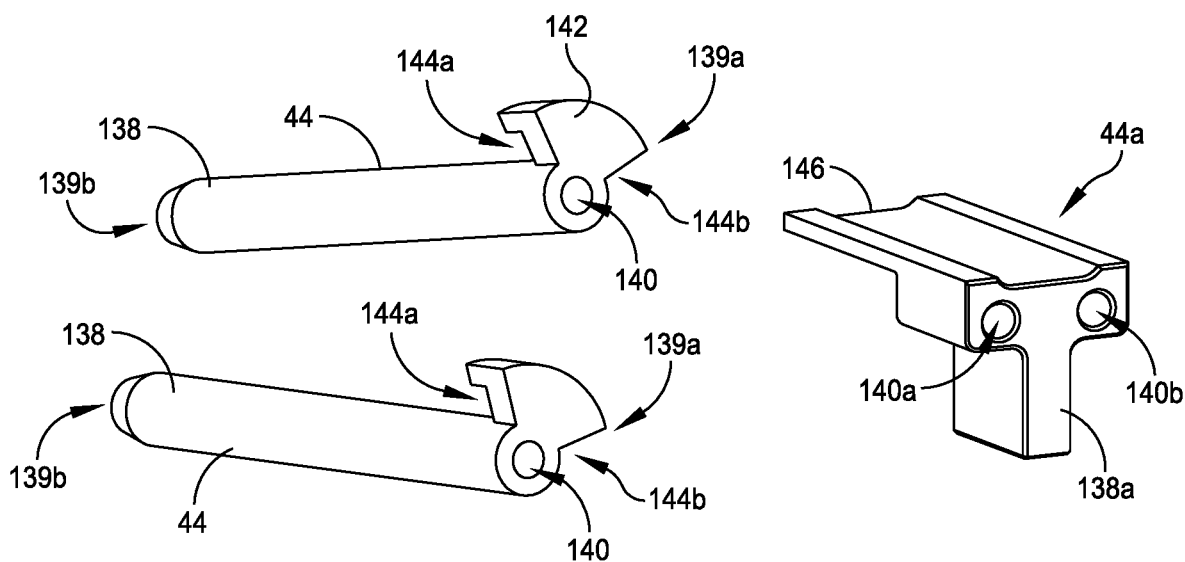
FIG. 14
FIG. 15

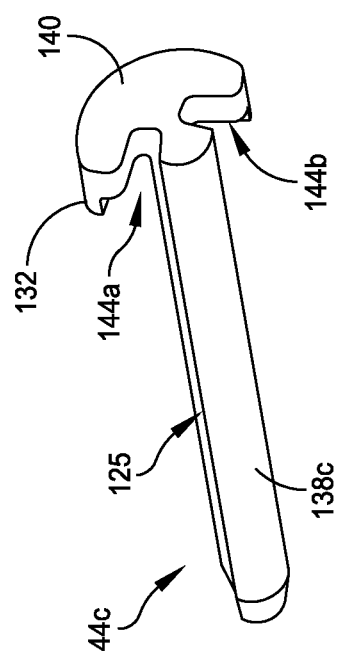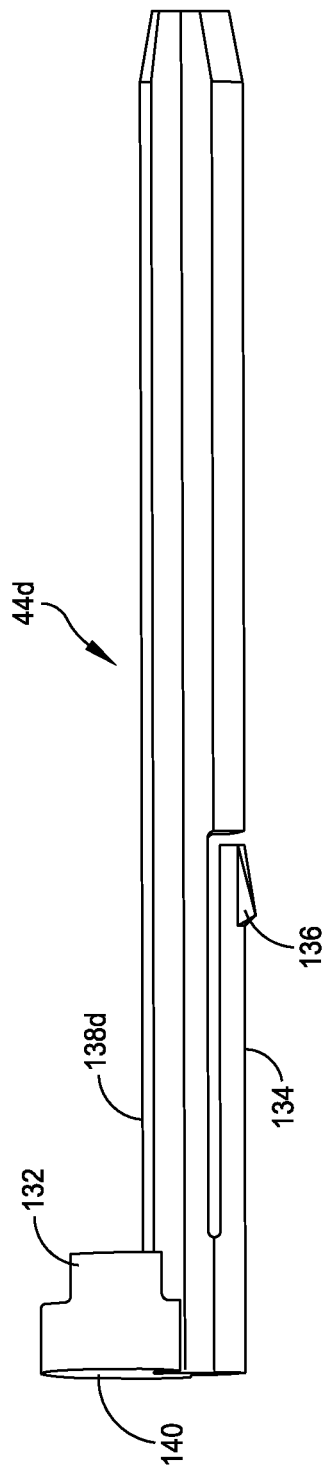

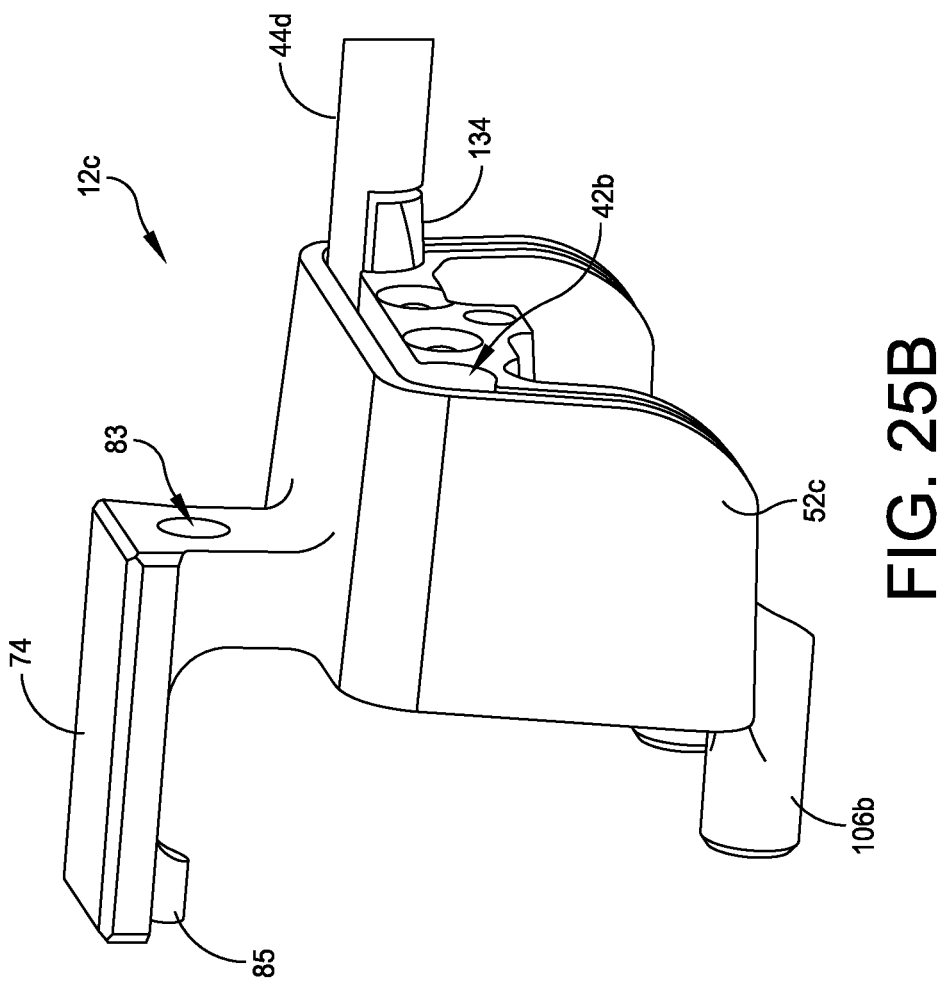

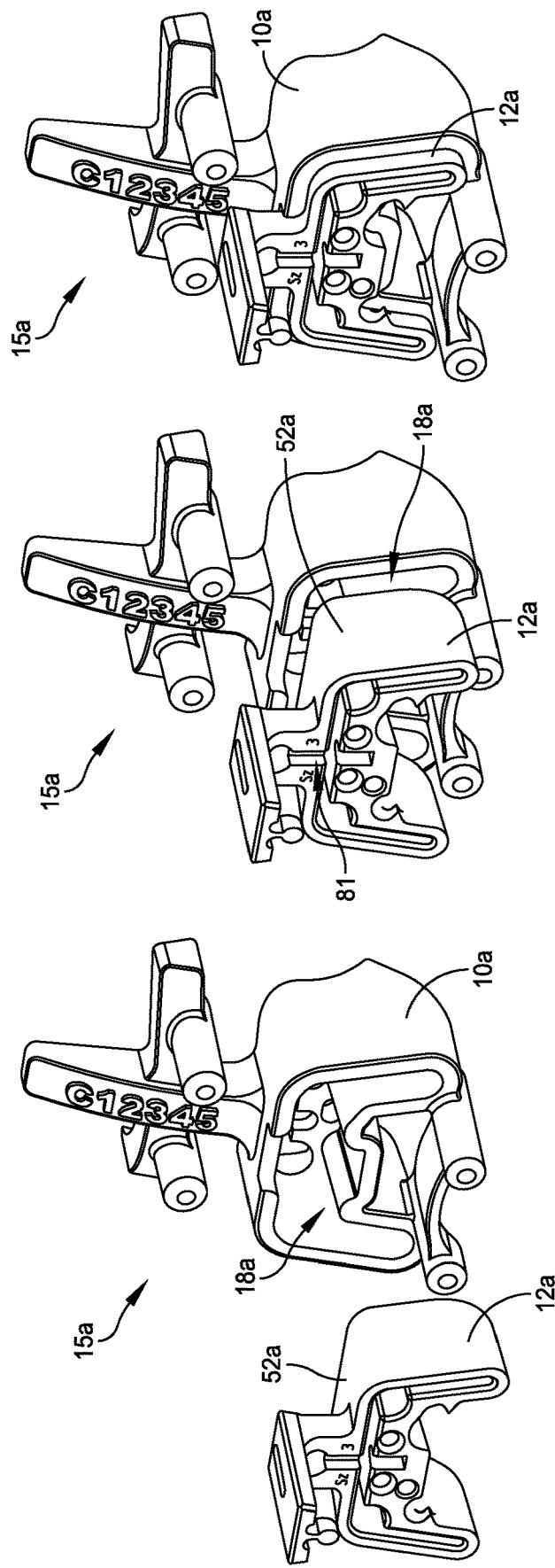

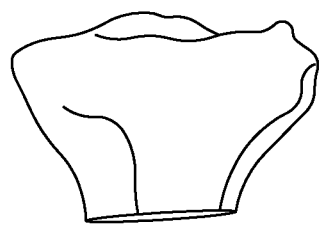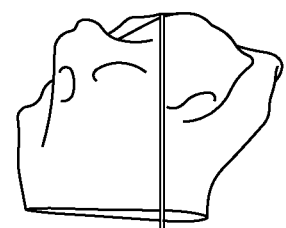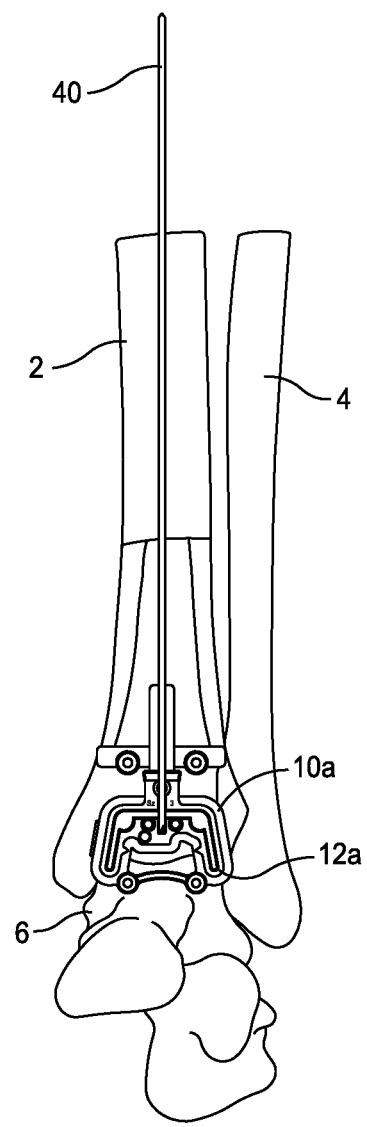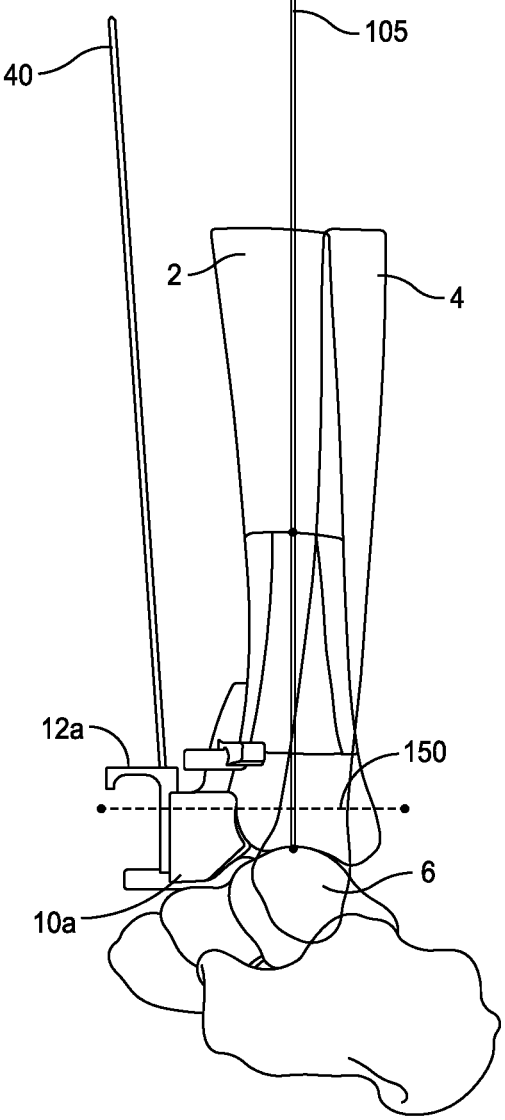
FIG. 36A            FIG. 36B

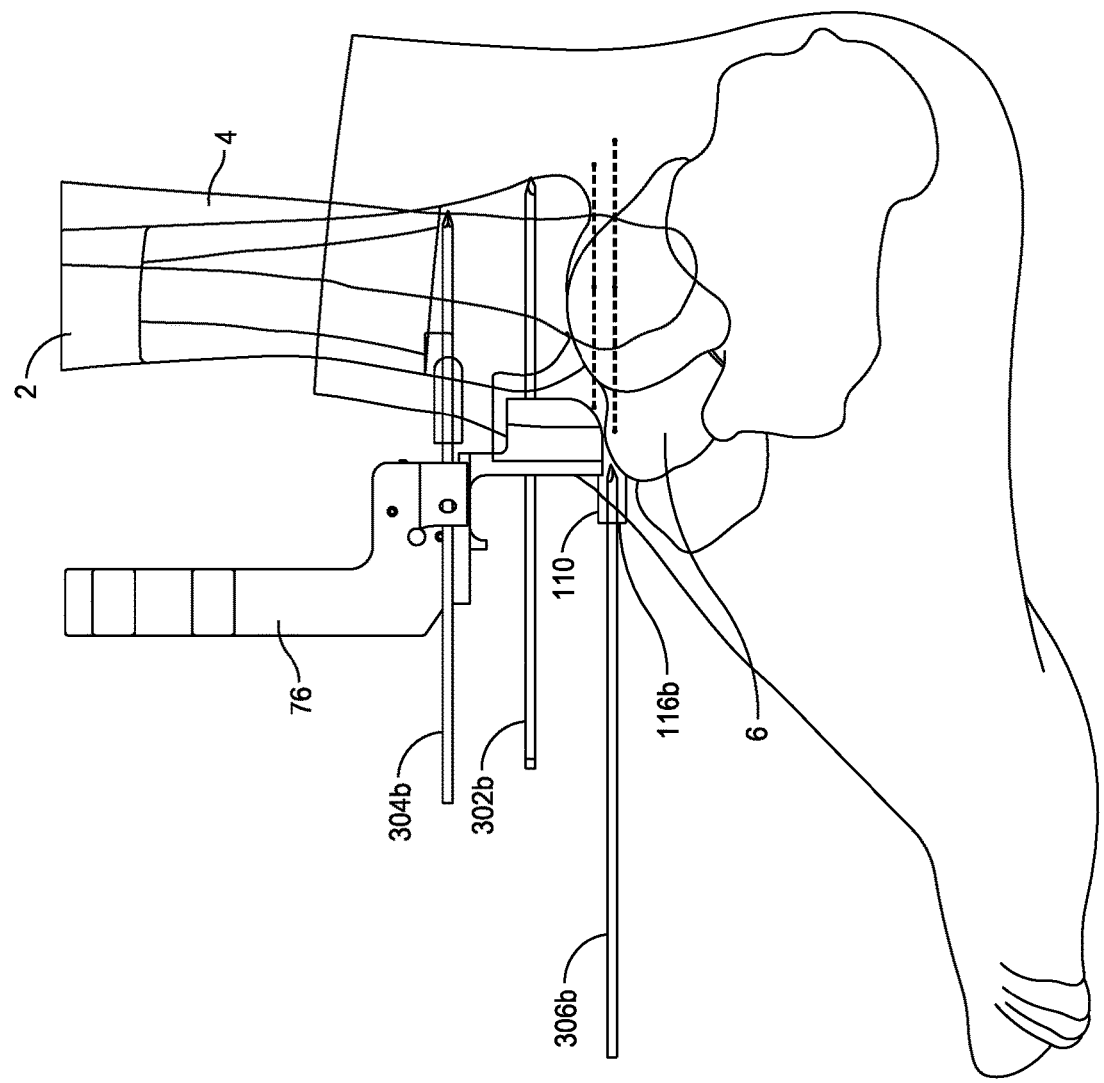

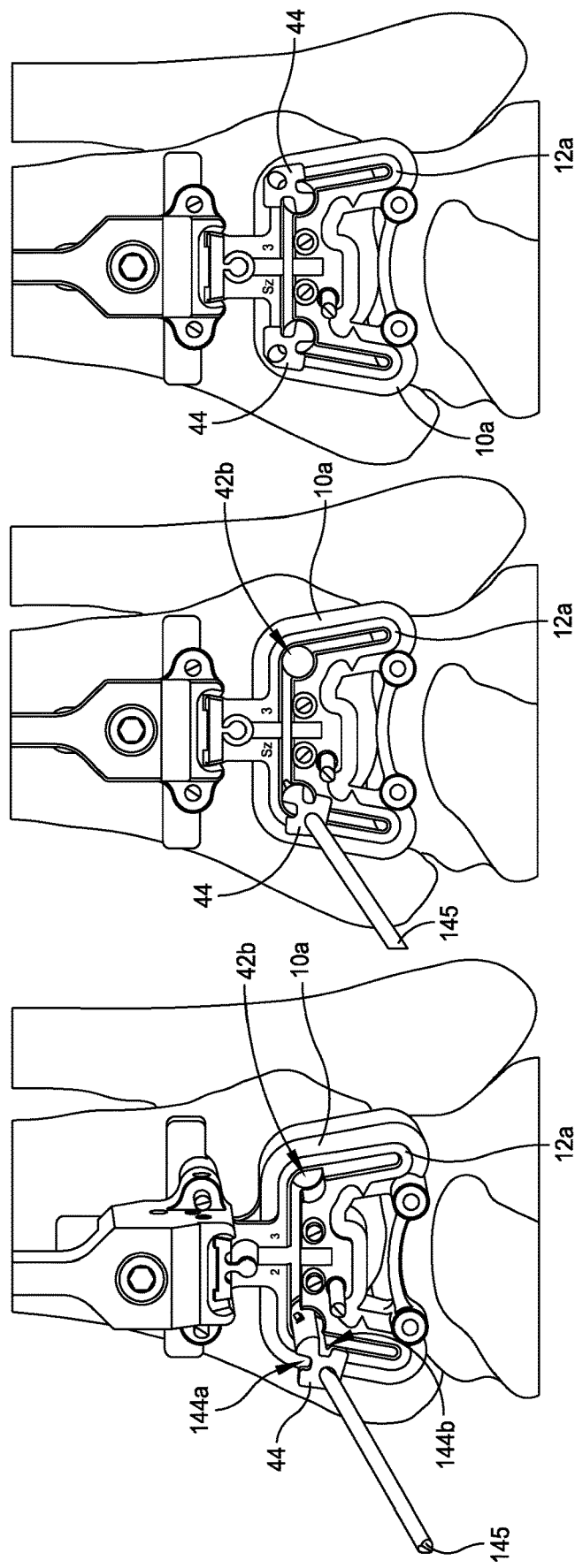

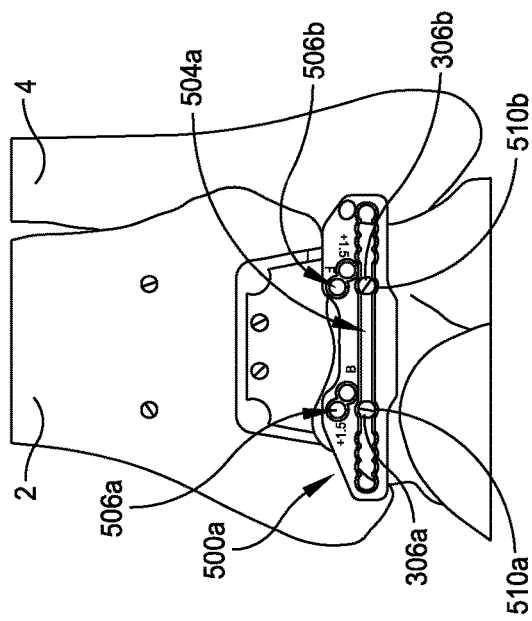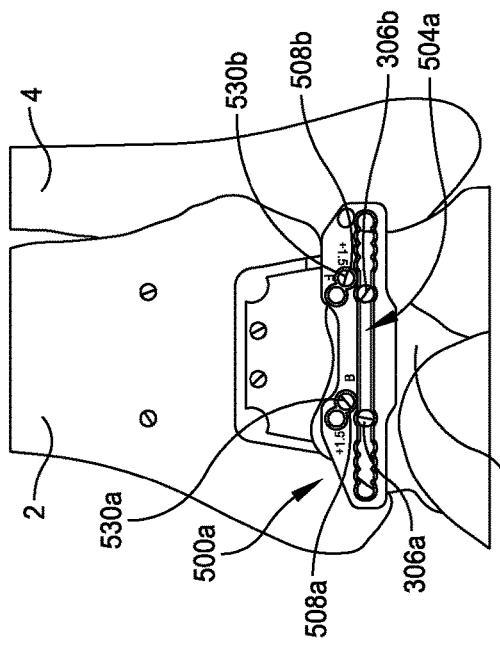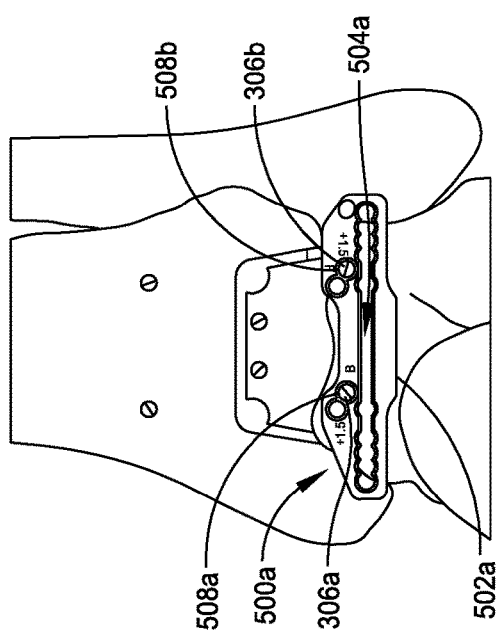

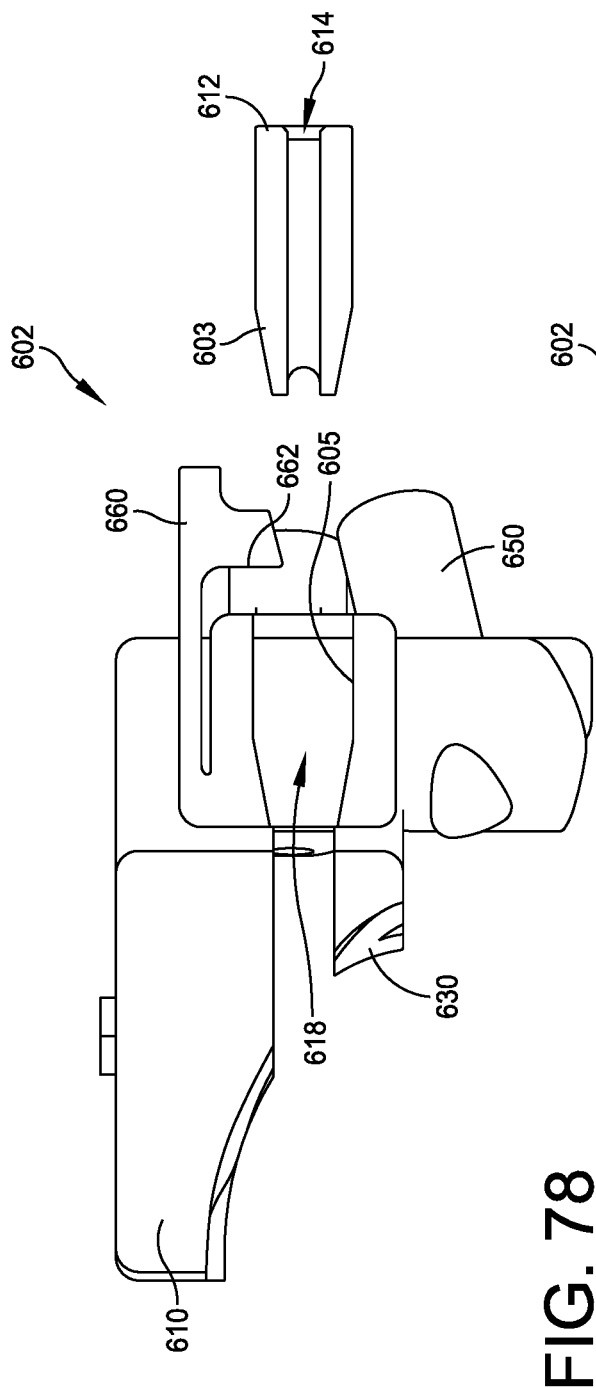
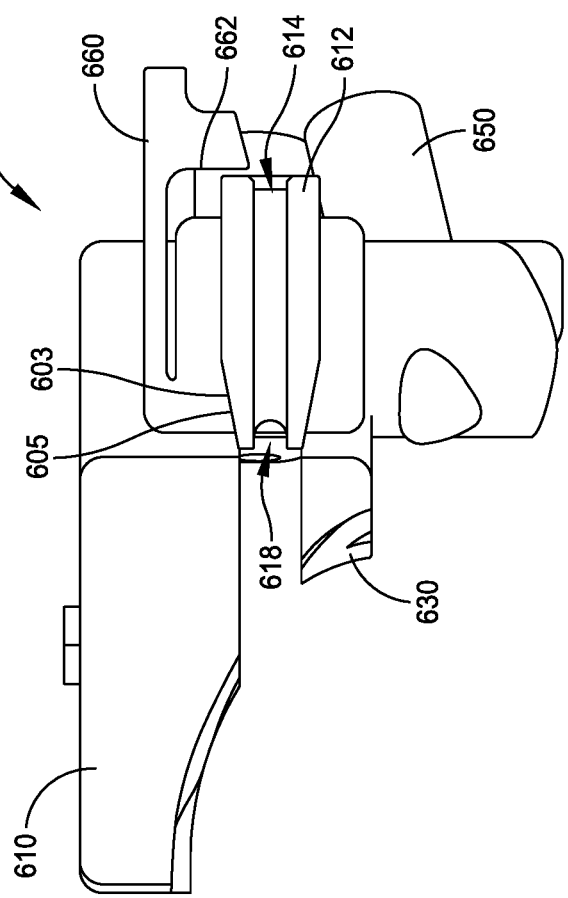
FIG. 78
FIG. 79

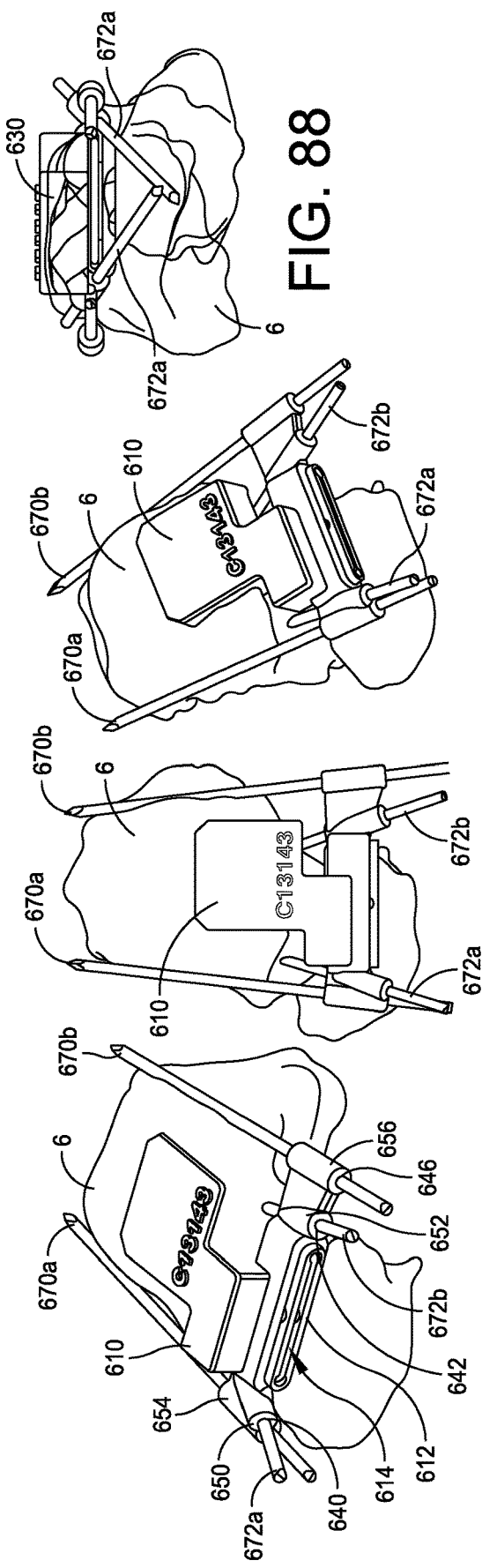
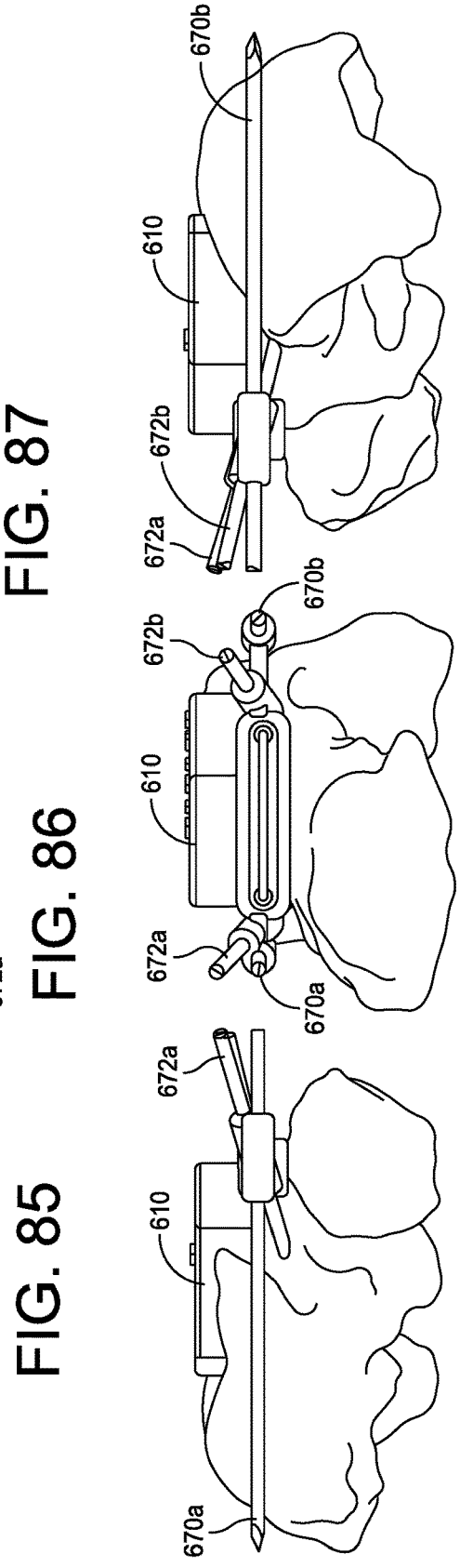

MODULAR GUIDE SYSTEM FOR SURGICAL PROCEDURES

CROSS-REFERENCE TO RELATED APPLICATIONS

This application is a National Stage Application, filed under 35 U.S.C. 371, of International Patent Application No. PCT/US2021/057014, filed on Oct. 28, 2021, which claims benefit to U.S. Provisional Application No. 63/108,577, filed on Nov. 2, 2020, entitled "Modular Guide System for Surgical Procedures", the disclosures of which are incorporated herein by reference in its entireties.

TECHNICAL FIELD

The disclosure relates to surgical devices and methods. More specifically, the disclosure relates to a modular guide system for surgical procedures and the components of the guide system.

BACKGROUND

Total joint replacement prostheses typically include a specially designed jig or fixture to enable a surgeon to make accurate and precise bone resections in and around the joint being prepared to accept the prosthesis. The ultimate goal with any total joint prosthesis is to approximate the function and structure of the natural, healthy structures that the prosthesis is replacing. Should the prosthesis not be properly attached to the joint, i.e., an ankle or knee, the misalignment could result in discomfort to the patient, gait problems, or degradation of the prosthesis.

Many surgical procedures employ the use of intra-operative fluoroscopy to check the alignment of the intramedullary cavities that are prepared to receive the joint replacement prosthesis. However, the use of intra-operative fluoroscopy in the operating room has several drawbacks. One such drawback is that the use of fluoroscopy to check the alignment of intramedullary cavities formed during surgery increases the overall length of the surgical procedure as time is taken to acquire and evaluate the fluoroscopic images. Long surgery times lead to increased tourniquet time forth patient and therefore may increase recovery time.

Another drawback of fluoroscopy is exposing the patient and others in the operating room to the ionized radiation. For example, the U.S. Food and Drug Administration ("FDA") has issued several articles and public health advisories concerning the use of the fluoroscopy during surgical procedures. Consequently, even though steps are taken to protect the patient and other from the ionized radiation, it is virtually impossible to eliminate all risk associated with the ionized radiation.

SUMMARY

In various embodiments, a medical device including a guide locator, a guide element, and a retention mechanism is disclosed. The guide locator includes a mount body having a conformal surface that is shaped to be complementary to a natural anatomical surface of a patient bone and defining a mount receptacle. The resection guide includes a guide body having a shape configured to fit with the mount to attach the guide element to the guide locator and a guide slot formed in the body configured to receive a tool therethrough.

In various embodiments, a medical device including a guide locator, a guide element, and at least one corner protector is disclosed. The guide locator includes a mount body having a conformal surface that is shaped to be complementary to a natural anatomical surface of a patient bone and defining a mount receptacle. The mount body defines a guide receptacle. The guide element includes a guide body having a shape configured to fit with to attach the guide receptacle of the guide locator and a guide slot formed in the guide body, the guide slot comprising at least one opening for receiving a tool therethrough. The at least one corner protector is configured to be inserted through the guide slot of the guide element.

In various embodiments, a method for a surgical procedure on a joint including at least a first bone and a second bone is disclosed. The method includes a step of positioning a guide locator with respect to the joint The guide locator includes a body defining a patient-specific surface having a surface contour complimentary to a portion of the joint. The body of the guide locator defines a guide receptacle. The method further includes a step of positioning a first guide element within the guide receptacle. The first guide element includes a body defining a guide slot sized and configured to receive a tool therethrough. The body of the guide element includes an outer perimeter complimentary to an inner perimeter of the guide receptacle such that the first guide element is coupled to the guide locator by inserting at least a portion of the guide element into the guide receptacle. The method further includes steps of inserting a first tool through a portion of the guide slot to define at least one pilot hole in at least the first bone of the joint, inserting at least one corner protector through the guide slot and the at least one pilot hole, and inserting a second tool through the guide slot to resect the first bone. The travel path of the second tool is defined by the guide slot and the at least one corner protector.

BRIEF DESCRIPTION OF THE FIGURES

FIG. 6 illustrates a front perspective view of the guide element of the medical device of FIG. 1, in accordance with some embodiments.

FIG. 7 illustrates a top view of the guide element of FIG. 6, in accordance with some embodiments.

FIG. 8 illustrates a side view of the guide element of FIG. 6, in accordance with some embodiments.

FIG. 13 illustrates an anterior view of the medical device of FIG. 1 having a plurality of corner protectors inserted through a guide element, in accordance with some embodiments.

FIG. 14 illustrates a plurality of corner protectors configured to be inserted through a guide element, in accordance with some embodiments.

FIG. 15 illustrates a corner protector having a generally rectangular shape configured to be inserted through a guide element, in accordance with some embodiments.

FIG. 17 illustrates a corner protector including a solid elongated body, in accordance with some embodiments.

FIG. 18 illustrates a corner protector including a locking mechanism having a flexible tab, in accordance with some embodiments.

FIG. 25B illustrates a side view of the guide element of FIG. 25A, in accordance with some embodiments.

FIGS. 34A-34C illustrate a process of inserting a guide element into a guide receptacle defined by a guide locator, in accordance with some embodiments.

FIG. 36A illustrates a front view of the surgical site of FIG. 35 having an alignment wire element inserted into an alignment wire slot defined in the guide element, in accordance with some embodiments.

FIG. 36B illustrates a lateral view of the surgical site of FIG. 36A, in accordance with some embodiments.

FIG. 45 illustrates insertion of a third set of pins including a fifth pin and a sixth pin through pin channels formed in corresponding pin guides of a guide locator, in accordance with some embodiments.

FIGS. 49A-49C illustrate insertion of corner protectors into the corner pilot holes and the corner holes of the guide element, in accordance with some embodiments.

FIG. 69 illustrates the modular guide of FIG. 63 coupled to at least one guide pin coupled to at least one anatomical structure of the surgical site of FIG. 65 in a second orientation, in accordance with some embodiments.

FIG. 70 illustrates the modular guide of FIG. 63 offset from the position illustrated in FIG. 69, in accordance with some embodiments.

FIG. 71 illustrates the insertion of one or more additional pins through guide holes formed in the modular guide and into one or more anatomical structures at a surgical site, in accordance with some embodiments.

FIG. 78 illustrates a side, cross-sectional view of the medical device of FIG. 76 having the guide element spaced apart from the guide locator, in accordance with some embodiments.

FIG. 79 illustrates a side, cross-sectional view of the medical device of FIG. 76 having the guide element inserted into a guide receptacle defined by the guide locator, in accordance with some embodiments.

FIG. 85 illustrates an anterior perspective view of the surgical site of FIG. 82 including a plurality of fixation pins inserted into the first anatomical structure through pin guides of the guide locator, in accordance with some embodiments.

FIG. 86 illustrates a superior view of the surgical site of FIG. 85, in accordance with some embodiments.

FIG. 87 illustrates a superior perspective view of the surgical site of FIG. 85, in accordance with some embodiments.

FIG. 88 illustrates a posterior view of the surgical site of FIG. 85, in accordance with some embodiments.

FIG. 89 illustrates a medial view of the surgical site of FIG. 85, in accordance with some embodiments.

FIG. 90 illustrates an anterior view of the surgical site of FIG. 85, in accordance with some embodiments.

FIG. 91 illustrates a lateral view of the surgical site of FIG. 85, in accordance with some embodiments.

DETAILED DESCRIPTION

Figure 1:
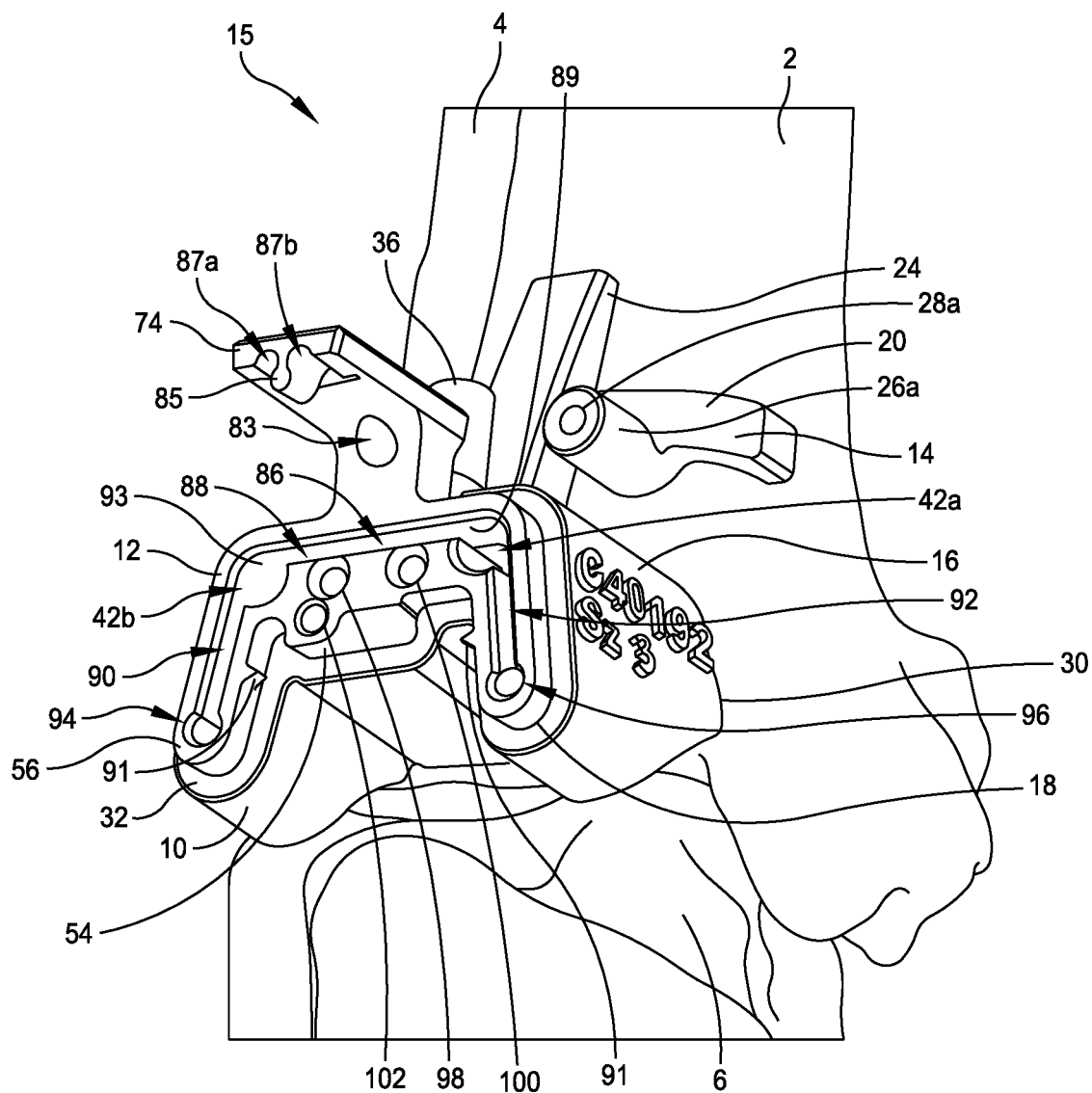
FIG. 1 illustrates an anterior perspective view of a surgical site including a medical device having a guide locator configured to be coupled to at least one anatomical structure at the surgical site and a guide element configured to guide insertion of at least one surgical instrument, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

As used herein, the term "substantially" denotes elements having a recited relationship (e.g., parallel, perpendicular, aligned, etc.) within acceptable manufacturing tolerances. For example, as used herein, the term "substantially parallel" is used to denote elements that are parallel or that vary from a parallel arrangement within an acceptable margin of error, such as +/−5°, although it will be recognized that greater and/or lesser deviations can exist based on manufacturing processes and/or other manufacturing requirements.

Disclosed embodiments include custom manufactured surgical instruments, guides, and fixtures that may be based upon a patient's anatomy as determined by a computer tomography scanner (CT), magnetic resonance imaging machine (MRI), or the like medical imaging technology. For example, a CT or MRI scanned image or series of images may be taken of a patient's knee or ankle, including portions of the limb from the pelvis or the foot. The CT or MRI scanned image data may then be converted to a solid computer model of the lower limb often including the pelvis, femur, patella, tibia, or foot to determine implant alignment, type and sizing using specialized modeling methods that are often embodied in computer software. Computer generated solid models that are derived from CT or MRI scan image data will often include precise and accurate information regarding the surface contours surrounding the structures that have been imaged, e.g., the surface topography of the bones or contour of fascia that have been imaged. It will be understood that by surface topography it is meant the location, shape, size and distribution of surface features such as concavities and prominences or the like.

U.S. Pat. No. 5,768,134 to Swaelens, et al., which is incorporated by reference herein in its entirety, discloses methods of converting CT or MRI scan image data to solid computer models. In some embodiments, images are made of a joint, such as an ankle joint including a calcaneus, talus, tibia, and fibula of a patient using a CT, MRI, or other diagnostic image capturing and processing unit as will be understood by one of skill in the art. The image data is processed to generate a model of the joint. The image data is processed to determine predefined reference locations for component positioning and alignment so that adjustments to the joint, such as those performed during surgery, may be planned and mapped on the generated computer model. Patient-specific surgical instrumentation, prostheses, guides, fixtures, and/or other surgical implants or equipment may be generated from the image data. Patient-specific systems and methods of using the same are disclosed in U.S. Pat. No. 8,808,297, issued on Aug. 19, 2014, entitled "Orthopedic Surgical Guide," the disclosure of which is incorporated herein by reference in its entirety.

Disclosed embodiments further include components, such as guides, guide adapters, and mounts, that include features for creating a modular surgical system. For example, a mount can be configured to features that enable the mount to be used with any of a plurality of cutting guides, depending on a needed step or procedure related to the surgery. For example, a separate resection guide can be insertable into a mount to provide multiple attachment options for a plurality of cutting guides. Further, the mount can include features that improve upon its connection to patient anatomy and/or its connection to a cut guide or other separate component. The mount and/or cut guides can include particular geometries to achieve these and other benefits attained by the disclosed embodiments. It should be understood that while examples included herein focus on tibial and talar resectioning operations, more generally, the disclosed embodiments apply to performing an operation at a joint having a first bone and a second bone. According to some embodiments, a medical device provides guidance with respect to a first bone of the joint and additional guide elements, such as modular guides, provides guidance with respect to a second bone of the joint.

FIGS. 1-13 illustrate a medical device 15, in accordance with some embodiments. The medical device 15 includes a guide locator 10 and a guide element 12. The guide locator 10 can be, for example, a tibial resection guide locator, configured to be positioned adjacent to and/or in contact with a tibia 2. Although embodiments are described herein including a tibial resection guide locator, it will be appreciated that the medical device 15 may be configured for preparation of other bones and/or joints including, but not limited to, other bones of the ankle joint, hip joint, knee joint, shoulder joint, and/or other joints and/or may be used with other guide bodies, such as, for example, a drilling guide. The guide locator 10 may be formed from a resilient polymer material of a type that is suitable for use in connection with stereolithography, selective laser sintering, or the like manufacturing equipment. In some embodiments, the guide locator 10 is formed using one or more additive manufacturing processes, such as, for example, vat photopolymerisation, material jetting, binder jetting, material extrusion, powder bed fusion, sheet lamination, directed energy deposition, and/or any other suitable additive manufacturing process.

In some embodiments, guide locator 10 comprises a unitary block structure with bone engaging features configured for complimentary matching with anatomical surface features of a selected region of the patient's natural bone (e.g., a portion of the tibia). The guide element 12 can itself be a guide, such as a cutting guide, for guiding an instrument during a surgical procedure. For instance, the guide element 12 may include features for guiding a saw, drill, planar tool, non-planar tool, or other tool during an operation, such as, for example, a cutting, drilling, planning, and/or other surgical operation. The guide element 12 can also include features particularly adapted to allowing additional components to be connected to the resection guide locator 10, as will be further described.

In some embodiments, the guide locator 10 includes a cruciform tibial yoke 14 projecting upwardly from a base 16. The base 16 further defines a guide receptacle 18 for receiving at least a portion of the guide element 12. Cruciform tibial yoke 14 can include a pair of spaced apart arms 20, 22 that project outwardly from a central post 24. Arms 20, 22 and central post 24 can each have a conformal bone engaging surface that is complementary to the contours of a corresponding portion of the patient's lower tibia. The bone engaging surfaces can be configured for complementary matching with anatomical surface features of a selected region of the patient's natural bone using patient specific instrument software using images of the patient.

Figure 10:
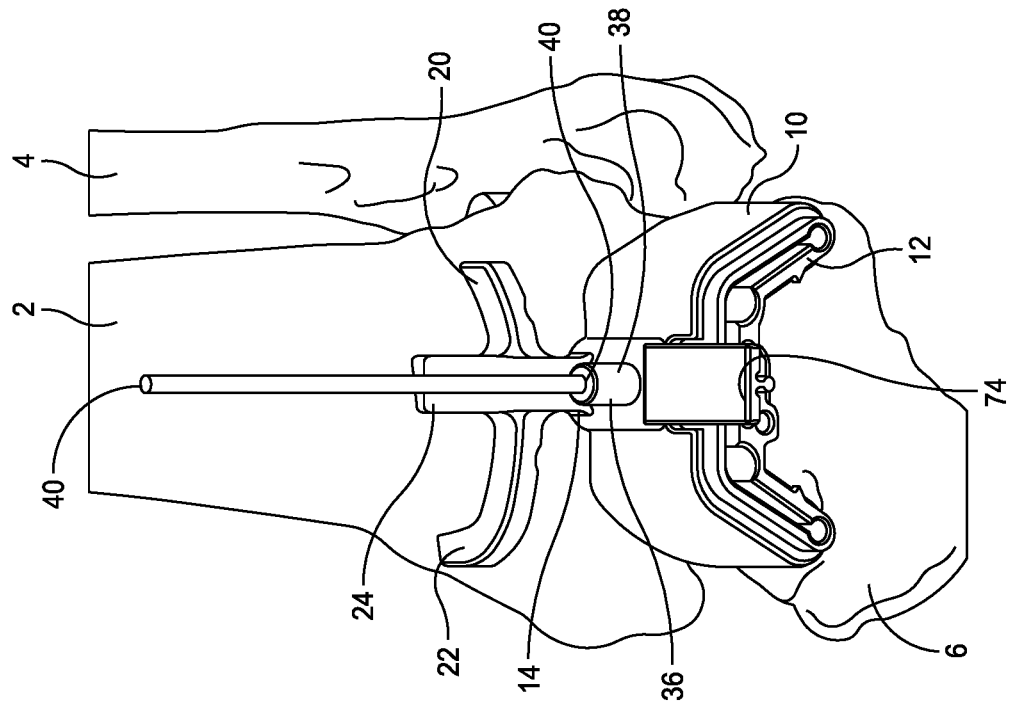
FIG. 10 illustrates a superior perspective view of the medical device and joint of FIG. 9, in accordance with some embodiments.
Figure 9:
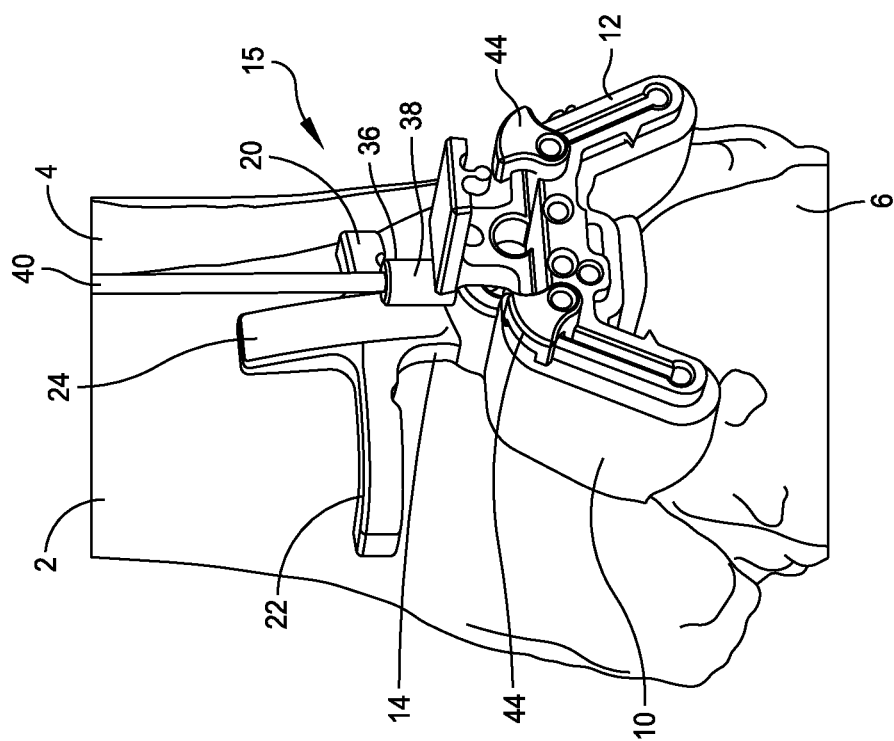
FIG. 9 illustrates an anterior perspective view of the medical device and joint of FIG. 1 having an alignment element inserted into an alignment guide of the guide locator, in accordance with some embodiments.

In some embodiments, the tibial yoke 14 includes one or more guide bodies 26a, 26b (collectively "guide bodies 26") each defining a through-bore 28a, 28b (collectively "through-bores 28") sized and configured to receive a temporary fixation element therethrough. The guide bodies 26 may be formed integrally with the spaced apart arms 20, 22 and/or the central post 24. In the illustrated embodiment, the guide bodes 26 each define a substantially cylindrical body extending from and formed on an inferior surface of the spaced apart arms 20, 22, although it will be appreciated that the guide bodies 26 may include any suitable shape such as, for example, a cuboid, prism, and/or other suitable shape. The through bores 28 may be sized and configured to receive any suitable fixation element, such as, for example, a k-wire, pin, etc. An axis of a through-bores 28, such as a first through-bore 28a, may be parallel and/or may be at an angle with respect to an axis of another of the through-bores 28, such as the second through-bore 28b. As shown in FIGS. 9-10, in some embodiments, the guide bodies 26 may be omitted.

Figure 3:
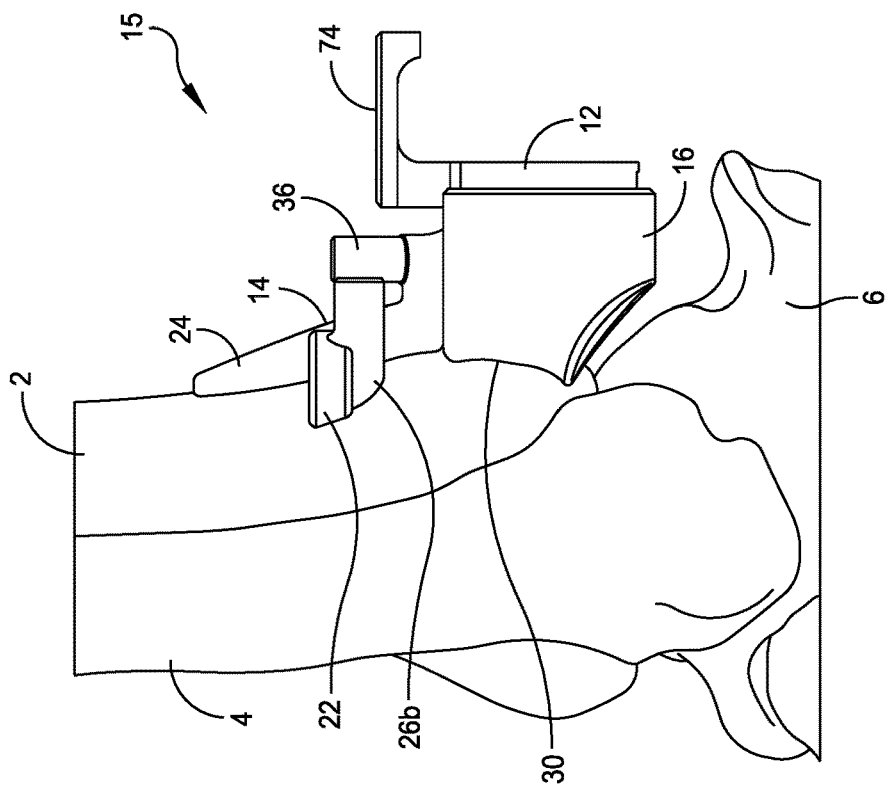
FIG. 3 illustrates a lateral view of the surgical site of FIG. 1, in accordance with some embodiments.
Figure 2:
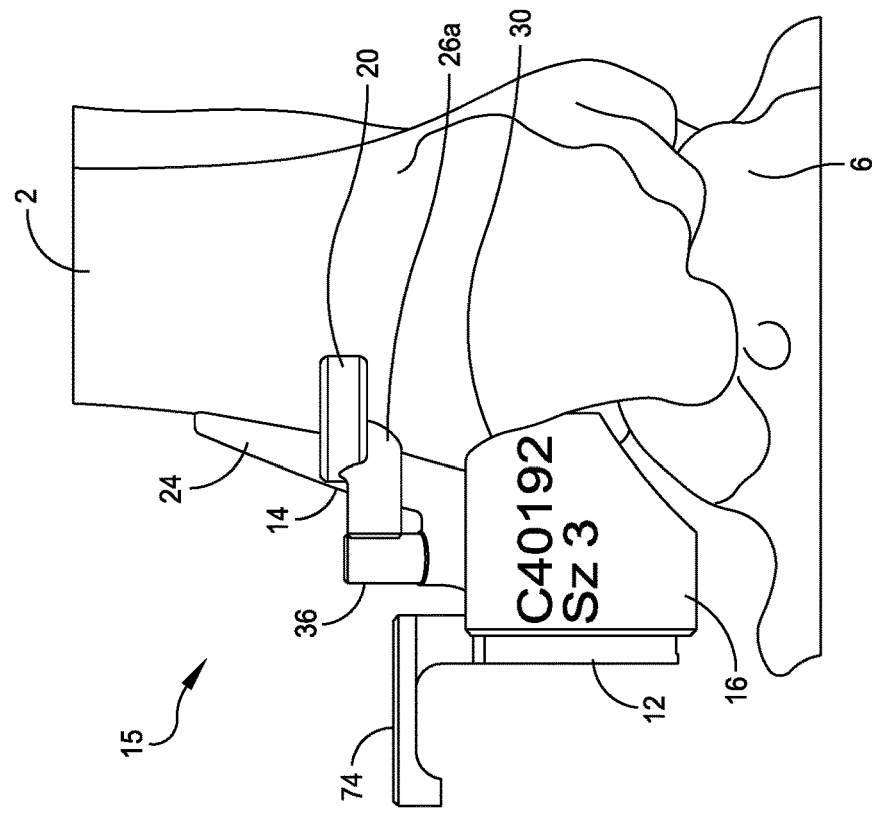
FIG. 2 illustrates a medial view of the surgical site of FIG. 1, in accordance with some embodiments.

The guide locator 10 includes a posterior surface 30 defining a patient-specific contour configured to match one or more anatomical structures of a patient. For example, as shown in FIGS. 2-3, the guide locator 10 includes a posterior surface 30 that is configured to mate with a tibia of a patient, although it will be appreciated that the posterior surface 30 may be configured to mate with any suitable bone depending on the surgical procedure to be performed. In the illustrated embodiment, the posterior surface 30 includes a patient-specific contour defined by each of the tibial yoke 14 and the body 16. It will be appreciated that the patient-specific contour may extend over only a portion of the posterior surface 30 and/or the posterior surface 30 may define multiple patient-specific contours separated by non-contoured portions.

Figure 4:
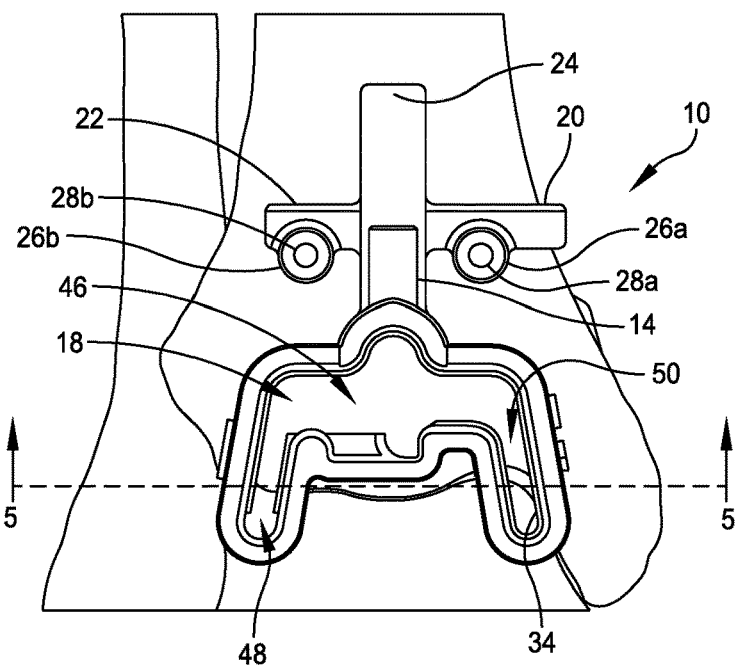
FIG. 4 illustrates an anterior view of the surgical site of FIG. 1 including the guide locator of the medical device without the guide element inserted therein, in accordance with some embodiments.
Figure 5:
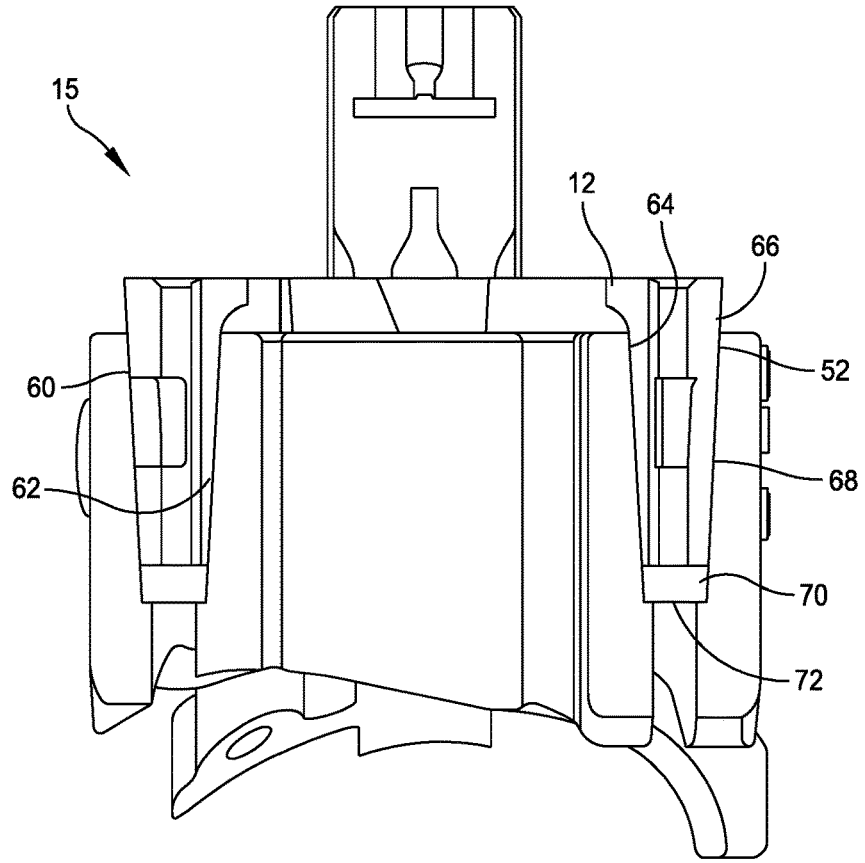
FIG. 5 illustrates a cross-sectional view of the guide locator of the medical device of FIG. 1 taken along line 6-6 in FIG. 5, in accordance with some embodiments.

The guide receptacle 18 is configured to receive at least a portion of the guide element 12 therein. As best shown in FIGS. 4-5, in some embodiments, the guide receptacle 18 defines an inner perimeter 34 having a shape complementary to a perimeter shape of a body 52 of the guide element 12. For example, in the illustrated embodiment, the guide receptacle 18 includes a "U" or winged shape having a central portion 46 and a pair of side portions 48, 50 extend downwardly away from the central portion 46. The guide receptacle 18 is configured to receive a guide element 12 having a similar "U"-shaped body 52 (see FIG. 6). The guide receptacle 18 may be configured to receive a variety of guide bodies each having a "U"-shaped portion configured to be positioned within the guide receptacle, depending on the needs or step of a surgical procedure.

In some embodiments, the guide receptacle 18 defines one or more inner tapered surfaces 60, 62, 64, 66. For example, as shown in FIG. 5, the tapered inner surfaces 60-66 taper from an anterior surface 32 of the base 16 to a posterior surface 30 of the base 16. The tapered inner surfaces 60, 62, 64, 66 are configured to match a taper defined by a portion of a guide element 12, for example, as discussed in greater detail below with respect to FIGS. 6-11. In some embodiments, the guide receptacle 18 is configured to receive a tapered surfaces 60, 62, 64, 66 of a guide element 12 in a press-fit arrangement, although it will be appreciated that other arrangements and/or coupling mechanisms may be used. For example, as discussed in greater detail below, a clip mechanism may be configured to maintain a guide element 12 within a receptacle defined by a guide locator 10. It will be appreciated that the angle of the taper may be varied depending on the desired coupling between the guide locator 10 and the guide element 12. For example, the taper may be formed as a narrow taper (e.g., 6 degrees of taper) and have the ability to secure the assembled components by friction as they are press-fit (e.g., like a Morse taper) and/or a wider angle may be used to allow the components to release or be removed more easily.

In some embodiments, the guide element 12 is partially inserted into the guide receptacle 18 such that a portion of the guide element 12 extends from an anterior and/or posterior surface of the body 16. For example, in some embodiments, a portion of the guide element 12 extends above (e.g., beyond) an anterior surface of the body 16 such that the resection guide 12 is not flush with the anterior surface 32 of the body 16. The resection guide 12 may extend a predetermined distance above the anterior surface 32, such as, for example, sitting substantially 2-3 mm proud, although it will be appreciated that the resection guide 12 may extend any suitable amount beyond the anterior surface 32, may be recessed with respect to the anterior surface 32, and/or may be flush with the anterior surface 32.

In some embodiments, the guide element 12 is inserted partially into the guide receptacle 18 to define a clearance 70 such that the resection guide 12 does not contact the resection guide locator 10 at a back edge 72 and/or is recessed beneath a posterior surface 30 of the body 16. In some embodiments, the clearance 70 prevents contact between a bone and the guide element 12 to prevent disturbing the patient-specific fit of the guide locator 10. In some embodiments, the clearance 70, either alone or in conjunction with the taper, results in a built-in tolerance between the resection guide locator 10 and the resection guide 12 which accommodates manufacturing inaccuracies while consistently achieving a secure press-fit and easy assembly and possible disassembly of the components. The taper may distribute a load across a large surface area, thereby reducing local stress concentrations associated with many surgical procedures (e.g., impacts due to vibrating saws).

In some embodiments, the guide locator 10 includes one or more features configured to be coupled to an alignment reference to confirm alignment of the guide locator 10 with respect to one or more anatomical features. For example, as shown in FIGS. 1 and 9-10, in some embodiments, the guide locator 10 includes a coupling element 36 extending in a superior direction from the body 16 of the guide locator 10. The coupling element 36 includes a body 38 defining an opening 40 sized and configured to receive an alignment wire element 40, such as a k-wire, as illustrated in FIGS. 9-10. In the illustrated embodiment, the coupling element 36 includes a cylindrical body 38, although it will be appreciated that the coupling element 36 may include any suitable shape, such as, for example, any suitable geometric and/or non-geometric shape. As discussed in greater detail below, the guide wire element 40 may be used to confirm alignment of the guide locator 10 prior to and/or during a surgical procedure.

FIGS. 6-8 illustrate a guide element 12, in accordance with some embodiments. The guide element 12 includes a body 52 defining a predetermined shape. The predetermined shape may be similar to and/or complimentary to the shape of a guide receptacle 18 formed in a guide locator 10. For example, in the illustrated embodiment, the guide element 12 includes a "U" or winged shape including a central portion 54 and a pair of side portions 56, 58 extending away (e.g., downwardly) from the central portion 54 that is complimentary to the "U"-shaped guide receptacle 18. In some embodiments, the body 52 includes tapered side surfaces 61, 63 and tapered top and bottom surfaces 65, 67 that correspond to a taper of an inner surfaces 60, 62, 64, 66 defined by the guide receptacle 18. The tapered surfaces 60-67 help to guide the body 52 into the guide receptacle 18 and, in some embodiments, provide a press or other friction fit between the guide element 12 and the guide locator 10.

The guide element 12 may include any suitable surgical guide, such as, for example, a cutting guide, a drilling guide, a resection guide, and/or any other suitable guide. For example, in the illustrated embodiment, the guide element 12 includes a resection guide defining one or more cutting slots 86, support surfaces 89, and/or edges 93 configured to enable resection of a predetermined anatomical structure. For example, in the illustrated embodiment, the guide element 12 includes a continuous resection slot 86 sized and configured to receive a cutting tool therein. The resection slot 86 includes a first slot portion 88 extending along a first axis, a second slot portion 90 extending along a second axis and defined at an angle with respect to the first axis, and a third slot portion 92 extending along a third axis and defined at an angle with respect to the first axis. In the illustrated embodiment, the second angle and the third angle are mirrored around an axis perpendicular to the first axis. Although specific embodiments are illustrated and discussed herein, it will be appreciated that the guide element 12 may define any suitable guide components, such as slots, holes, etc. for guiding one or more tools for performing a surgical procedure.

In some embodiments, the resection slot 86 may be configured to receive one or more additional components and/or elements of a surgical system. The slot 86 can thus be configured as a multi-purpose feature for providing a functional slot for use in the operation and for providing attachment features for connecting other components used during the operation. For example, the slot 86 can include one or more openings or holes 94, 96 for providing a drilling location, pinning location, attachment location, etc. For instance, the slot 86 can include a pair of holes 94, 96 at inferior edges of the guide slot 86. The holes 94, 96 may be used for pinning and/or for inserting a drill to create pilot holes.

The resection guide 12 may include one or more hole 98, 100, 102 for receiving pins, wires, or other temporary fixation elements. For example, in the illustrated embodiment, the resection guide includes a first fixation hole 98 and a second fixation hole 100 having parallel axes configured to guide a temporary fixation element, such as a k-wire, into a bone at an angle orthogonal to the anterior surface 32 of the body 16 and/or an anterior surface of the guide element 12 in two planes.

Figure 64A:
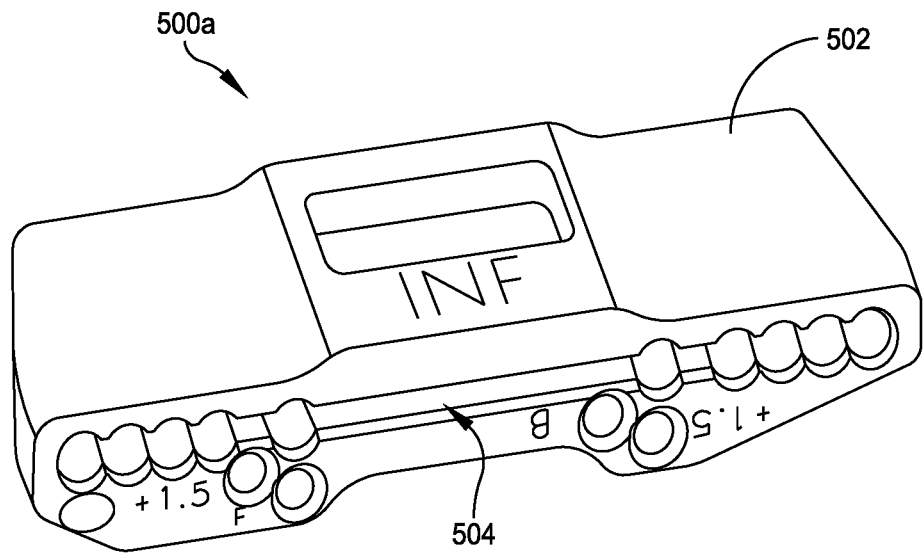
FIG. 64A illustrates a perspective view of the modular guide of FIG. 63 in a first orientation, in accordance with some embodiments.
Figure 64B:
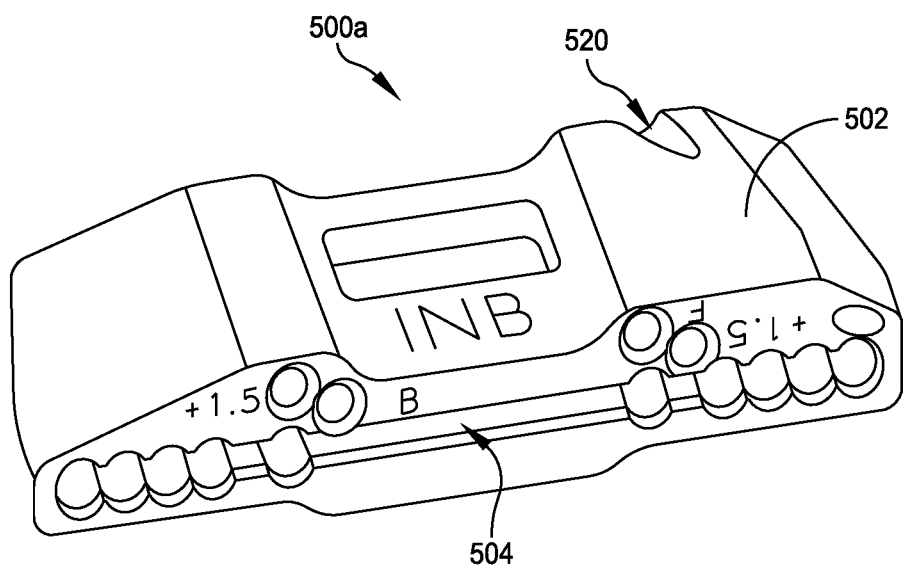
FIG. 64B illustrates a perspective view of the modular guide of FIG. 63 in a second orientation, in accordance with some embodiments.

As another example, in the illustrated embodiment, the resection guide 12 includes at least one angled or oblique channel 102 configured to receive a pin or wire at an angle with respect to the anterior surface 32 of the body 16 and/or an anterior surface of the guide element 12 in at least one plane (see FIG. 48). The oblique channel 102 may be a closed channel and/or an open channel. For example, in some embodiments, the oblique channel 102 may include a recess or scallop configured to receive a pin at least partially therein (for example, as illustrated in FIG. 64B with respect to modular guide 500*a*). The oblique channel 102, and a pin inserted therein, serves to reduce vibration from tools inserted into the guide slot 86 and/or reduces migration between an anatomical structure, e.g., the patient's bone, the guide locator 10, and the guide element 12. The reduction in migration allows for correction of manufacturing inaccuracies while consistently achieving a secure press-fit and easy assembly/disassembly of the components in-situ.

In some embodiments, the guide element 12 may include one or more alignment features configured to provide visual alignment of the medical device 15 and/or a portion of the medical device 15. For example, the guide element 12 may include one or more visual elements to provide verification that the medical device 15 is correctly positioned relative to a patient. In other embodiments, the guide element 12 is configured to be coupled to one or more alignment references configured to provide an alignment indication with respect to one or more anatomical features.

Figure 11:
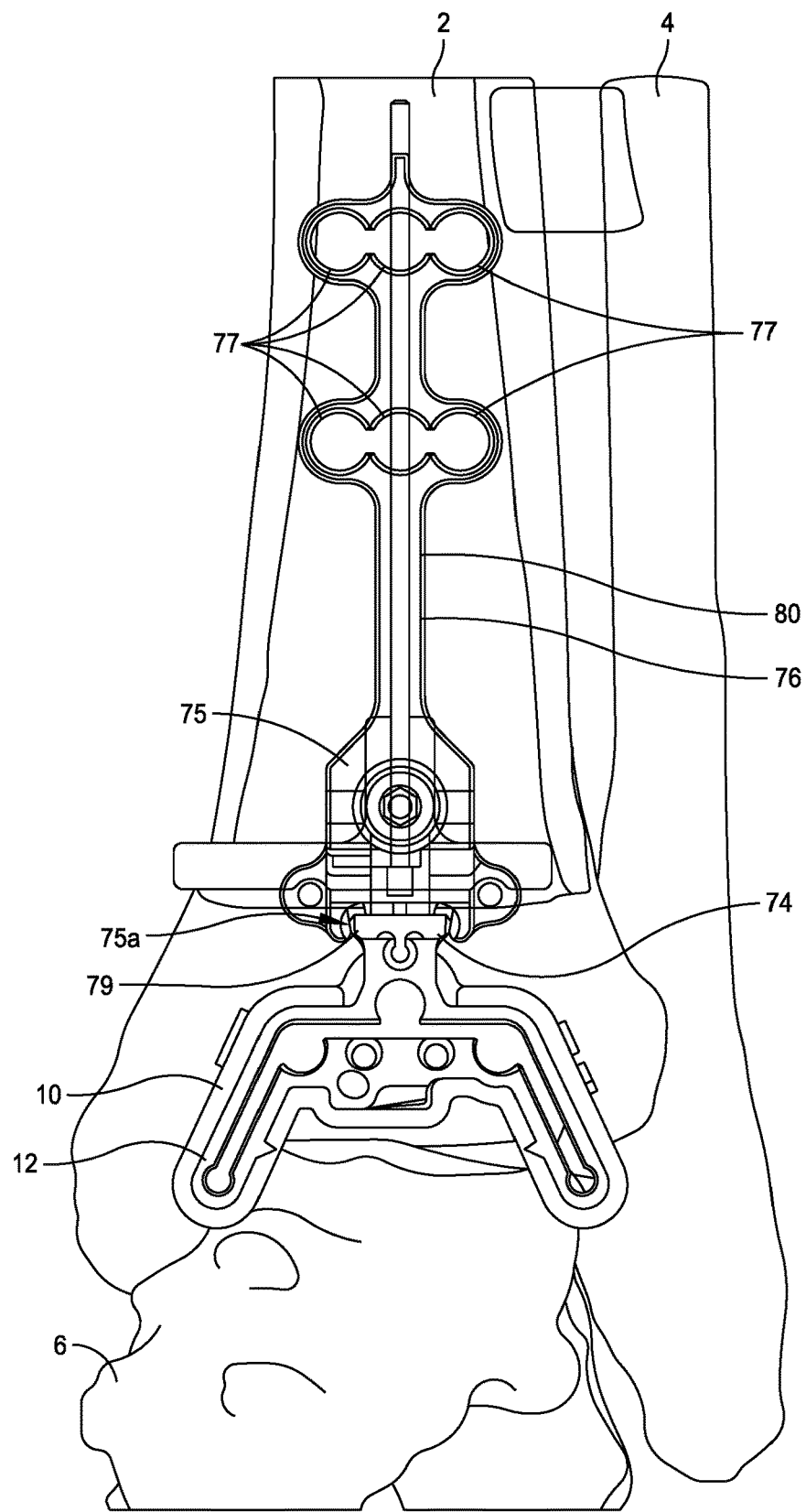
FIG. 11 illustrates an anterior view of the medical device and joint of FIG. 9 including a reference component coupled to the guide element, in accordance with some embodiments.

For example, in some embodiments, the guide element 12 includes one or more built-in or integral alignment features. In some embodiments, the integral alignment feature includes a cavity 83 defined in a first side of a block 74 and a projection 85 at a second side of the block 74. In the illustrated embodiment, the projection 85 is positioned at a proximal end of the block 74 and the cavity is formed in a distal portion of the block 74, although it will be appreciated that other arrangements are possible. The cavity 83 and the projection 85 may include a similar shape and be positioned such that in a straight-on view, the projection 85 is aligned in a center of the cavity 83, for example as shown in FIG. 11. If the resection guide 12 is angled and/or not properly aligned, the projection 85 will not be centered with respect to the cavity 83, for example, as can be seen in FIG. 6 showing the guide element 12 at an angle. The block 74 may thus provide a fluoroscopic and/or visual alignment feature for positioning the resection guide locator 10 (or 10*a* or 10*b*) and resection guide 12.

In some embodiments, the block 74 defines first and second cutouts 87*a*, 87*b* positioned adjacent to the projection 85 at a proximal end of the block 74. The cutouts 87*a*, 87*b* are configured to provide additional visual indications and/or provide easier view of the cavity 83 to facilitate alignment of the guide element 12. In some embodiments, the cutouts 87*a*, 87*b* may be omitted.

In some embodiments, the integral alignment feature includes one or more joint line reference cues 91 for aligning the patient's talus with the resection guide locator 10. For example, a surgeon may position the talus in the desired flexion angle, and with the desired varus-valgus alignment of the joint line relative to the reference cues 91, to ensure proper alignment of the joint space and tibia prior to performing a surgical procedure and/or prior to inserting temporary fixation elements.

In some embodiments, guide element 12 is configured to be coupled to one or more additional alignment references. For example, as illustrated in FIG. 11, the block 74 of the guide element 12 is configured to couple to an alignment reference, such as an elongated alignment component 76. The alignment component 76 may be a conventional alignment reference having rings 77 for fluoroscopic alignment with boundaries of the tibia. The block 74 may include a dovetail connection 79 or other connector for securing the resection guide 12 to the component 76 via a sliding, press-fit, and/or fastener connection. For example, in some embodiments, the block 74 includes a dovetail connector 79 and the alignment component 76 includes a coupling body 75 defining a dovetail opening 75*a* sized and configured to receive the dovetail connector 79 therein. In some embodiments, the rings 77 may be sized and configured to receive a temporary fixation element, such as a k-wire, pin, or other temporary fixation element therethrough.

Figure 12:
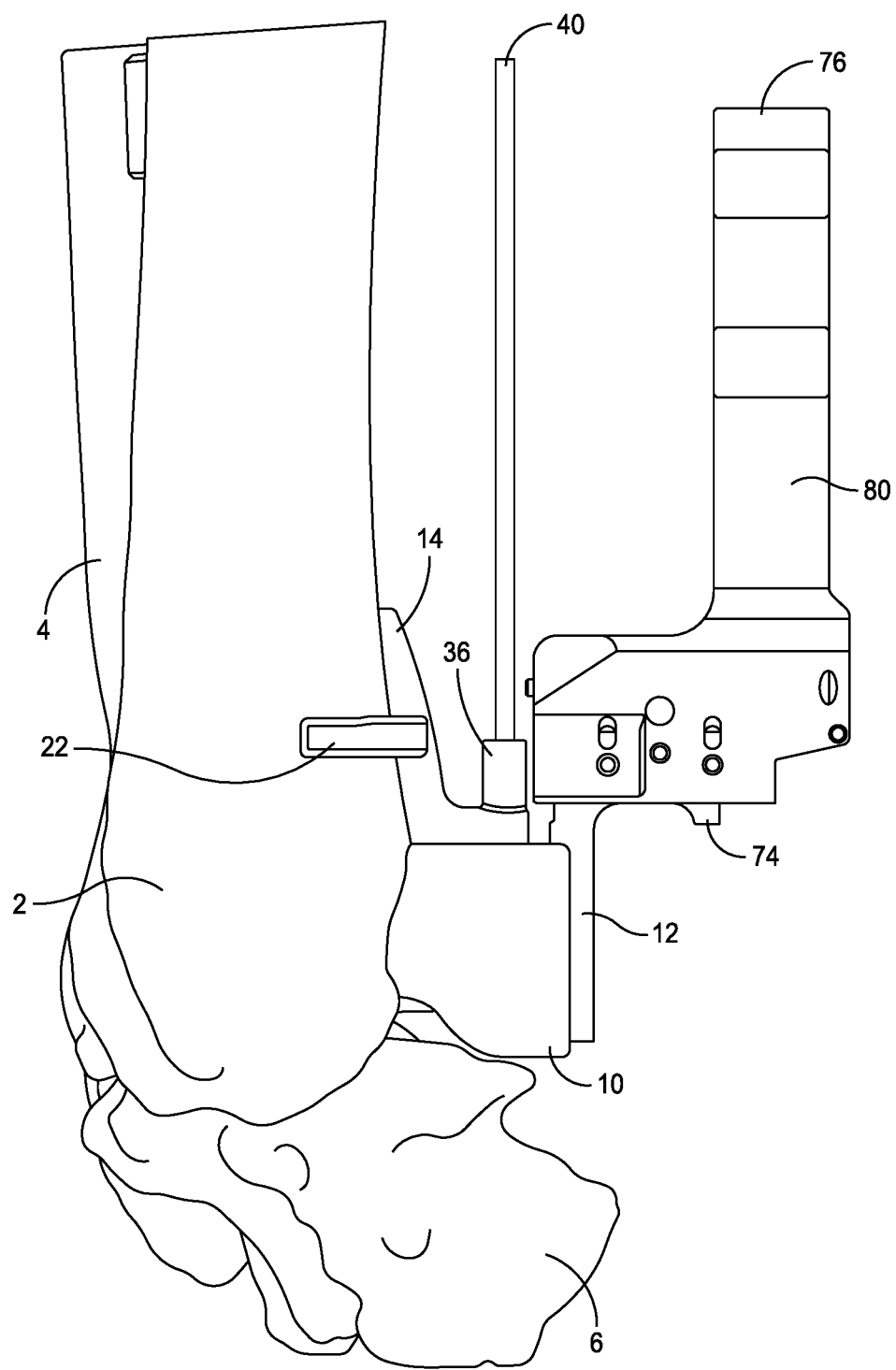
FIG. 12 illustrates a medial view of the medical device and joint of FIG. 11, in accordance with some embodiments.

The alignment features of the guide element 12 and/or the guide locator 10 may be used separately and/or in combination to manually position the resection guide locator 10 with respect to a surgical site. For example, as illustrated in FIGS. 11-12, the alignment wire element 40 may be used in conjunction with the alignment component 76, the cavity 83, the projection 85, and/or the reference cues 91 to ensure proper alignment of the guide locator 10 and the guide element 12, each independently and in combination. The alignment wire element 40 and the alignment component 76 may be used to independently verify alignment with a long axis of a bone, such as a tibia, and also to verify alignment with each of the other alignment wire element 40 or alignment component 76. Similarly, the cavity 83 and projection 85 may be used to ensure proper alignment of the guide element 12 relative to a portion of the tibia and the reference cues 91 may be used to verify alignment of the tibia and/or guide element 12 with a portion of a talus. It will be appreciate that any suitable combination of reference elements and/or referenced locations may be used to ensure proper alignment of the medical device 15 prior to performing one or more additional surgical steps.

In some embodiments, the surgical element 12 defines one or more openings configured to receive additional guide elements for guiding or arresting movement of one or more surgical elements. For example, as shown in FIGS. 1, 6, and 13, in some embodiments, the surgical guide 12 includes corner sockets 42a, 42b (collectively "corner sockets 42") each sized and configured to receive a corner protector 44 therein. The corner sockets 42 define holes or larger openings formed in the periphery of the slot 86 defined by the guide element 12. The corner protectors 44 are configured to prevent movement of an instrument, such as a cutting instrument, beyond a predetermined position within the slot 86, for example, to prevent excursion deeper into a bone than required.

As illustrated in FIG. 14, the corner protectors 44 each include a tubular body 138 extending from a first end 139a to a second end 139b. The first end 139a defines a tapered end portion 141 configured to guide and/or assist insertion of the corner protectors 44 within the corner sockets 42. A head element 142 may be formed at and/or coupled to a second end 139b of the tubular body 138. The head element 142 may define an arcuate shape extending over a portion of the circumference of the tubular body 138. In some embodiments, the head element 142 includes cutouts 144a, 144b sized and configured to allow an instrument, such as a cutting instrument, to be positioned within a slot immediately adjacent to and/or in contact with the tubular body 138. In some embodiments, the corner protectors 44 may be cannulated, for example, including a tubular opening 140 configured to receive a pin or other element therein. The corner protectors 44 may be inserted prior to, during, and/or after insertion of a guide pin or other element within the tubular opening 140.

FIGS. 15-18 illustrate corner protectors 44a-44d, in accordance with some embodiments. The corner protectors 44a-44d are similar to the corner protectors 44 discussed previously, and similar description is not repeated herein. The corner protector 44b includes a rectangular body 138a defining a plurality of tubular openings 140a, 140b extending through the rectangular body 138a. The corner protector 44b includes a flat planar extension 146 extending from an upper portion of the rectangular body 138a that is sized and configured for insertion into the slot 86 of the guide element 12.

Figure 16:
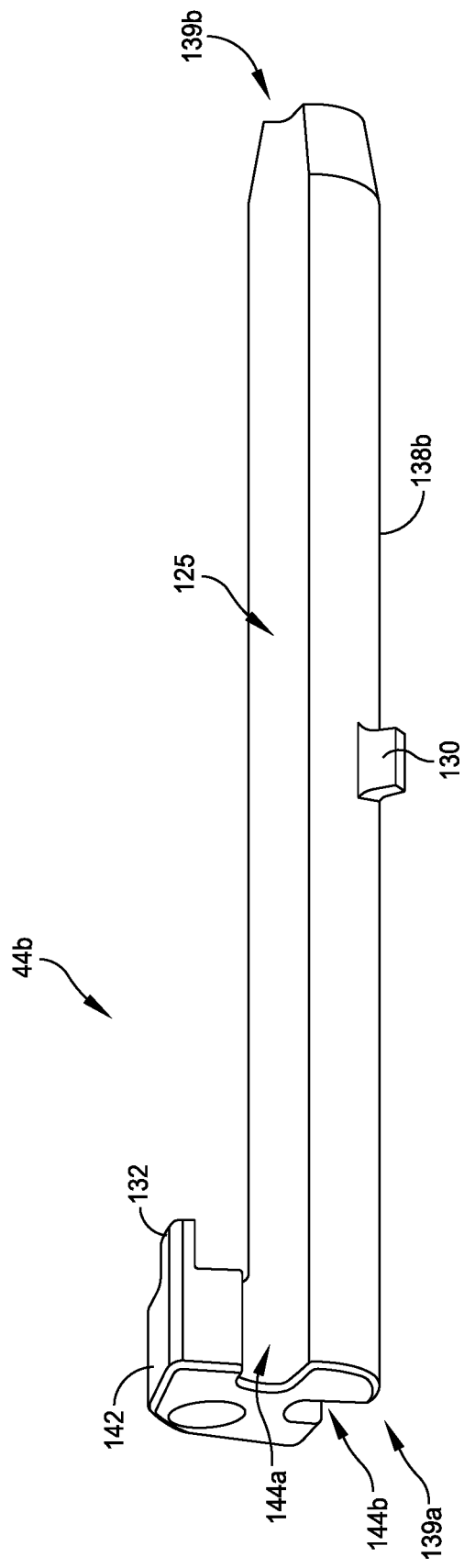
FIG. 16 illustrates a corner protector including notches or grooves configured to provide access to a cutting tool, in accordance with some embodiments.
Figure 19:
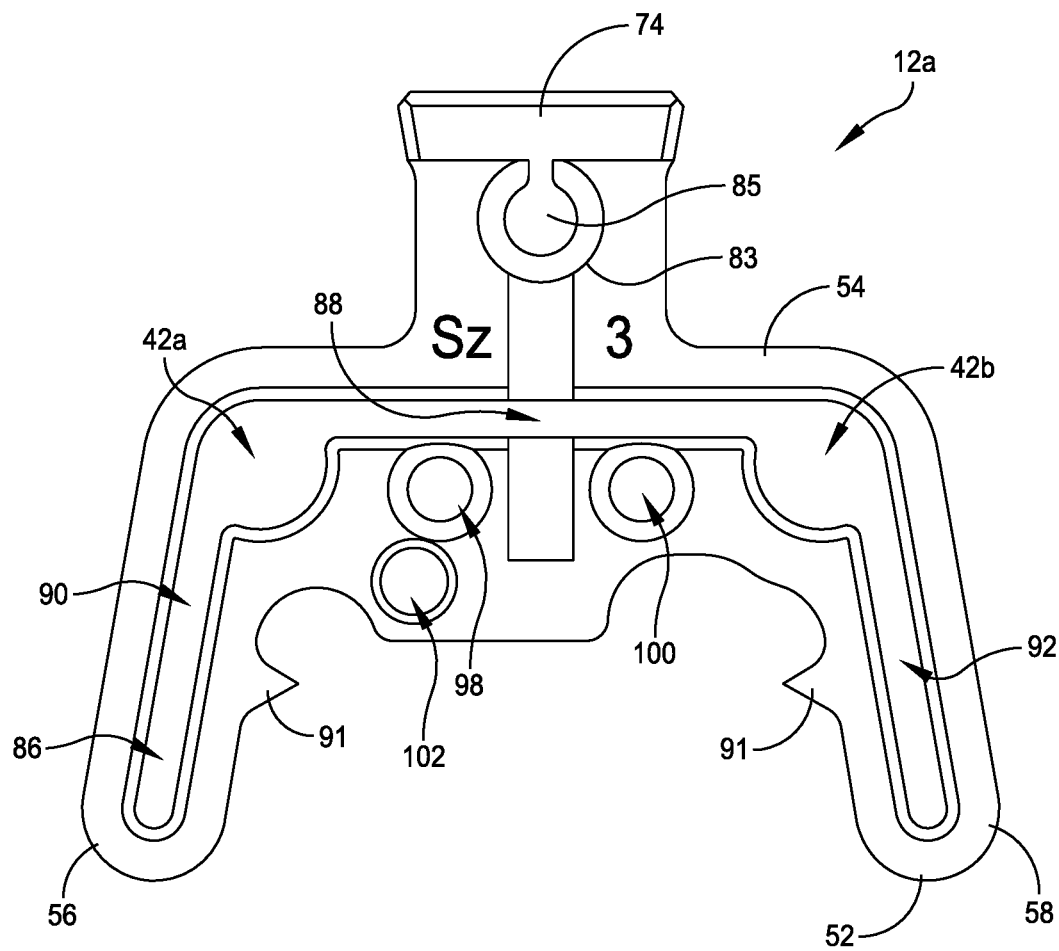
FIG. 19 illustrates a front view of a guide element configured for insertion into a guide locator, in accordance with some embodiments
Figure 20:
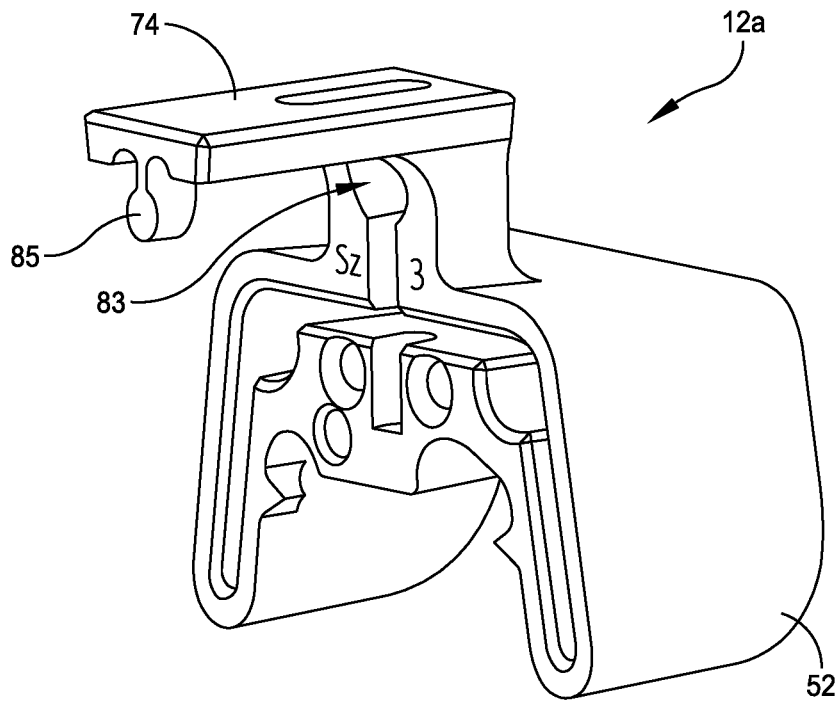
FIG. 20 illustrates a side perspective view of the guide element of FIG. 19, in accordance with some embodiments
Figure 21:
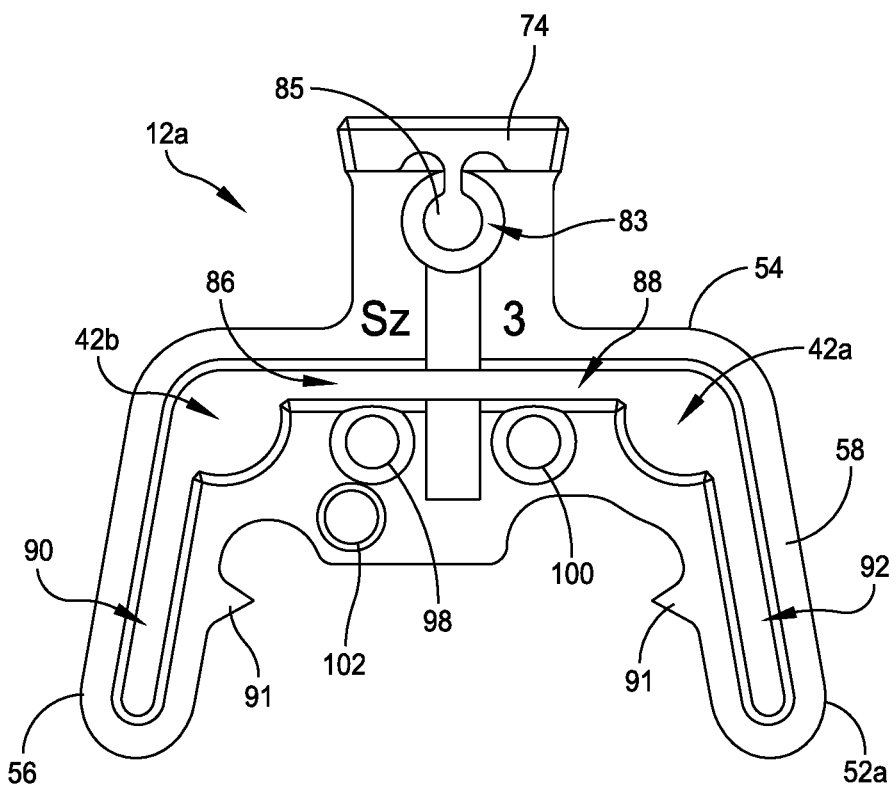
FIG. 21 illustrates a front view of the guide element having a proper alignment between a cavity and a projection, in accordance with some embodiments.

FIG. 16 illustrates a corner protector 44b including notches or grooves 125 along the shaft 128 of the corner protectors 44c so that sawing can go all the way up to a tangent on the drilled out corner of the resection guide 12, but not further. The notches 125 may correspond to the location of the cutouts 144a, 144b formed in the head element 142. The corner protector 44b can be configured to lock in place through insertion into a portion of the slot 86. For instance the corner protector 44b can include an elongated body 138b with a locking feature configured to lock against a surface of the resection guide 12 after insertion. In some embodiments, the locking feature includes a bayonet tab 130 configured to be rotated into place and thereby prevent removal of the corner protector 44b after insertion into the guide element 12. In some embodiments, the locking feature may further comprise a shoulder tab 132 which inhibits the peg from rotating by hooking over the shoulder of the saw guide. The shoulder tab 132 may be configured to align the grooves 125 with the slots 88, 90, 92 of the guide element 12.

FIG. 17 illustrates a corner protector 44c including a solid elongated body 138c. The corner protector 44d includes grooves 125 and a shoulder tab 132 similar to those of the corner protector 44c previously discussed. The corner protector 44d does not include a cannulation or other opening, but instead includes a solid, closed elongated body 138c. The corner protector 44d may be used when insertion of a pin or other elongate element is not required or desired.

FIG. 18 illustrates a corner protector 44d including a locking mechanism including a flexible tab 134. During insertion of the corner protector 44d, the flexible tab 134 is flexed out of plane to allow insertion of the corner protector 44d through the guide element 12. Once the corner protector 44d is inserted a sufficient amount, the flexible tab 134 returns to an original position and the retention tab 136 is positioned on a distal side of the guide element 12. The retention tab 136 maintains the corner protector 44d in a fixed position with respect to the guide element 12.

In some embodiments, a guide locator 10 and/or a guide element 12 may be selected and temporarily pinned to the patient to guide one or more surgical procedures, such as, for example, cutting and/or drilling procedures, resection procedures, etc. In some embodiments, a drill may be inserted through corner sockets 42 to form starting holes and resection cuts may be formed subsequently following the slot 86 adjacent to the corner sockets 42. In some embodiments, the corner protectors 44 are inserted into the drilled-out corner holes to limit resection cuts to entering the drilled-out holes but not going further into the bone.

FIGS. 19-25 illustrates a guide element 12a configured for insertion into a guide locator 10, in accordance with some embodiments. The guide element 12a is similar to the guide element 12 previously discussed, and similar description is not repeated herein. The guide element 12a includes similar features as the guide element 12, but omits the holes located at inferior ends of the slot 86a. The slot 86a defines a continuous spacing slot from the inferior end to the corners. It will be appreciated that the guide element 12a functions similarly to the guide element 12 in all other respects.

Figure 23:
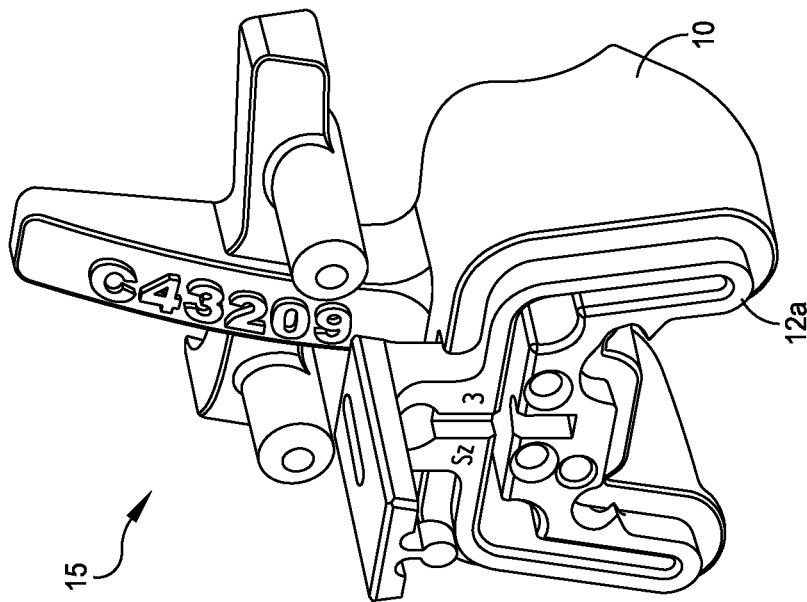
FIGS. 22-23 illustrate insertion of the guide element of FIG. 19 into the guide locator of the medical device of FIG. 1, in accordance with some embodiments.
Figure 22:
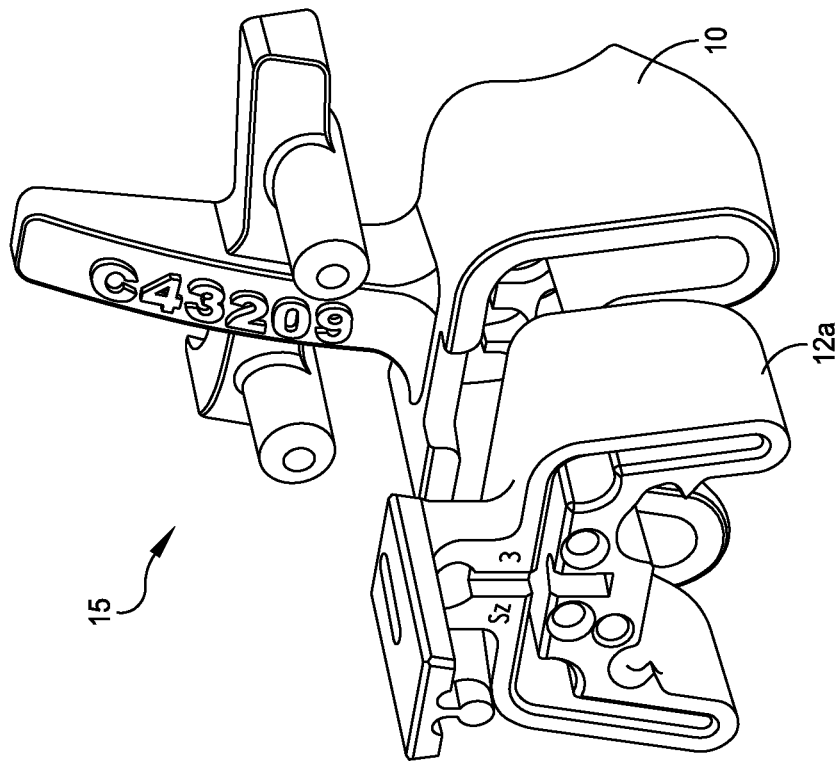

FIGS. 22-23 illustrate insertion of the guide element 12a into the guide locator 10. As illustrated in FIGS. 22-23, the guide element 12a is aligned with the guide receptacle 18. After being aligned, the tapered body 52 of the guide element 12 is inserted into the guide receptacle 18 and is retained in a press-fit arrangement. The guide element 12a may be removed and replaced with one or more other guide elements, such as the guide elements discussed herein.

Figure 24:
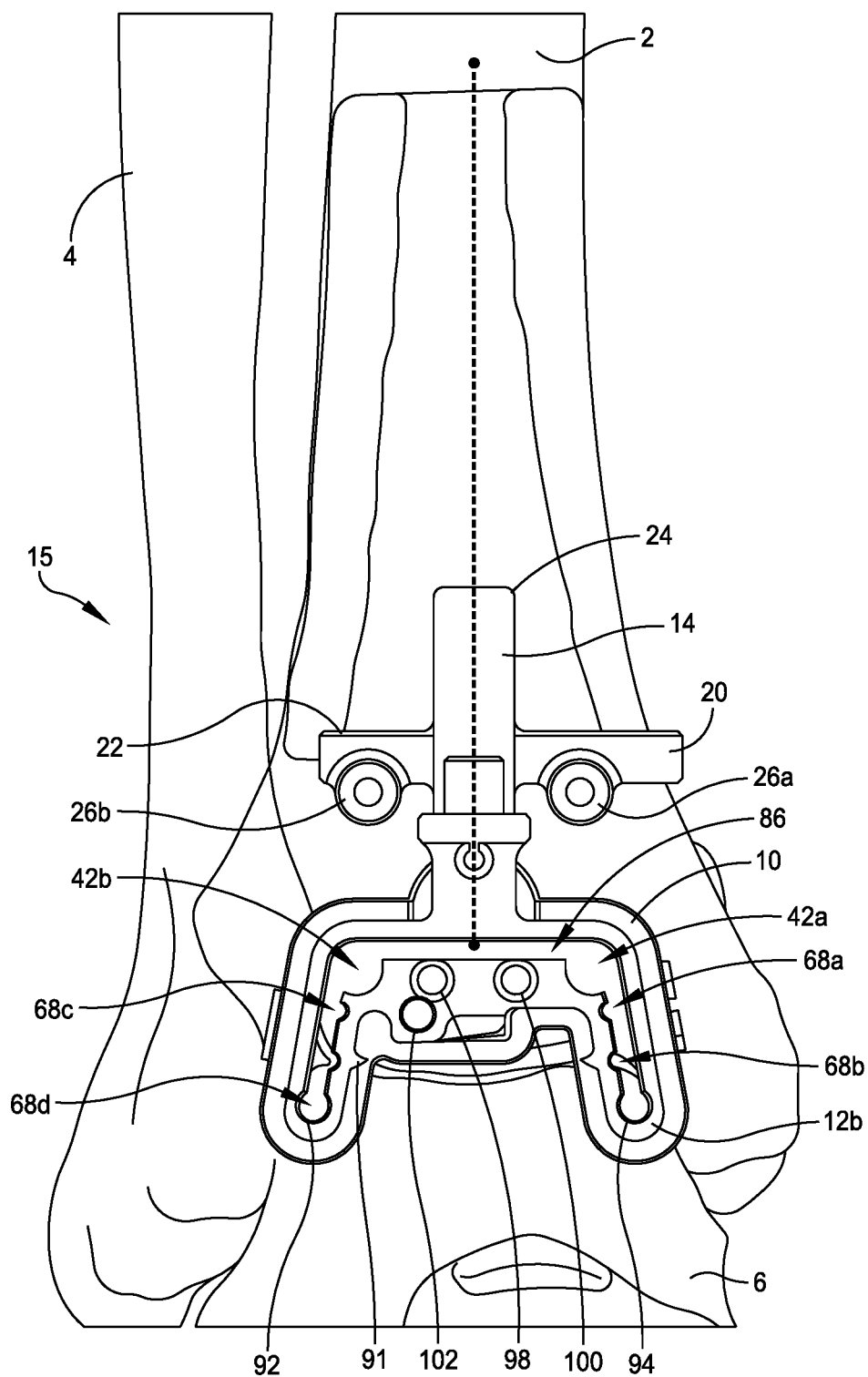
FIG. 24 illustrates a guide element coupled to the guide locator of the medical device of FIG. 1, in accordance with some embodiments.
Figure 25A:
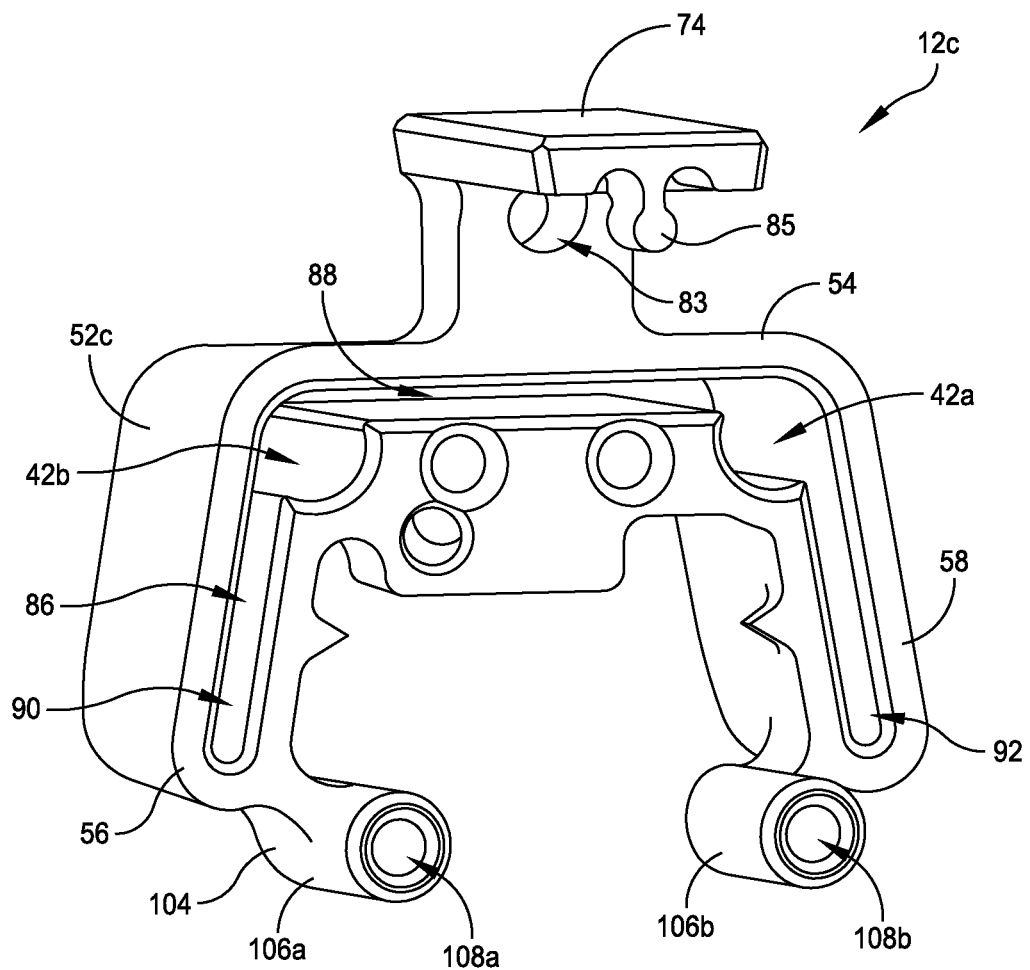
FIG. 25A illustrates a front perspective view of a guide element defining a resection slot and a plurality of talar pin guides, in accordance with some embodiments.

FIG. 24 illustrates a guide element 12b coupled to the guide locator 10, in accordance with some embodiments. The guide element 12b is similar to the guide elements 12, 12a discussed previously, and similar description is not repeated herein. The guide element 12b includes additional scallop cuts 68a-68d formed in an inner surface of the slot 86b. In some embodiments, the scallop cuts 68a-68d provide mounting locations for coupling a modular guide to the guide element 12b, for example, as discussed in greater detail with respect to FIGS. 56-57 below. In some embodiments, the scallop cuts 68a-68d may alternatively and/or additional be configured to provide a drilling location for insertion of a drill prior to insertion of a cutting tool, visual confirmation of positioning of a cutting tool against a bone prior to forming a cut, and/or provide relief to the cutting tool during transition in the slot 86b. The guide element 12b functions similar to the guide 12 previously discussed.

Figure 26:
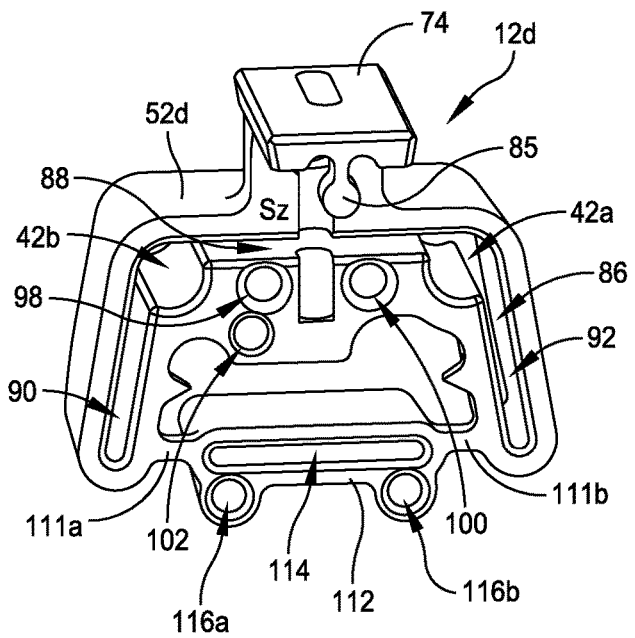
FIG. 26 illustrates a front perspective view of a guide element defining a first resection slot, a plurality of talar pin guides, and a second resection slot, in accordance with some embodiments.

FIG. 26 illustrates a guide element 12c configured for insertion into a guide locator 10, in accordance with some embodiments. The guide element 12c is similar to the guide elements 12-12b discussed previously, and similar description is not repeated herein. The guide element 12c includes a plurality of secondary pin guides 106a, 106b coupled to and/or extending from an inferior portion of the body 52 of the guide element 12c. Each of the secondary pin guides 106a, 106b includes a tubular body 104 defining a channel 108a, 108b extending from a superior surface to an inferior surface of the secondary pin guides 106a, 106b.

In the illustrated embodiment, the secondary pin guides 106a, 106b are talar pin guides configured to receive a temporary fixation and/or guide element, such as a k-wire, therethrough. When the guide element 12c is coupled to a guide locator 10 correctly positioned with respect to an ankle joint, the secondary pin guides 106a, 106b are configured to position k-wires at predetermined positions with respect to a second bone, such as a talus. Although embodiments are discussed herein including talar pin guides, it will be appreciated that the secondary pin guides 106a, 106b can be positioned at any suitable location based on the joint and/or bones configured to receive a temporary fixation and/or guide element therein.

Figure 27:
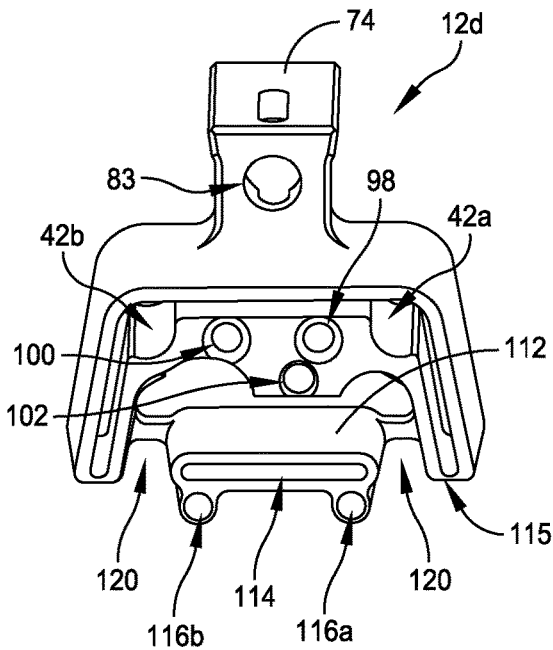
FIG. 27 is a rear view of the guide element of FIG. 26, in accordance with some embodiments.
Figure 28:
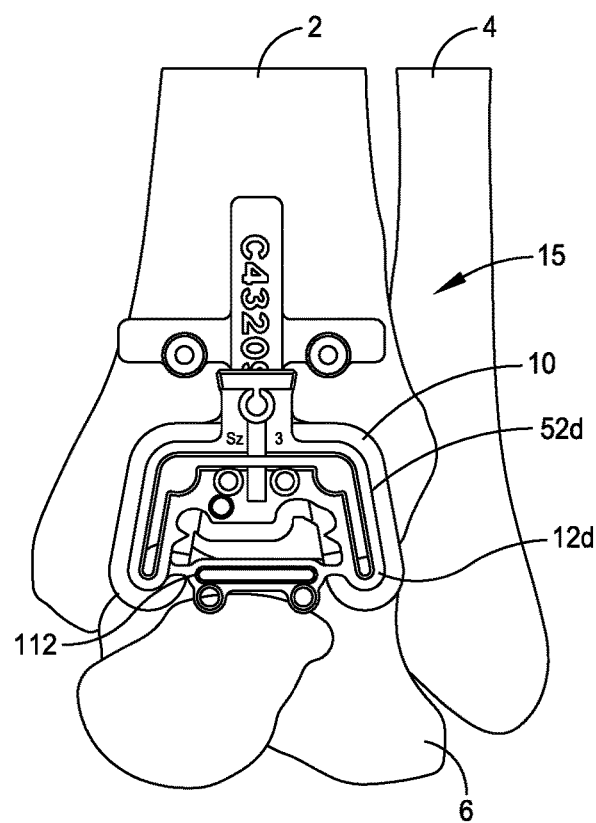
FIG. 28 illustrates the guide element of FIG. 26 coupled to the guide locator of the medical device of FIG. 1, in accordance with some embodiments.

FIGS. 26-28 illustrate a guide element 12d including a secondary guide body 112 configured to guide an additional cut in one or more additional bones, in accordance with some embodiments. The guide element 12d is similar to the guide element 12c previously discussed, and similar description is not repeated herein. The guide element 12d includes a secondary guide body 112 coupled to an inferior portion of the body 52d. The secondary guide body 112 is coupled to the body 52d by a plurality of extensions 111a, 111b. The secondary guide body 112 defines a second slot 114. In some embodiments, the extensions 111a, 111b are recessed with respect to the posterior surface 115 of the guide element 12d in order to provide clearance 120 for insertion of the guide element 12d into a guide receptacle 18.

In the illustrated embodiment, the second slot 114 is perpendicular with the central portion 88 of the first slot 86, although it will be appreciated that the second slot 114 may be disposed at an angle with respect to the central portion 88 of the first slot 86. The second slot 114 may be configured to guide a cut in one or more additional bones 6. For example, in the illustrated embodiment, the secondary guide body 112 is a tibial resection guide having a first slot 86 configured to guide a first cut in a tibia and the second slot 114 is configured to guide a cut in a second bone, such as a talus. The guide element 12d provides a combined resection guide for cutting the tibia and the talus using one guide.

The secondary guide body 112 includes a plurality of pin guide holes 116a, 116b. The pin guide holes 116a, 116b are similar to the secondary pin guides 106a, 106b previously discussed. The pin guide holes 116a, 116b are configured to position one or more temporary fixation and/or guide elements in a bone. For example, in the illustrated embodiment, the pin guide holes 116a, 116b are configured to guide insertion of guide pins into a second bone, such as a talus. Although embodiments are illustrated including the secondary guide body 112 being positioned for guiding a cut and/or pin insertion into a talus, it will be appreciated that the secondary guide body 112 may be positioned at any suitable location to guide elements with respect to one or more bones at a surgical site.

Figure 29B:
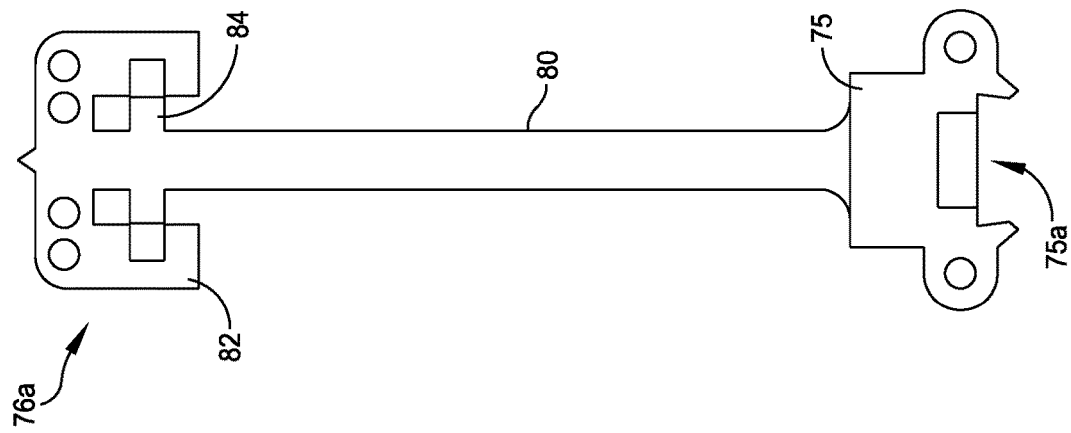
FIGS. 29A-29B illustrate an embodiment of a reference component, in accordance with some embodiments.
Figure 29A:
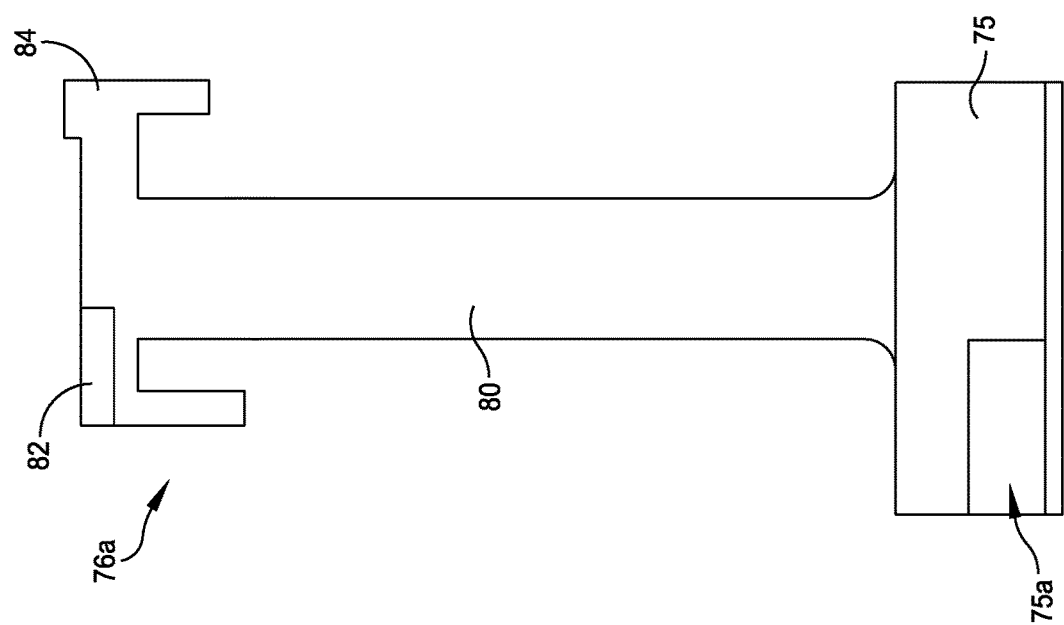
Figure 30:
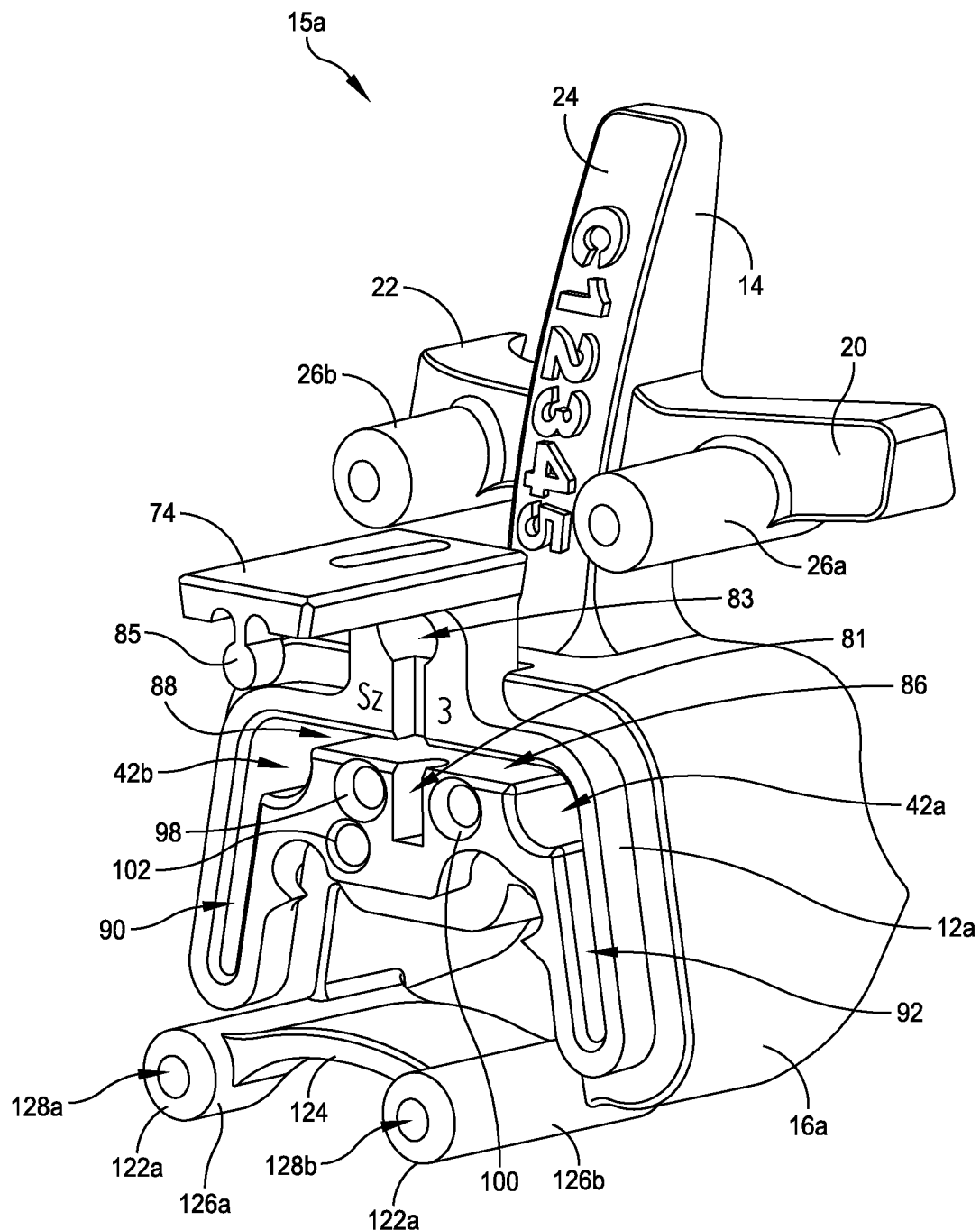
FIG. 30 illustrates a front perspective view of a medical device including a guide locator configured to receive a guide element therein and having a plurality of pin guides formed integrally therewith, in accordance with some embodiments.

FIGS. 29A-29B illustrate an embodiment of a reference component 76a, in accordance with some embodiments. The reference component 76a is similar to the reference component 76 previously discussed, and similar description is not repeated herein. The reference component 76a includes a main post 80, a rear portion 82 on a first side of the post 80 and a front portion 84 on a second, opposite side of the post 80. When viewed from a straight-on angle, the rear portion 82 and the front portion align to form the checkerboard pattern, for example, as shown in FIG. 29B. In this way, the reference component 76a can provide an alignment check (e.g., fluoroscopically) in two dimensions (e.g., vertically via the post 80 and in the sagittal plane via alignment of the rear portion 82 and front portion 84 to match the pattern shown in FIG. 29B.). The reference component 76a may also include a connection feature 75a, such as a dovetail connector for securing to the block 74.

FIGS. 30-33 illustrate a medical device 15a including a guide locator 10a configured to receive a guide element 12a therein and a plurality of pin guides 122a, 122b, in accordance with some embodiments. The medical device 15a and guide locator 10a are similar to the medical device 15 and guide locator 10 discussed previously, and similar description is not repeated herein. The guide locator 10a includes a plurality of pin guides 122a, 122b coupled by an arced connector 124. The pin guides 122a, 122b extend from an inferior portion of the body 16a. In the illustrated embodiment, the pin guides 122a, 122b include a plurality of tubular bodies 126a, 126b each defining a pin channel 128a, 128b therethrough. The pin channels 128a, 128b exted from a proximal, or anterior, surface to a distal, or posterior, surface.

Figure 31:
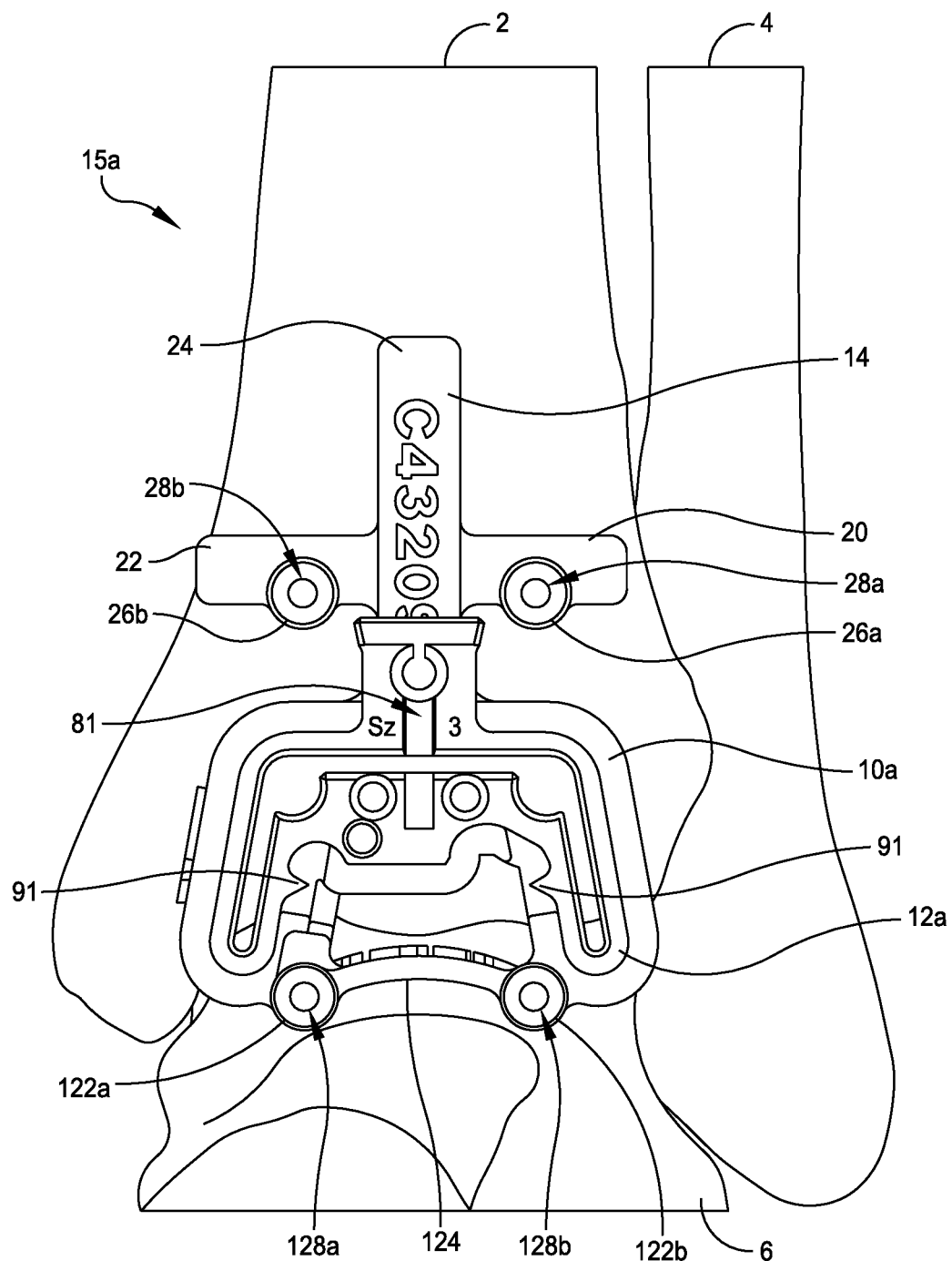
FIG. 31 illustrates an anterior view of the medical device of FIG. 30 positioned adjacent to a surgical site, in accordance with some embodiments.
Figure 33:
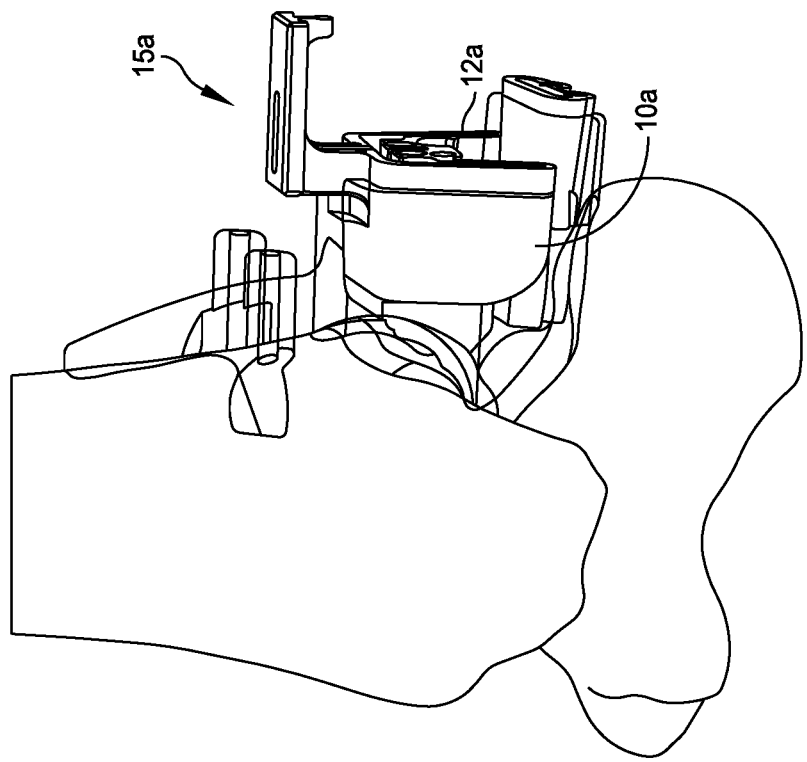
FIG. 33 illustrates a medial perspective view of the surgical site of FIG. 31, in accordance with some embodiments.

As shown in FIG. 31, when the guide locator 10a is properly positioned with respect to a first bone, such as a tibia, the pin guides 122a, 122b are positioned and configured to guide insertion of guide pins into a second bone, such as a talus. Proper positioning of the guide locator 10a may be accomplished by a patient-specific surface and/or one or more alignment features, as discussed previously with respect to medical device 15. In some embodiments, alignment features, such as reference cues 91, are configured to provide visual alignment verification of the second bone prior to insertion of the guide pins into the second bone.

Figure 32:
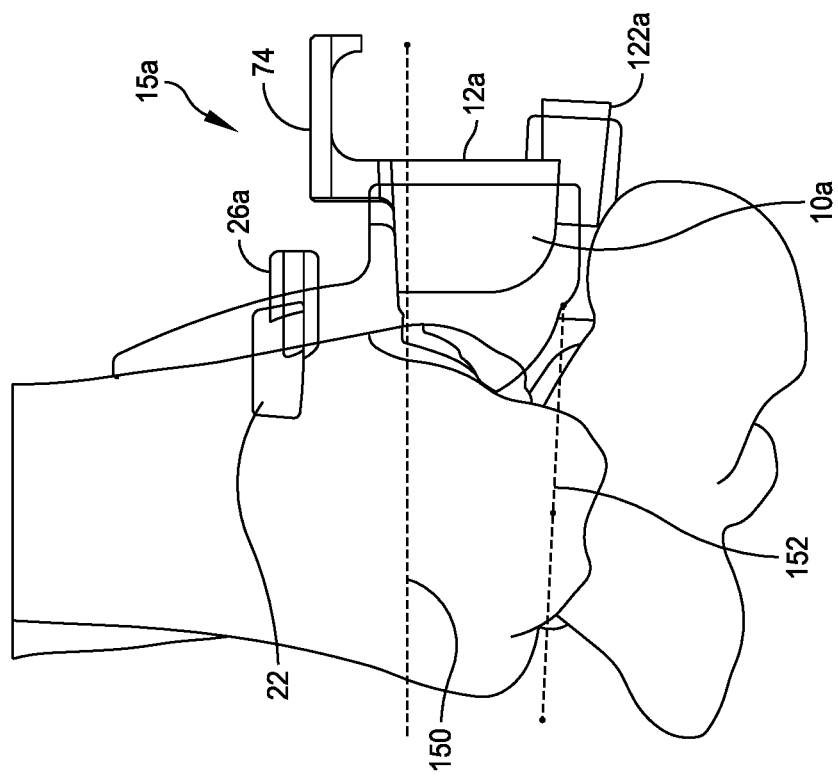
FIG. 32 illustrates a medial view of the surgical site of FIG. 31, in accordance with some embodiments.

FIG. 32 illustrates the insertion trajectory of temporary guide/fixation elements inserted through the guide holes 98, 100 defined in the guide element 12a and the insertion trajectory of temporary guide/fixation elements inserted through the pin channels 128a, 128b, in accordance with some embodiments. In the illustrated embodiment, the guide holes 98, 100 each define a parallel trajectory illustrated by a first trajectory line 150 and the pin channels 128a, 128b each define a parallel trajectory illustrated by the second trajectory line 152. In the illustrated embodiment, the first trajectory line 150 and the second trajectory line 152 are disposed at an angle, although it will be appreciated that the trajectory lines 150, 152 may be parallel in some embodiments.

FIGS. 34A-50 illustrate various steps of a method of performing a tibial resection using a medical device, such as the medical device 15a previously discussed. Although embodiments are discussed herein including the use of medical device 15a, it will be appreciated that the method described in conjunction with FIGS. 34A-50 may be used with any of the medical devices 15, 15a described herein. Certain steps may be omitted and/or modified to accommodate one or more differences between the various embodiments disclosed herein.

FIGS. 34A-34C illustrate a process of inserting a guide element 12a into a guide receptacle 18a defined by a guide locator 10a, in accordance with some embodiments. As previously discussed, the guide element 12a may be inserted into the receptacle 18a using a press-fit or other friction-fit engagement. In the illustrated embodiment, the guide element 12a includes a tapered body 52a sized and configured to interface with the tapered walls of the receptacle 18a to maintain the guide element 12a in a predetermined, fixed position with respect to the guide locator 10a.

Figure 35:
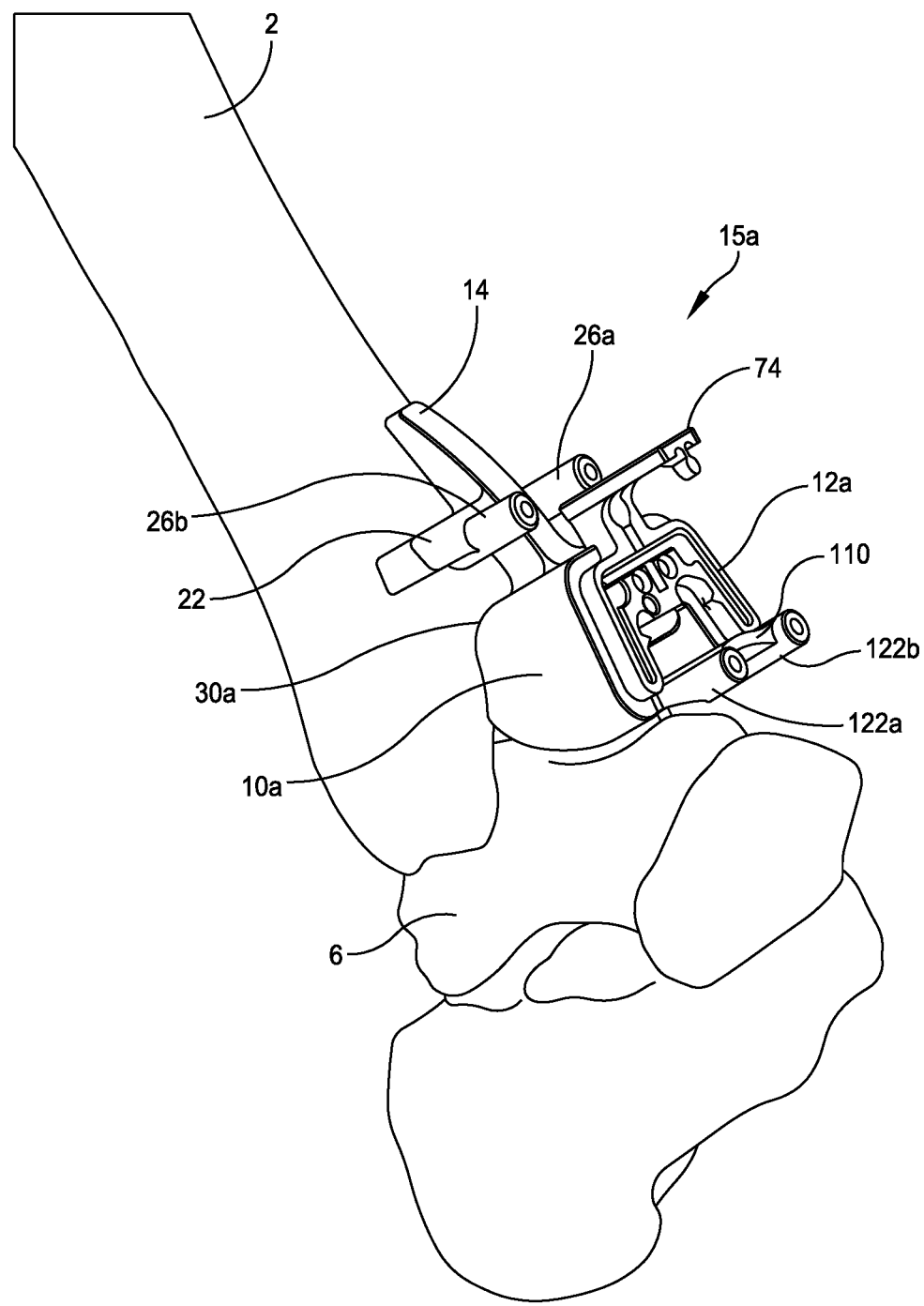
FIG. 35 illustrates the medical device of FIG. 34C positioned adjacent to and in contact with a first bone at a surgical site, in accordance with some embodiments.

FIG. 35 illustrates the medical device 15a, including the guide locator 10a and the guide element 12a, positioned adjacent to and in contact with a first bone 2 at a surgical site, in accordance with some embodiments. In the illustrated embodiment, the patient-specific contour of the posterior surface 30a is configured to interface with the surface of the first bone 2 in a single, predetermined position, as discussed above.

In some embodiments, alignment of the medical device 15a may be verified and/or adjusted using an alignment wire element 40. As shown in FIGS. 36A-36B, the alignment wire element 40 may be inserted into an alignment wire slot 81 defined in the guide element 12a. The alignment wire slot 81 may be positioned in any suitable portion of the guide element 12a, such as, for example, formed through a block 74 and into a body portion 52a of the guide element 12a. As discussed above, in other embodiments, the alignment wire element 40 may be coupled directly to the guide locator 10a and/or any other portion of the medical device 15a. The alignment wire element 40 may be used to verify alignment of the medical device 15a with respect to one or more anatomical structure, such as, for example, the first bone 2.

Figure 38:
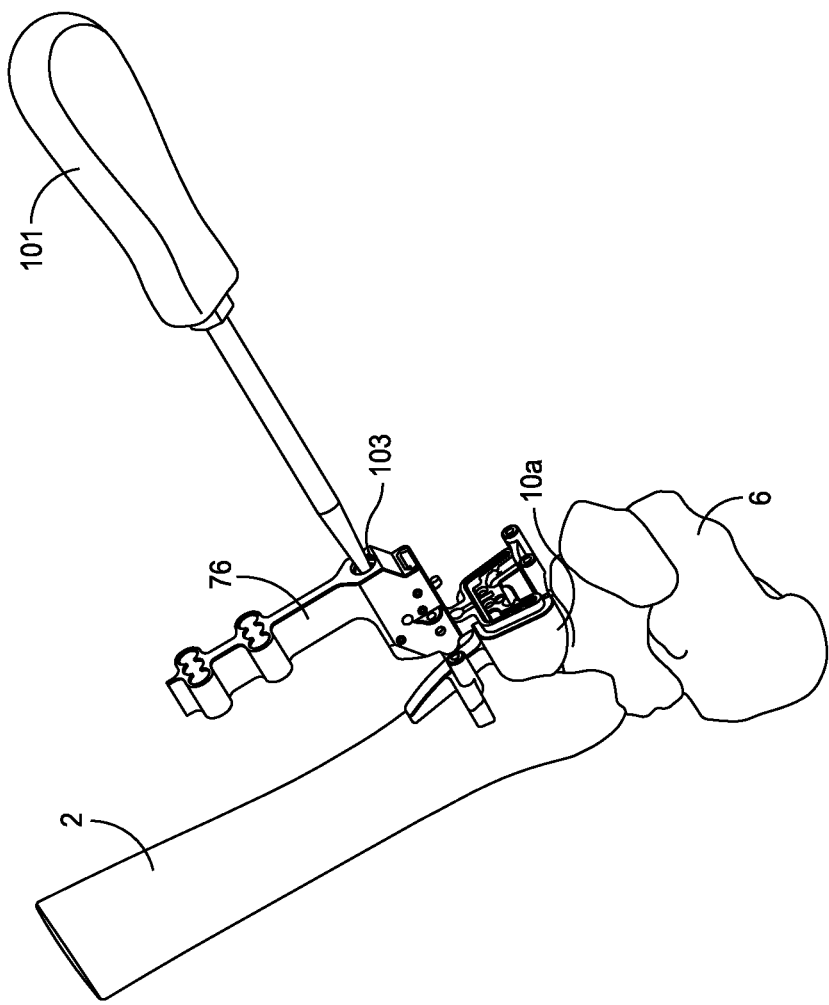
FIG. 38 illustrates a process of releasably coupling the alignment component to the block the of the guide element, in accordance with some embodiments.
Figure 37:
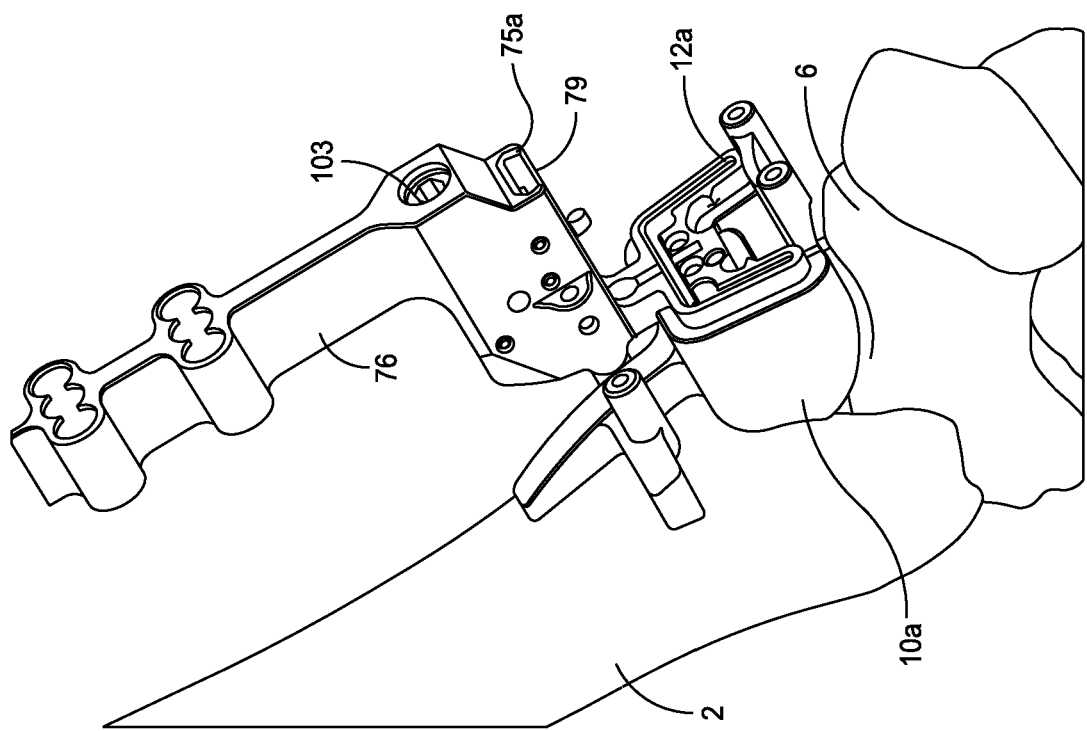
FIG. 37 illustrates the medical device of FIG. 35 having an alignment component coupled to a block of the guide element, in accordance with some embodiments.
Figure 39A:
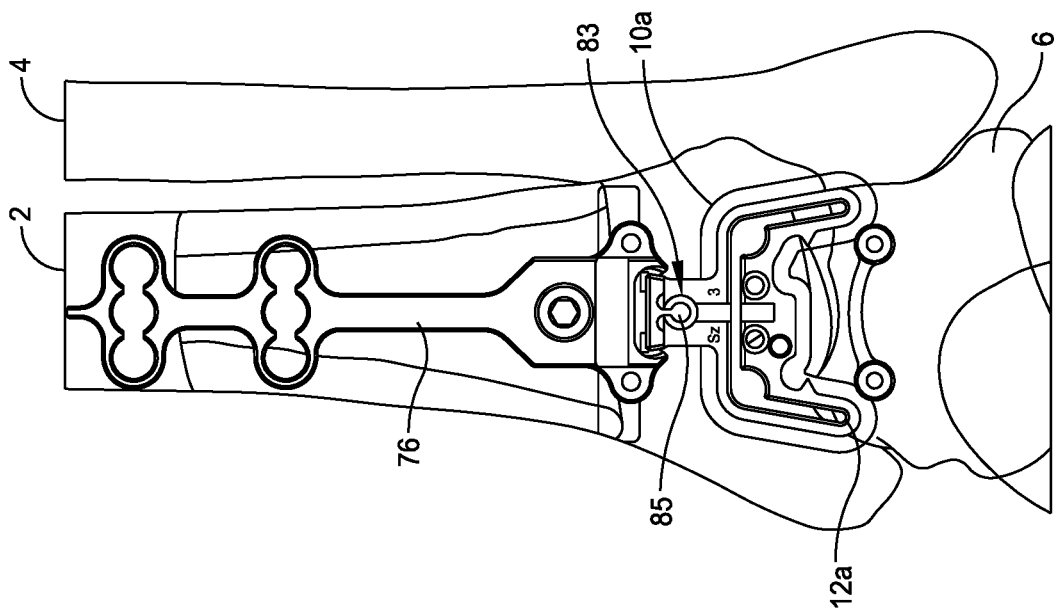
FIG. 39A illustrates the medical device of FIG. 37 having the guide element in a misaligned position with respect to the surgical site, in accordance with some embodiments.
Figure 39B:
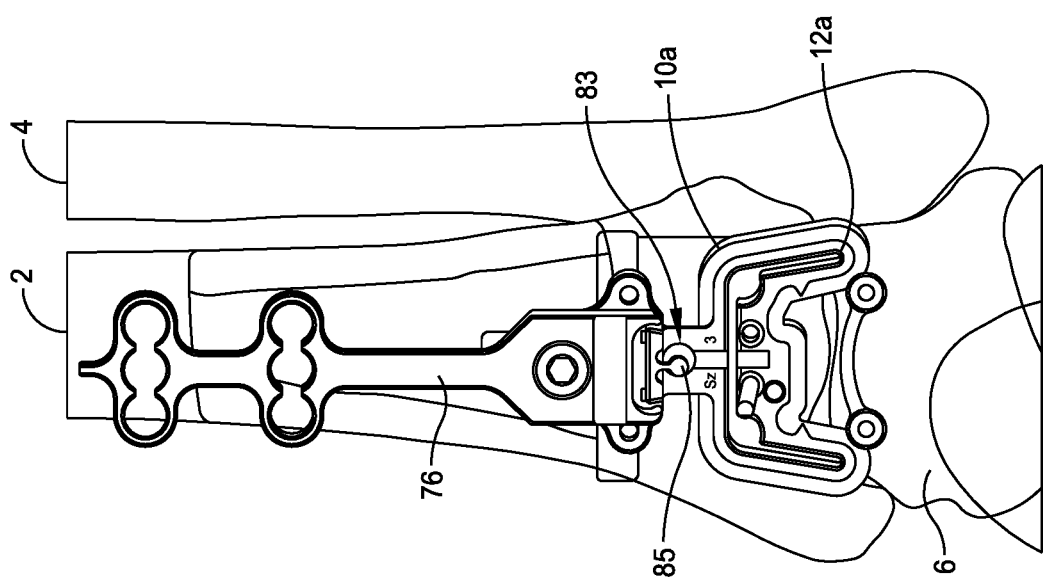
FIG. 39B illustrates the medical device of FIG. 37 having the guide in a correctly aligned position with respect to the surgical site, in accordance with some embodiments.

In some embodiments, alignment of the medical device 15a may be additionally and/or alternatively verified and/or adjusted using an alignment component 76 coupled to a portion of the guide element 12a, such as, for example, a block 74 of the guide element 12a. As shown in FIGS. 37-38, the block 74 may include a connection feature 79, such as a dovetail shape or other coupling feature, configured to interface with a coupling feature of the alignment component 76. A complimentary feature 75a of the alignment component 76, such as a dovetail opening, is sized and configured to receive the connection feature 79 in a coupling arrangement to attach the alignment component 76 to the block in a predetermined position and/or orientation.

In some embodiments, the alignment component 76 may include an adjustment mechanism 103 configured to allow for adjustments of the guide element 12a after coupling the alignment component 76 to the guide element 12a. For example, in the embodiment illustrated in FIG. 38, an adjustment mechanism 103 includes a rotatable screw configured to allow adjustments of the guide element 12a in one or more planes. As shown in FIG. 38, a separate instrument, such as a screwdriver 101, may be used to actuate the adjustment mechanism 103, although it will be appreciated that any suitable adjustment mechanism including any suitable actuation mechanism may be used.

Figure 40A:
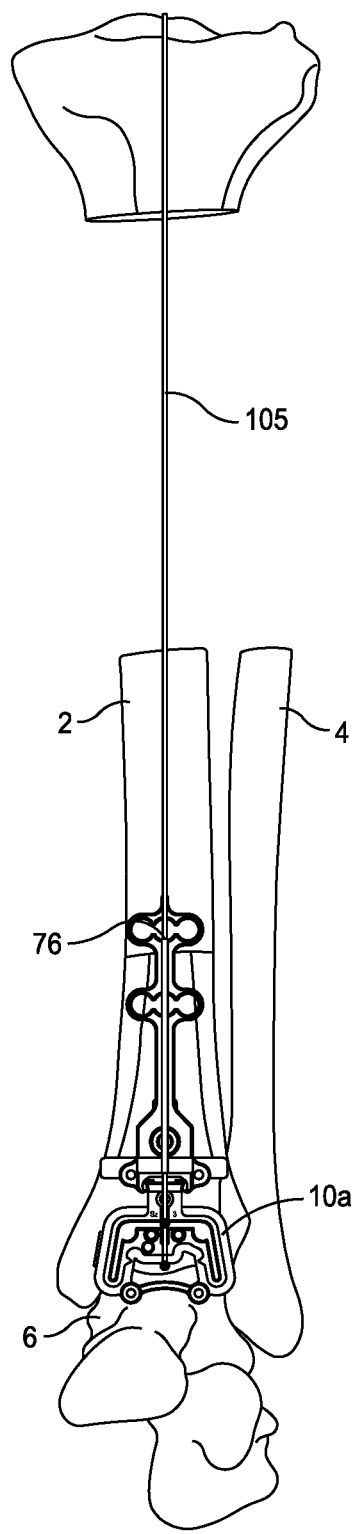
FIGS. 40A-40B illustrates a process step of verifying the of the medical device and/or components of the medical device with respect to the surgical site, in accordance with some embodiments.
Figure 40B:
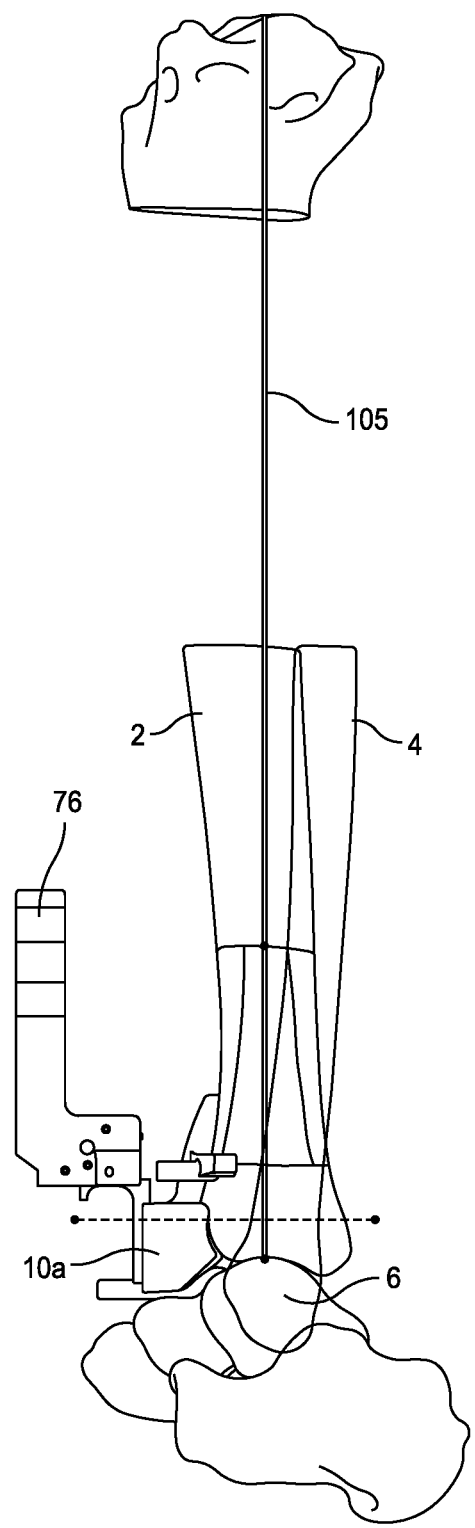
Figure 41:
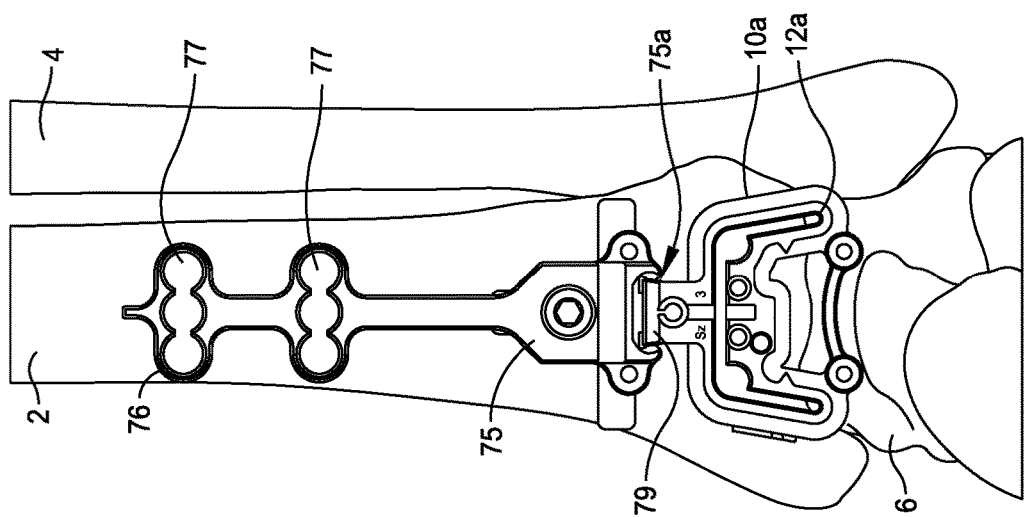
FIG. 41 illustrates the medical device of FIGS. 40A-40B including the alignment component properly aligned with respect to the surgical site, in accordance with some embodiments.

As shown in FIGS. 40A-40B, the alignment component 76 may be used to verify alignment of the medical device 15a and/or components of the medical device 15a with respect to one or more bones and/or anatomical axes. For example, in the illustrated embodiment, the alignment component 76 is shown with reference to a long axis 105 of a tibia to verify medial/lateral alignment. Although specific embodiments are discussed herein, it will be appreciated that one or more alignment elements, such as alignment component 76 and/or alignment wire 40, may be used to verify alignment with one or more axes and/or anatomical structures. FIG. 41 illustrates the medical device 15a, including the alignment component 76, properly aligned with respect to a tibia, in accordance with some embodiments. In some embodiments, alignment may be verified fluoroscopically using one or more fluoroscopic markers, such as, for example, one or more rings 77.

Figure 42:
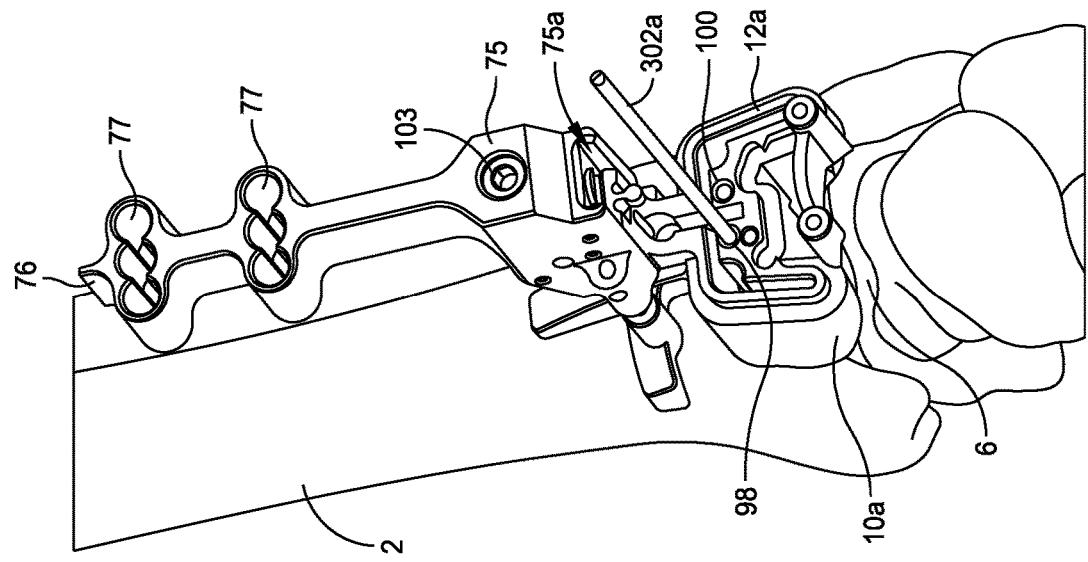
FIG. 42 illustrates insertion of a first pin through a first fixation hole defined by a guide element, in accordance with some embodiments.

After verification of alignment with respect to one or more anatomical structures, guide and/or temporary fixation pins may be inserted through one or more holes defined by components of the medical device 15a to fix the position of the medical device 15a and/or to provide guidance for one or more additional surgical procedures. For example, as shown in FIG. 42, a first pin 302a is inserted through a first fixation hole 98 defined by the guide element 12a. The first pin 302a may include any suitable guide pin, such as, for example, a k-wire. One or more additional guide pins, such as a second pin 302b, may be inserted through additional holes defined in the medical device 15a, such as, for example, a second fixation hole 100 defined by the guide element 12a (see FIG. 44).

Figure 43A:
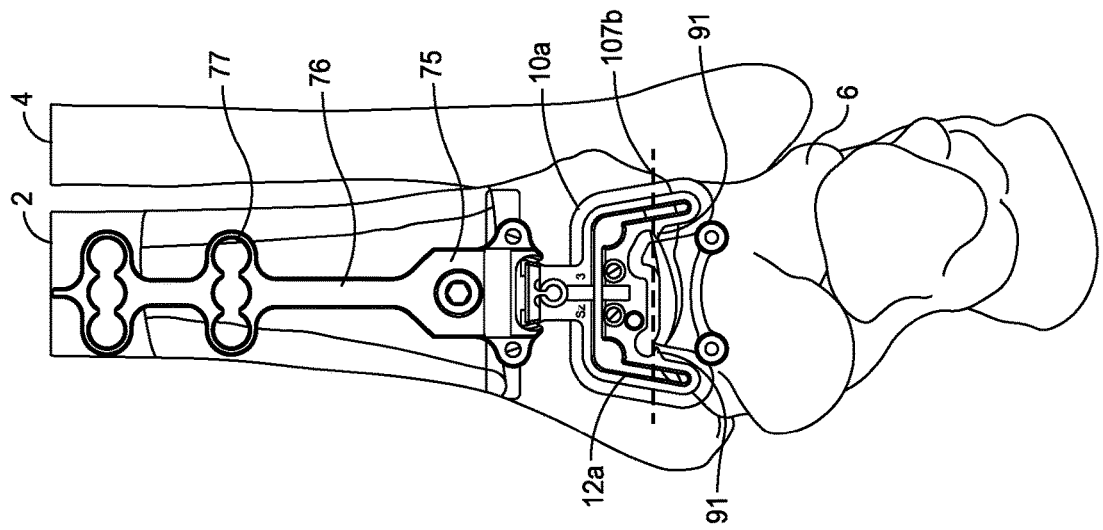
FIG. 43A illustrates a medical device coupled to a first bone via first and second pins, in accordance with some embodiments.
Figure 43B:
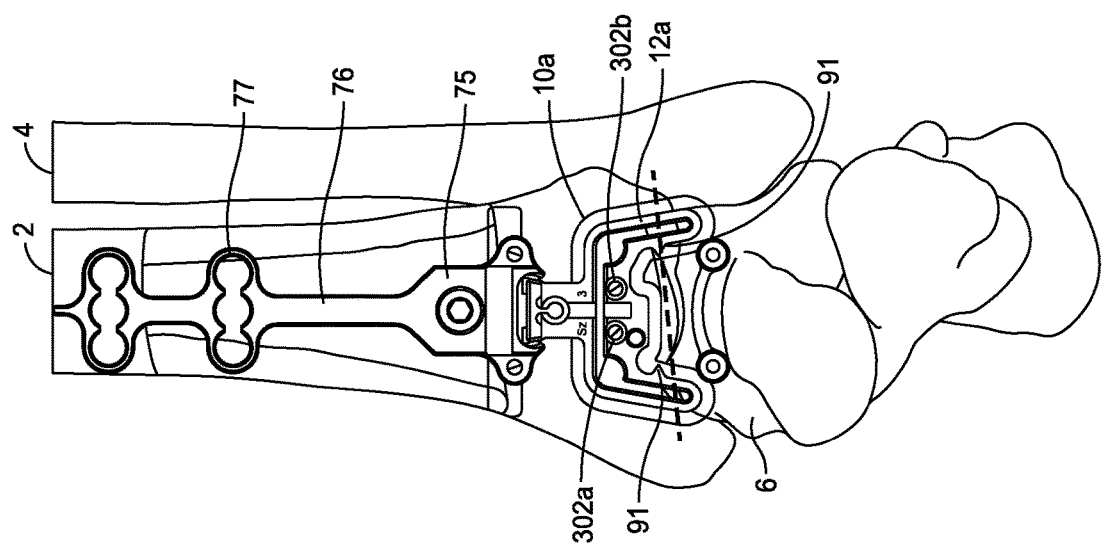
FIG. 43B illustrates the surgical site of FIG. 43A after re-alignment of a second bone, in accordance with some embodiments.

In some embodiments, additional adjustments may be performed prior to, during, and/or after insertion of one or more pins 302a, 302b. FIG. 43A shows the medical device 15a coupled to a first bone, such as a tibia, via the first and second pins 302a, 302b. A second bone, such as a talus, is misaligned with respect to the first bone and/or the medical device 15a, as shown by line 107a. The anatomical structure, e.g., the talus and tibia, are readjusted while maintain a fixed position of the medical device 15a with respect to the first bone, for example, based on fixation of the medical device 15a via the first pin 302a and the second pin 302b. As shown in FIG. 43B, anatomical structures may be adjusted to place a second bone in a predetermined alignment with respect to the first bone and/or the medical device 15a, as shown by line 107b. Such alignment may be verified using one or more alignment features, such as, for example, the alignment component 76 and/or alignment features 91 formed integrally with the guide element 12a.

Figure 44:
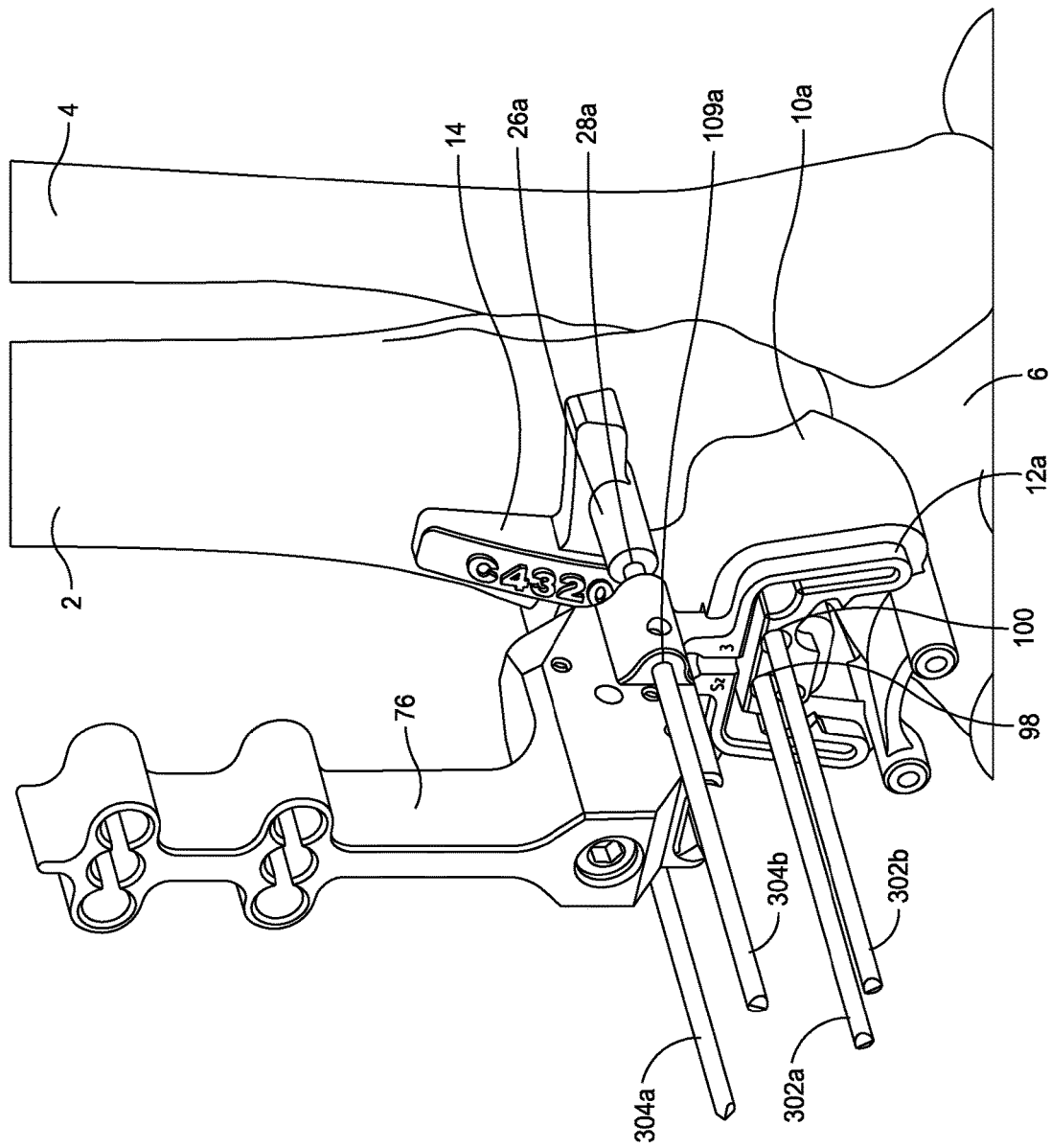
FIG. 44 illustrates insertion of a second set of pins including a third pin and a fourth pin through fixation holes defined in an alignment component and through fixation holes defined in a guide body, in accordance with some embodiments

Additional fixation and/or guide elements may be inserted through one or more additional openings defined in the medical device 15a. For example, FIG. 44 illustrates insertion of a second set of pins including a third pin 304a and a fourth pin 304b through fixation holes 109a, 109b defined in the alignment component 76 and/or through fixation holes 26a, 26b defined in the guide body 10a, in accordance with some embodiments. The additional fixation elements, such as the third pin 304a and the fourth pin 304b, may fix the position of the medical device 15*a* with respect to one or more directions of movement, such as, for example, medial/lateral movement.

As another example, FIG. 45 illustrates insertion of a third set of pins including a fifth pin 306*a* and a sixth pin 306*b* through pin channels 128*a*, 128*b* formed in corresponding pin guides 122*a*, 122*b* of the guide locator 10*a*. In the illustrated embodiment, the fifth and sixth pins 306*a*, 306*b* are inserted through the pin guide holes 128*a*, 128*b* and into a second bone, such as, for example, a talus. The fifth and sixth pins 306*a*, 306*b* fix a position of the medical device 15*a* with respect to the second bone. In some embodiments, the fifth and sixth pins 306*a*, 306*b* may be configured as guide pins for additional cutting and/or other surgical operations, as discussed in greater detail below. Although embodiments are discussed herein including pin guides 122*a*, 122*b* integrally formed with a guide locator 10*a*, it will be appreciated that the fifth and sixth pins 306*a*, 306*b* may be placed using any suitable guide defining guide channels, such as, for example, the guide element 12*c* discussed above in conjunction with FIGS. 25A-25B.

Figure 46:
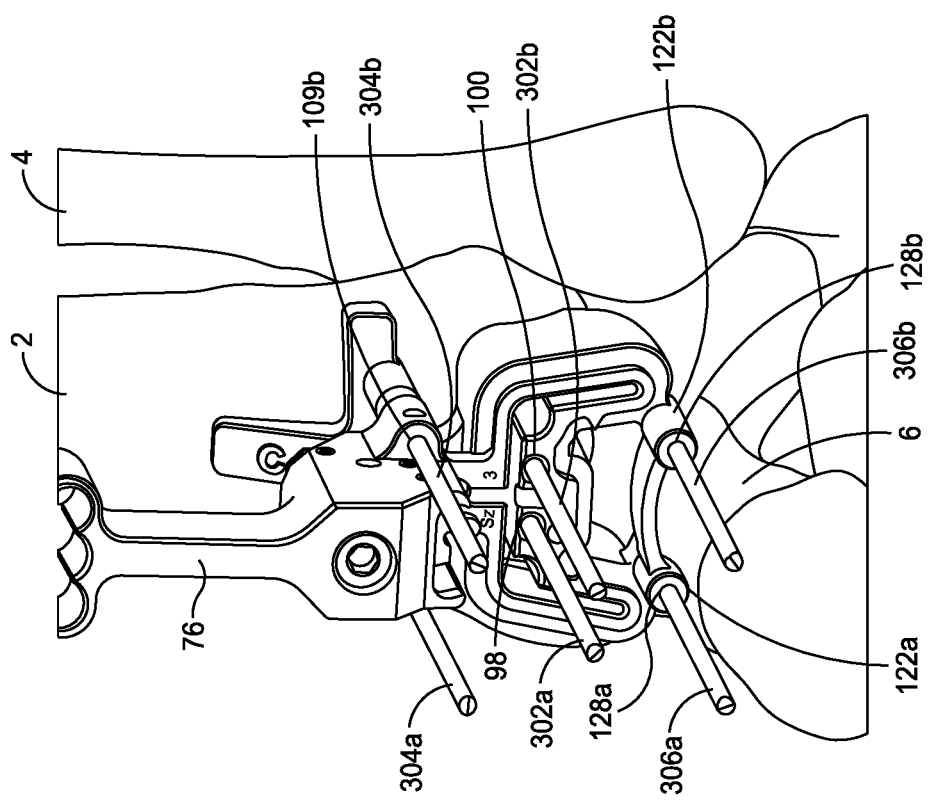
FIG. 46 illustrates an anterior perspective view of the surgical site of FIG. 45 having the first set, second set, and third set of pins inserted into one or more bones at the surgical site, in accordance with some embodiments.

As shown in FIGS. 45-46, the trajectory of each of the sets of pins 302*a*-306*b* may be parallel. Parallel insertion of the pins 302*a*-306*b* allows removal of one or more components of the medical device 15*a* without corresponding removal of the pins 302*a*-306*b*. For example, in some embodiments, components such as the alignment component 76, the guide element 12*a*, the guide body 10*a*, and/or any other suitable component may be slideably disengaged from the surgical site by sliding the component over the relevant set of pins 302*a*-306*b* in an anterior direction. Although embodiments are illustrated with the pins 302*a*-306*b* having trajectories aligned for removal and/or insertion in an anterior/posterior direction, it will be appreciated that the pins 302*a*-306*b* may be aligned along any suitable trajectory to allow insertion and/or removal of components in any suitable direction.

Figure 47:
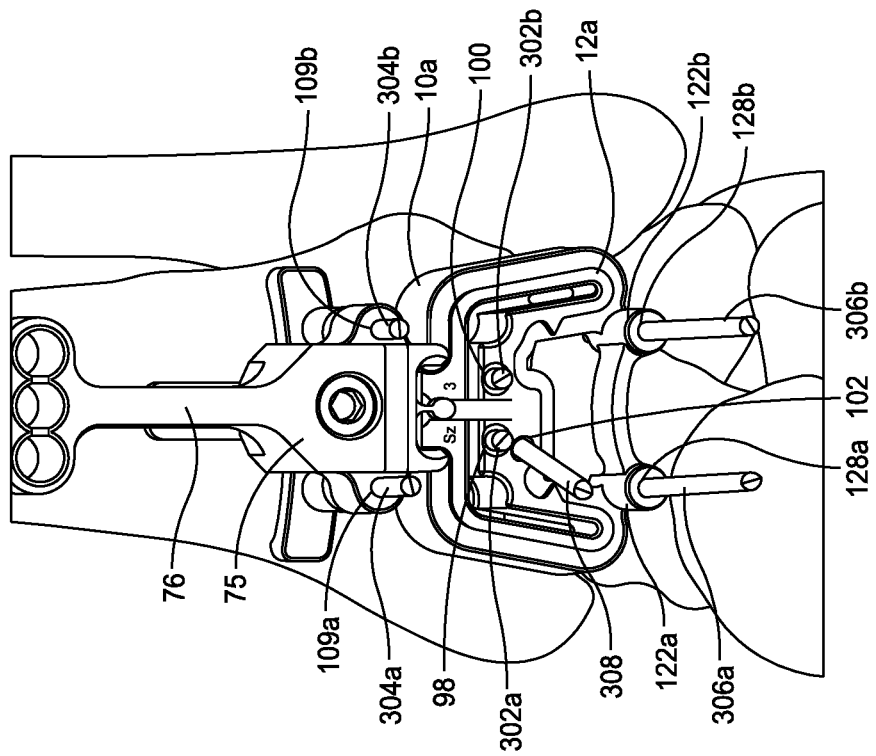
FIG. 47 illustrates insertion of an oblique (or angled) pin into an oblique channel in the guide element, in accordance with some embodiments.

FIG. 47 illustrates insertion of an oblique, or angled, pin 308 through an oblique channel 102 defined in a portion of the medical device 15*a*, such as, for example, the guide body 10*a* and/or the guide element 12*a*. In the illustrated embodiment, the oblique pin 308 is inserted through an oblique channel 102 defined by the guide element 12*a*. The oblique pin 308 is positioned at an angle with respect to the trajectory of one or more of the other pins 302*a*-306*b* inserted through the medical device 15*a*. In some embodiments, the oblique pin 308 is inserted prior to performing one or more surgical operations, such as a cutting operation, to further fix the position of the medical device 15*a* during the surgical operation. The oblique insertion angle applies a locking or frictional force to maintain the position of the medical device 15*a* during the surgical procedure.

Figure 48B:
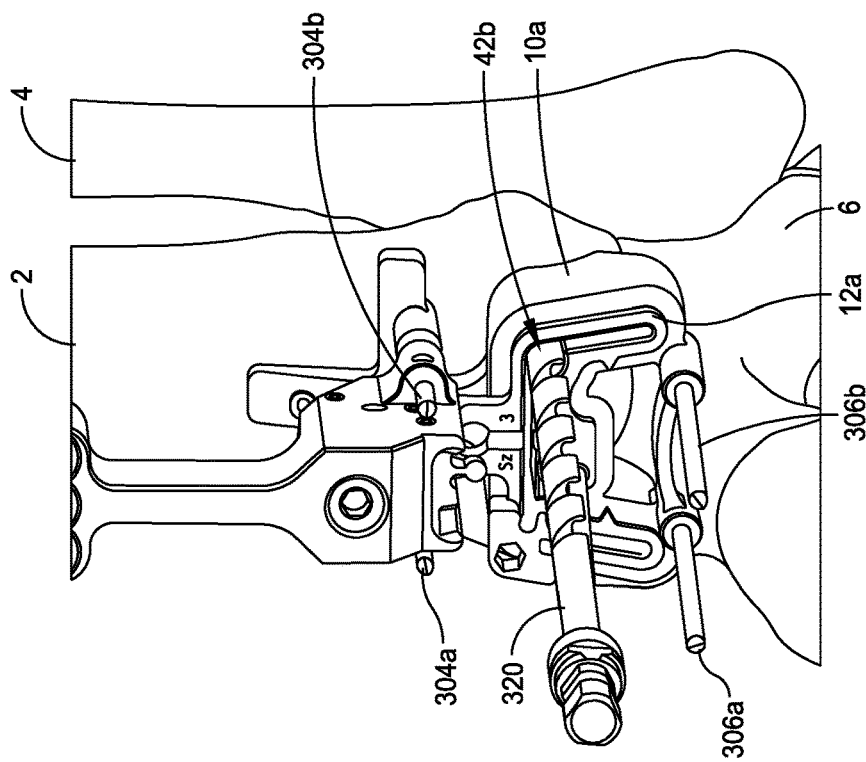
FIGS. 48A and 48B illustrate drilling of a corner pilot holes through corner holes defined by the guide element, in accordance with some embodiments.
Figure 48A:
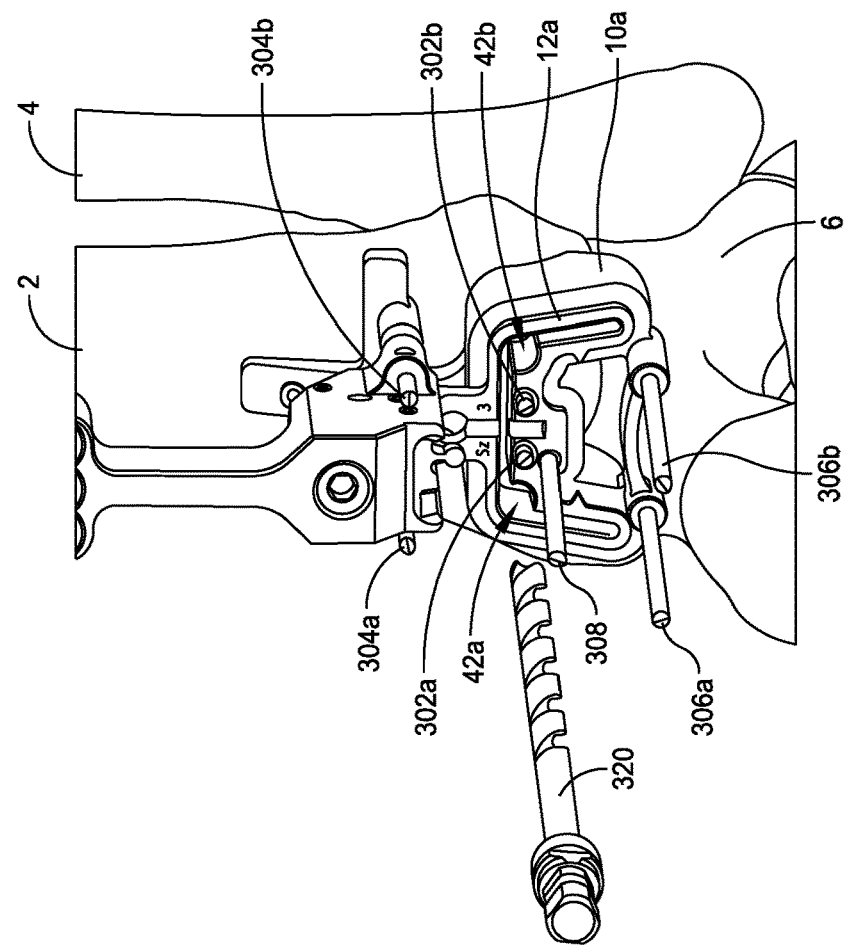

For example, as shown in FIGS. 48A-48B, a drilling operation may be performed to form corner, or pilot, holes in a bone, in accordance with some embodiments. A drill bit 320 may be inserted through a first corner hole 40*a* to form a first hole in a first bone and subsequently inserted into a second corner hole 40*b* to form a second hole in the first bone. The holes may be sized and configured to receive a corner protector, as discussed in greater detail below, and/or may be configured to form a portion of a resection cut to be formed in the first bone. The drill bit 320 may be coupled to any suitable drill (not shown), such as a hand drill or power drill.

Figure 50B:
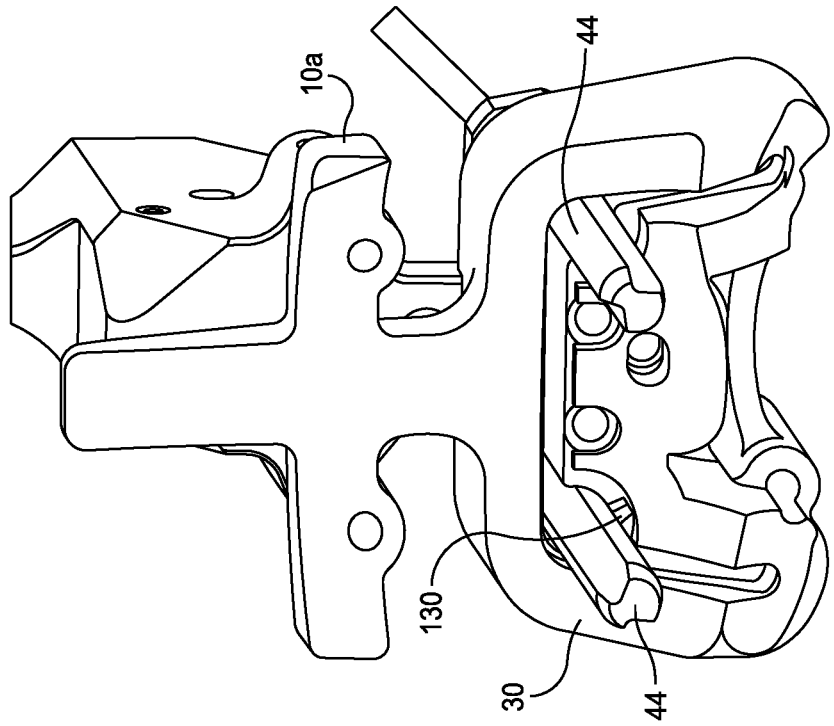
FIGS. 50A-50B include a rear view of the medical device of FIGS. 49A-49C illustrating a locking operation of the corner protectors, in accordance with some embodiments.
Figure 50A:
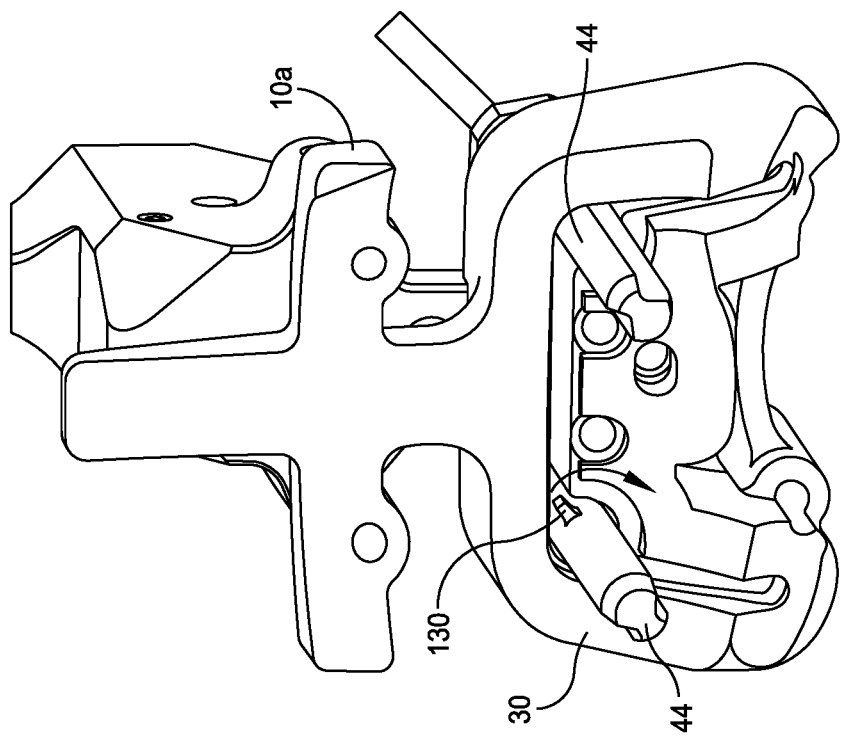

As shown in FIGS. 49A-49C, in some embodiments, corner protectors 44 may be inserted through the first and/or second corner holes 40*a*, 40*b* after formation of the pilot holes in the first bone. As discussed above, the corner protectors 44 are configured to prevent a saw or other cutting device from contacting portions of a bone that are not part of a resection cut. The illustrated corner protectors 44 include cutouts configured 144*a*, 144*b* to allow the cutting instrument to fully proceed into the pilot holes previously formed in the first bone. As shown in FIGS. 49A-49B, a corner protector 44 may be inserted using a guide or push pin 145 in a first position. After insertion, the corner protector 44 may be rotated from a first position (shown in FIGS. 49A-49B) to a second position (as shown in FIG. 49C). FIG. 50A illustrates a posterior view of the medical device 15*a* having first and second corner protectors 44 inserted with a first corner protector 44 (shown on the left in FIG. 50A) in an unlocked position. Once inserted, the corner protector 44 may be rotated to a second position (as shown in FIG. 50B) to fix and/or lock the corner protector in position prior to performing a cutting operation.

Figure 51:
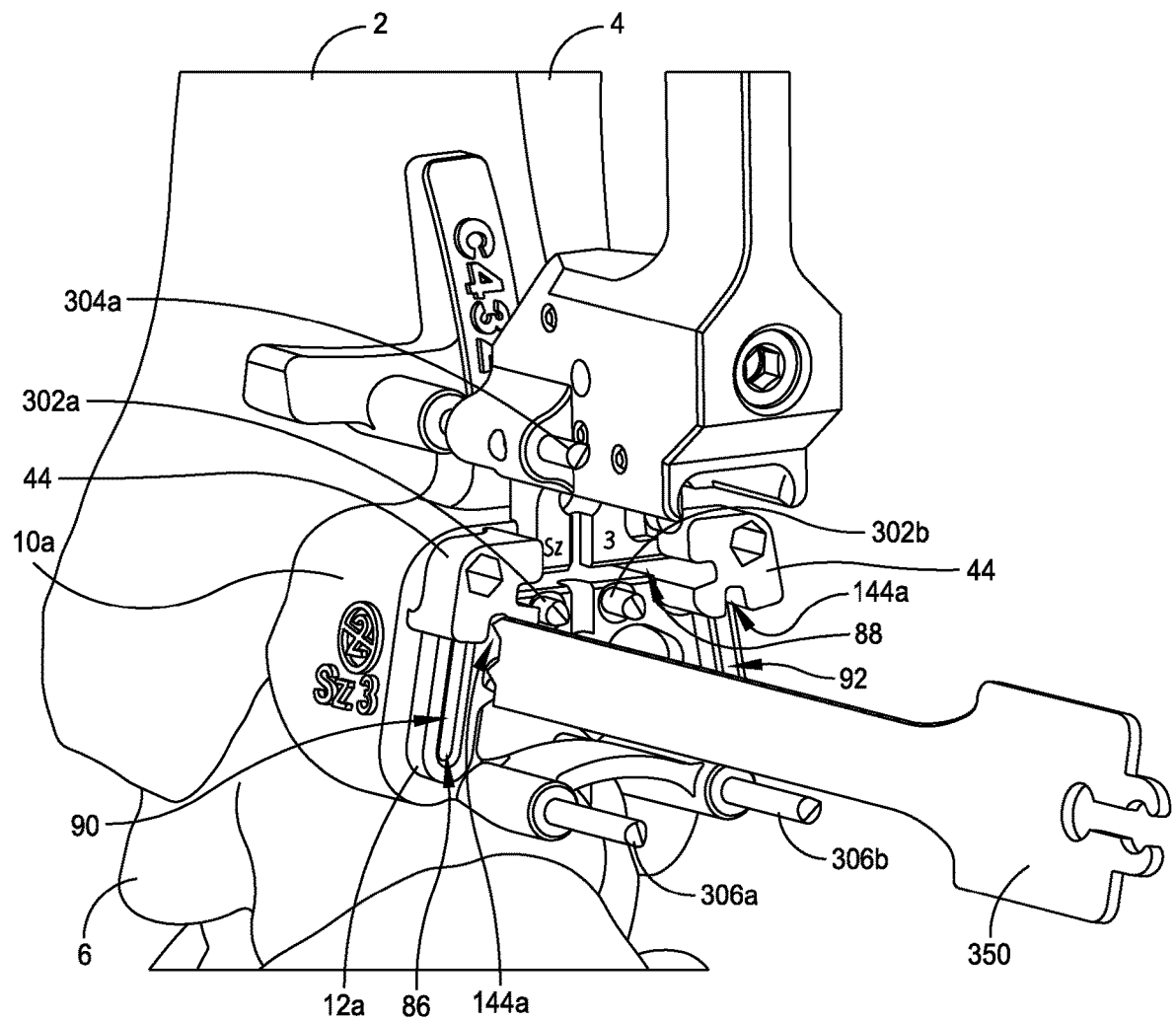
FIG. 51 illustrates insertion of a cutting instrument into a first portion of a guide slot defined by a guide element, in accordance with some embodiments.

As shown in FIG. 51, after insertion of the corner protectors 44, a cutting instrument 350 may be inserted into the guide slot 86 defined by the guide element 12*a*. The cutting instrument 350 may include any suitable cutting instrument, such as, for example, a saw, reamer, drill, etc. The cutting instrument 350 may be inserted into each portion 88, 90, 92 of the guide slot 86 to form multiple cuts in the first bone. The cuts formed through each portion 88, 90, 92 of the guide slot 86 and the pilot holes previously formed using the corner holes 40*a*, 40*b* define a full resection cut in the first bone. After forming the resection cut(s), the medical device 15*a* and/or the pins 302*a*-306*b* may be removed from the surgical site and additional surgical procedures, such as implantation of one or more implants, may be performed.

Figure 52:
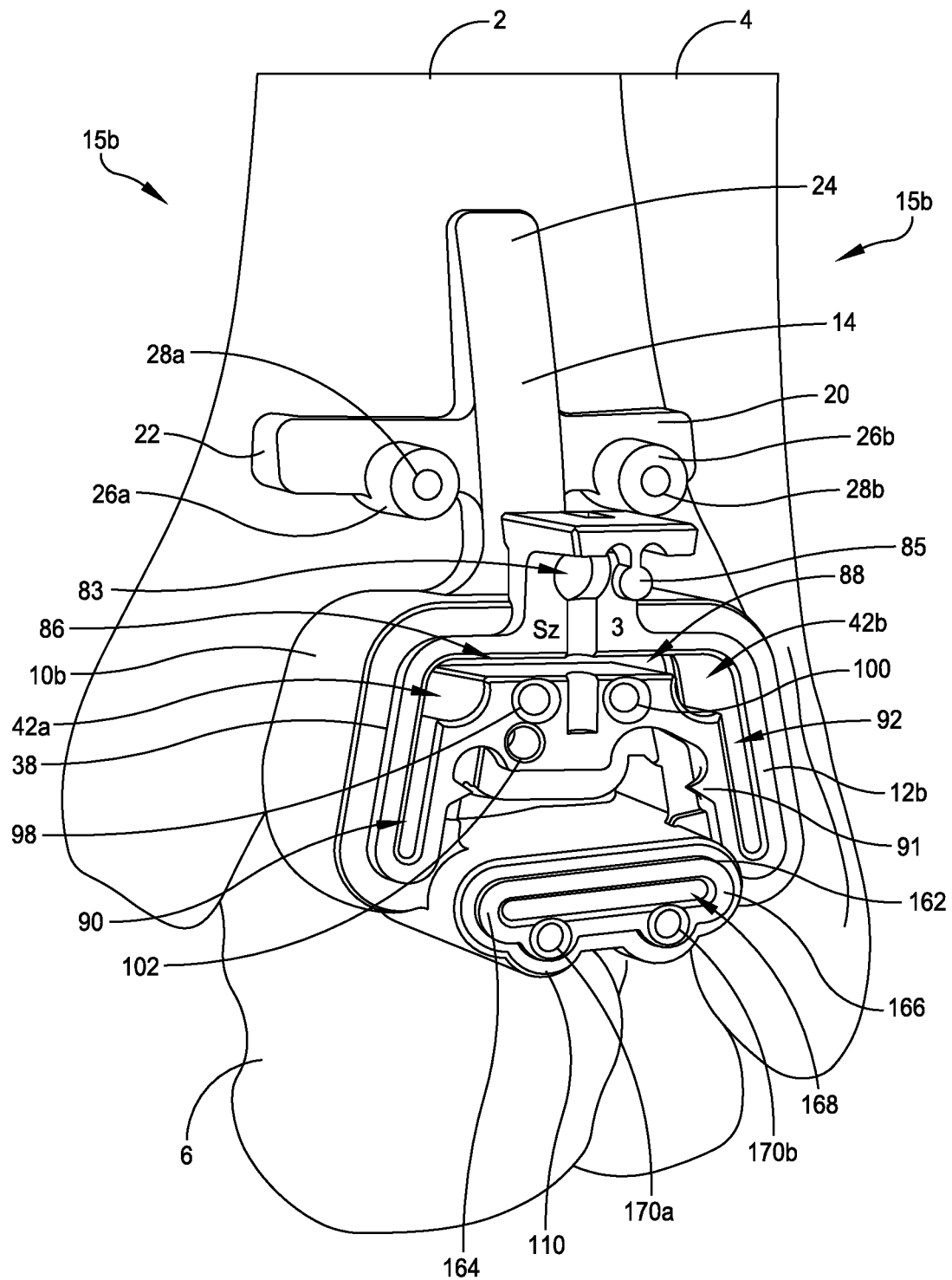
FIG. 52 illustrates an anterior perspective view of a surgical site including a medical device including a first body portion and a secondary body portion each configured to receive a guide element therein, in accordance with some embodiments.
Figure 53:
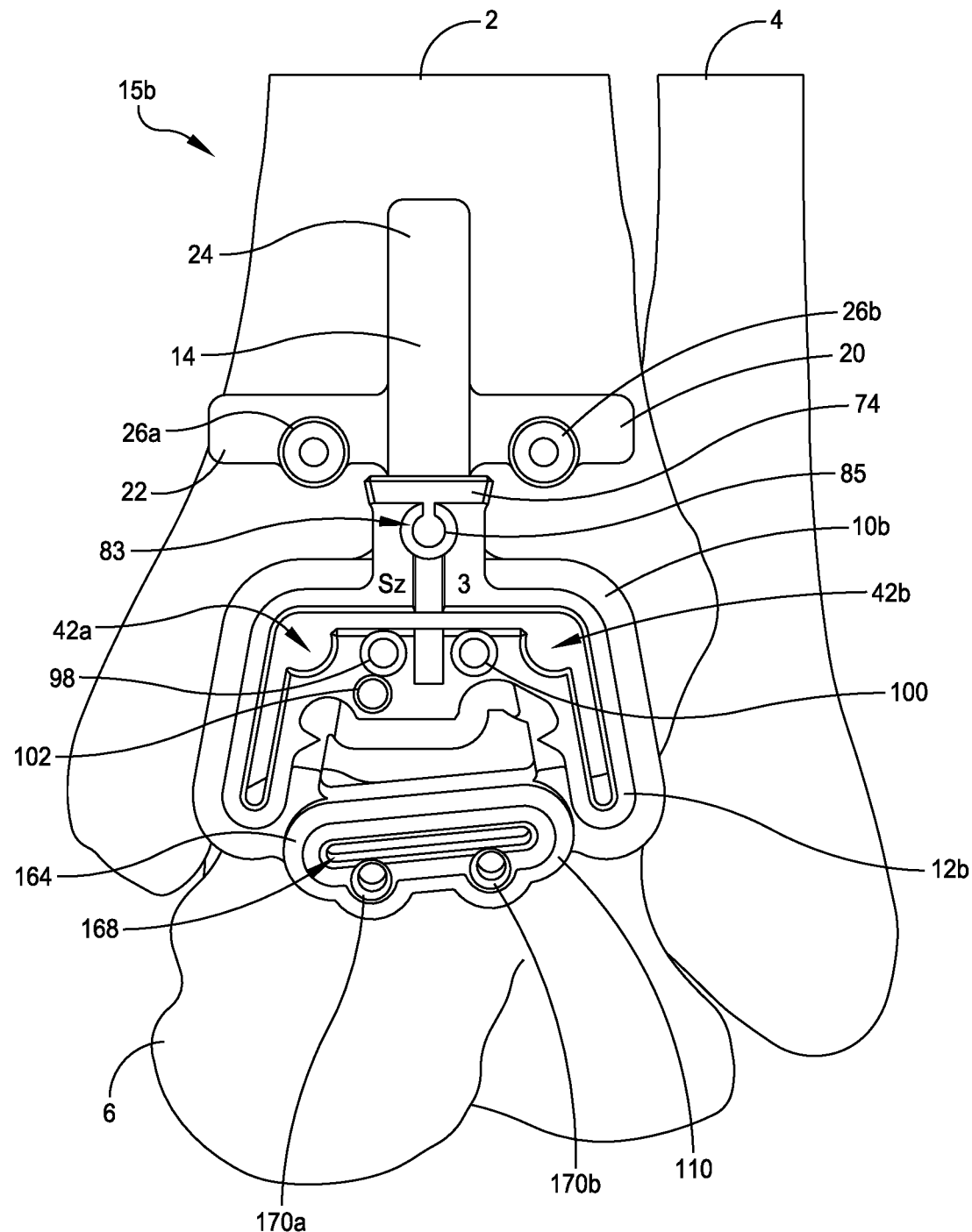
FIG. 53 illustrates an anterior view of the surgical site of FIG. 52, in accordance with some embodiments.

FIGS. 52 and 53 illustrate a medical device 15*b* including a first body portion 10*b* and a secondary body portion 110 each configured to receive a guide element therein, in accordance with some embodiments. The medical device 15*b* is similar to the medical devices 15, 15*a* discussed above, the guide body 10*b* is similar to the guide bodies 10, 10*a* discussed above, the guide element 12*b* is similar to the guide elements 12, 12*a* discussed above, and similar description is not repeated herein. The guide body 10*b* includes a secondary body portion 110 extending from an inferior portion of the guide body 10*b*. The secondary body portion 110 defines a second guide receptacle 162 sized and configured to receive a second guide element 164 therein. In the illustrated embodiment, the second guide receptacle 162 defines an ovoid shape having an ovoid second guide receptacle 162, although it will be appreciated that the body 160 and/or the second guide receptacle 162 may have any suitable shape and may have different shapes.

The guide receptacle 162 is sized and configured to receive a second guide element 164 therein. The second guide element 164 includes a body 166 defining a second guide slot 168. The second guide slot 168 is sized and configured to receive a cutting instrument, such as the cutting instrument 350 discussed above, therein. In some embodiments, the second guide slot 168 is configured to guide a cut in a second bone, such as, for example, a talus. Although embodiments are discussed herein including a second guide slot 168 configured to guide a cut in a second bone, it will be appreciated that the second guide slot 168 may be configured to guide a second cut in the first bone.

In some embodiments, the second guide element 164 includes one or more guide channels 170*a*, 170*b* sized and configured to receive guide pins and/or temporary fixation elements, such as k-wires, therethrough. The guide channels 170*a*, 170*b* may be configured to position pins inserted therethrough into a second bone to fix the position of the medical device 15b with respect to a second bone prior to, during, and/or after performing one or more surgical procedures. For example, in the illustrated embodiment, the second guide element 164 is configured to guide a cutting operation to perform a resection of a talus 6 during an ankle replacement surgery and the guide channels 170a, 170b are configured to guide insertion of k-wires to fix a position of the talus 6 prior to performing the resection cut through the second guide slot 168. Although specific embodiments are discussed herein, it will be appreciated that the secondary guide body 160 and/or the secondary guide element 164 may be configured to guide cutting, fixation, drilling, and/or other surgical operations with respect to any suitable anatomical structures, including a first bone, a second bone, a third bone, etc.

As shown in FIG. 53, in some embodiments, the second guide slot 168 of the second guide element 164 may be disposed at an angle with respect to the first portion 88 of the guide slot 86 of the guide element 12b. The second guide slot 168 may be configured to form a planar cut in the second bone that is angled with respect to a planar cut formed in the first bone. Although embodiments are discussed herein including a portion 88 of the first guide slot 86 and the second guide slot 168 being disposed at an angle, it will be understood that the superior portion 88 of the first guide slot 86 and the second guide slot 168 may be parallel so as to define parallel planar cuts, in accordance with some embodiments.

Figure 54:
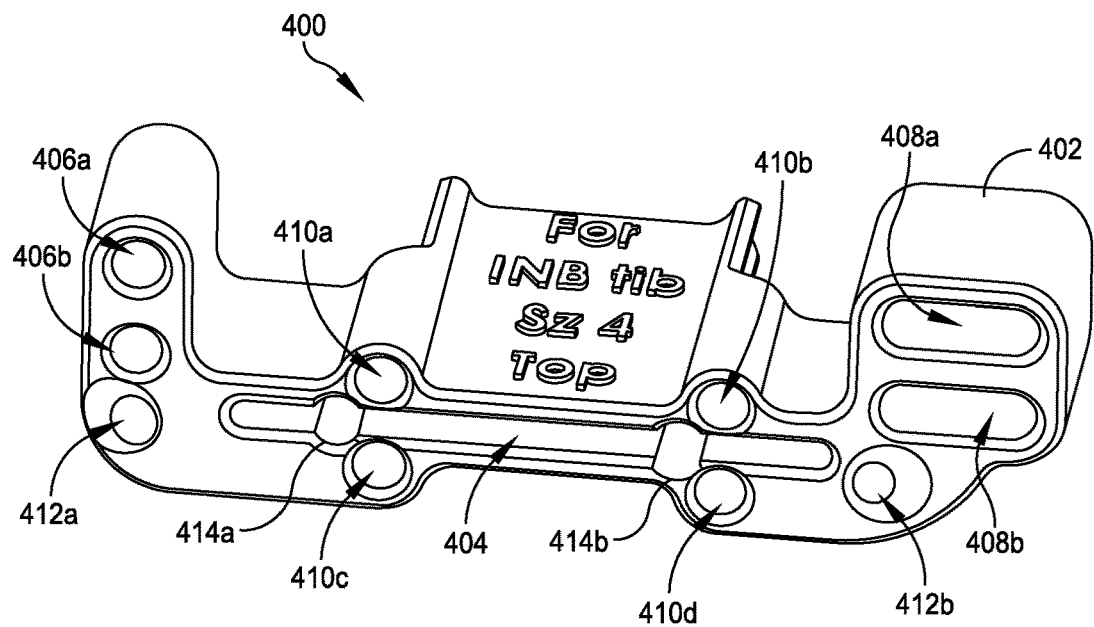
FIG. 54 illustrates a modular guide, in accordance with some embodiments.

In some embodiments, a modular guide 400 may be coupled to one or more components of a medical device, such as a guide body 10 and/or a guide element 12, and/or coupled to one or more elements positioned using the medical device 15, such as one or more pins 302a-306b. FIG. 54 illustrates a modular guide 400, in accordance with some embodiments. The modular guide 400 includes a modular guide body 402. The modular guide body 402 may be formed of any suitable material, such as, for example, a material similar to that used for the guide element 12, such as a metal or other rigid material. The modular guide body 402 defines at least one guide slot 404. The guide slot 404 is sized and configured to receive a surgical instrument, such as a cutting instrument 350, therethrough. In some embodiments, the modular guide body 402 defines a plurality of guide holes 406a, 406b sized and configured to receive a guide pin therethrough, as discussed below with respect to FIG. 55. In the illustrated embodiment, the guide holes 406a, 406b are formed on a first side of the modular guide body 402, although it will be appreciated that guide holes 406a, 406b sized and configured to receive guide pins may be positioned at any suitable location on the modular guide body 402.

Figure 55:
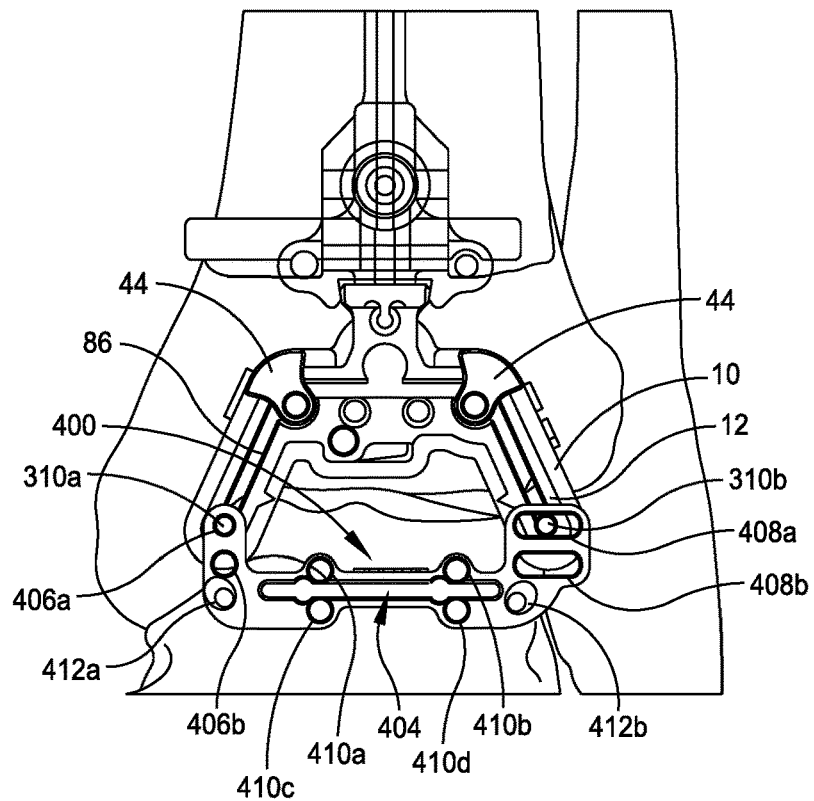
FIG. 55 illustrates a surgical site including a medical device having a guide locator, a guide element, and the modular guide of FIG. 54 coupled to the guide element, in accordance with some embodiments.

In some embodiments, the modular guide body 402 defines one or more guide slots 408a, 408b sized and configured to receive a guide pin, as discussed in greater detail with respect to FIG. 55. The guide slots 408a, 408b are similar to the guide holes 406a, 406b, but are configured to compensate for medial/lateral displacement of guide pins, for example, due to requirements of different sized cutting and/or pin guides. For example, in some embodiments, the modular guide body 402 may be configured for use with medical devices 15 having variable sizes resulting in variable lateral positioning of guide pins. The guide slots 408a, 408b may be configured to accommodate the variable lateral positioning of guide pins to allow a single modular guide 400 to be used with different sizes of medical devices 15.

Similarly, in some embodiments, the modular guide body 402 includes paired sets of guide holes 406a, 406b and/or guide slots 408a, 408b configured to allow inferior/superior adjustments of the position of the modular guide body 402 with respect to the medical device 15. For example, in the illustrated embodiment a first guide hole 406a and a first guide slot 408a are horizontally aligned to define a first selectable height of the modular guide 400 and a second guide hole 406b and a second guide slot 408b are horizontally aligned to define a second selectable height. Although embodiments are illustrated with a first height and a second height, it will be appreciated that the modular guide body 402 may include any number of height adjustments configured to allow continuous and/or discrete adjustments of the modular guide body 402 with respect to the guide body 10.

In use, the paired sets of guide holes 406a, 406b and/or guide slots 408a, 408b allow the modular guide 400 to be positioned with respect to the guide body 10 and/or the surgical site to guide one or more additional surgical procedures. For example, in the illustrated embodiment, the modular guide 400 is configured to guide a cutting instrument, via guide slot 404, during a talar resection operation. Although embodiments are discussed herein including talar resection, it will be appreciated that the modular guide 400 may be configured to guide a surgical operation with respect to any suitable anatomical structure located adjacent to and/or close to the first bone.

In some embodiments, the modular guide 400 includes a plurality of pin holes 410a-410d sized and configured to receive a guide pin and/or fixation element therethrough, such as a k-wire or other element. The pin holes 410a-410d may be arranged to allow fixation and/or placement of guide elements within a bone prior to, during, and/or after forming a resection cut using the guide slot 404. The pin holes 410a-410d are similar to the pin holes formed in the guide body 10 discussed above, and similar description is not repeated herein.

In some embodiments, the modular guide 400 includes one or more oblique channels 412a, 412b sized and configured to receive a pin or other fixation element therethrough at an angle with respect to one or more other guide holes 406a-410d and/or the guide slot 404 defined in the modular guide body 400. The oblique channels 412a, 412b are sized and configured to receive an oblique pin or temporary fixation element therethrough. The oblique channels 412a, 412b are positioned at an angle with respect to the guide slot 404. Guide pins (e.g., k-wires) inserted through the oblique channels 412a, 412b are configured to apply a fixation force to the modular guide 400 during performance of one or more surgical procedures.

In some embodiments, guide holes 414a, 414b are defined within and/or overlapping with the guide slot 404. The guide holes 414a, 414b may be sized and configured to receive a guide element, such as a k-wire, and/or a surgical instrument, such as a drill. In some embodiments, a guide or fixation element, such as a k-wire, is received through one or more of the guide holes 414a, 414b to maintain the modular guide 400 in a fixed position during a surgical procedure. In some embodiments, the guide or fixation elements may be positioned as stop or limiting elements, configured to prevent traversal of a separate instrument, such as a cutting instrument, through the guide slot 404 beyond a predetermined location. In some embodiments, a first surgical instrument, such as a drill, is inserted through one or more of the guide holes 414a, 414b prior to insertion of a second surgical instrument, such as a cutting instrument, within the guide slot 404.

FIG. 55 illustrates a medical device 15 having a modular guide 400 coupled to a set of inferior pins 310a, 310b, in accordance with some embodiments. The inferior pins 310a, 310b are slideably coupled to a guide hole 406a and a matched guide slot 408a to position the modular guide 400 at a first superior/inferior position with respect to the guide body 10 and/or the guide element 12. In some embodiments, the inferior pins 310a, 310b may be slideably coupled to a second guide hole 406b and a matched second guide slot 408b to position the modular guide 400 at a second superior/inferior position. Although embodiments are discussed herein including the use of guide pins 310a, 310b, it will be appreciated that a modular guide 400 may be coupled to any suitable pin(s) and/or other components of the medical device 15, in accordance with various embodiments. The modular guide 400 may include features for connecting and/or aligning with respect to the guide element 12 such that a second surgical operation may be performed in a proper location with respect to first surgical operation.

Figure 57:
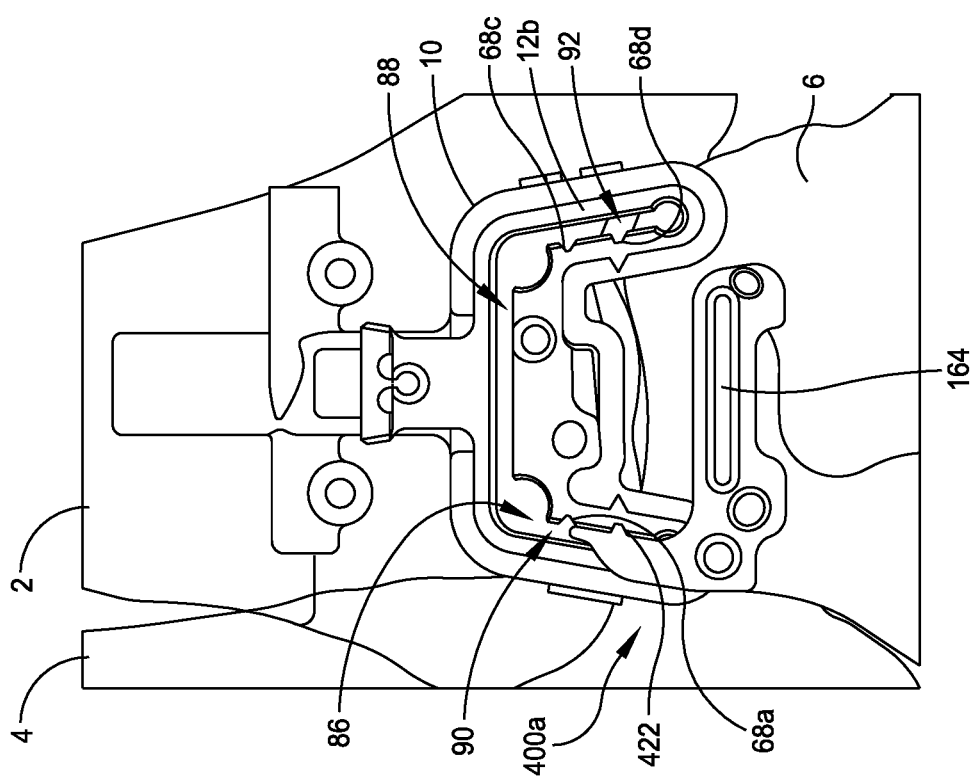
FIG. 57 illustrates a surgical site including a medical device having a guide locator, a guide element, and the modular guide of FIG. 56 coupled to the guide element, in accordance with some embodiments.
Figure 56:
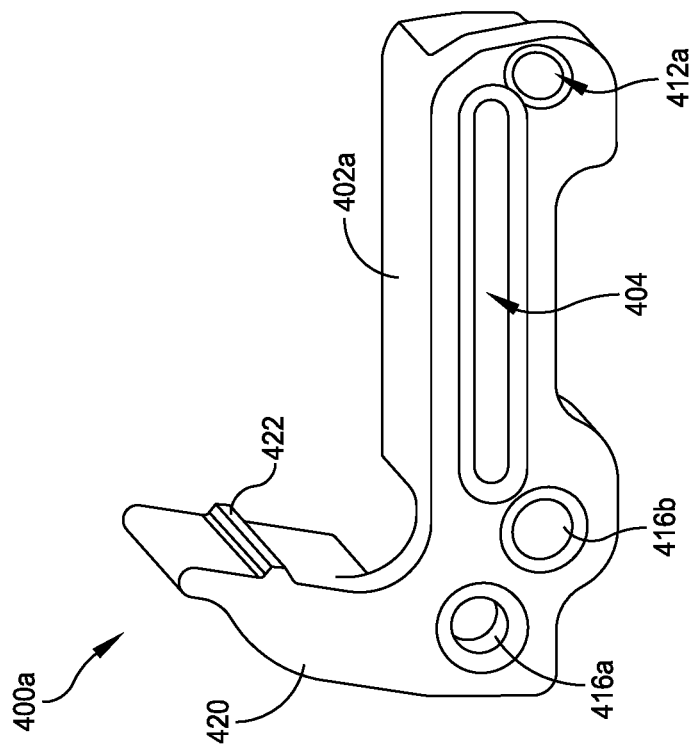
FIG. 56 illustrates a modular guide having a coupling extension, in accordance with some embodiments.
Figure 59:
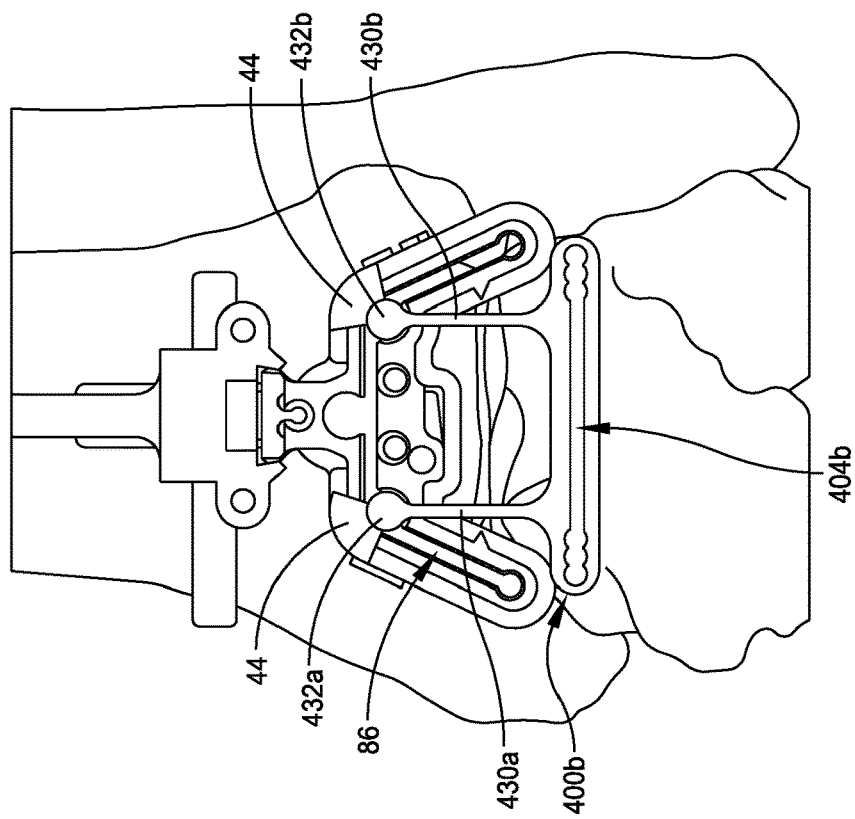
FIG. 59 illustrates a surgical site including a medical device having a guide locator, a guide element, and the modular guide of FIG. 58 coupled to the guide element, in accordance with some embodiments.

FIGS. 56-57 illustrate an embodiment of a modular guide 400a configured to be coupled to a guide slot 86 of a guide element 12b, in accordance with some embodiments. The modular guide 400a is similar to the modular guide 400, and similar description is not repeated herein. The modular guide 400a includes a coupling extension 420 extending from a first side of the modular guide body 402a. The coupling extension 420 extends in a superior direction from the modular guide body 402a and is sized and configured for insertion into a guide slot 86 defined by the guide element 12b. The coupling extension 420 may include one or more projections 422 sized and configured for insertion into coupling features 68a-68d defined in a sidewall of the guide slot 86. For example, as shown in FIG. 59, the coupling extension 420 may be configured for insertion into a second portion 90 of a guide slot 86 defined by the guide element 12b and the projection 422 is sized and configured for insertion into a first coupling cutout 68a defined in a sidewall of the guide slot 86. Although the illustrated embodiment is configured to couple to the second portion 90 of the guide slot 86, it will be appreciated that the coupling extension 420 may be configured to interface with any suitable portion and/or multiple portions of the guide slot 86.

In some embodiments, the modular guide 400a includes guide channel 416a, 416b sized and configured to receive a guide pin and/or temporary fixation element therein. The modular guide 400a may be slideably coupled to a guide pin during insertion of the coupling extension 420 into the slot 86 of the guide element 12b and/or a pin or other fixation element may be inserted into one or more of the guide channels 416a, 416b after the modular guide 400a is coupled to the guide element 12b.

Figure 58:
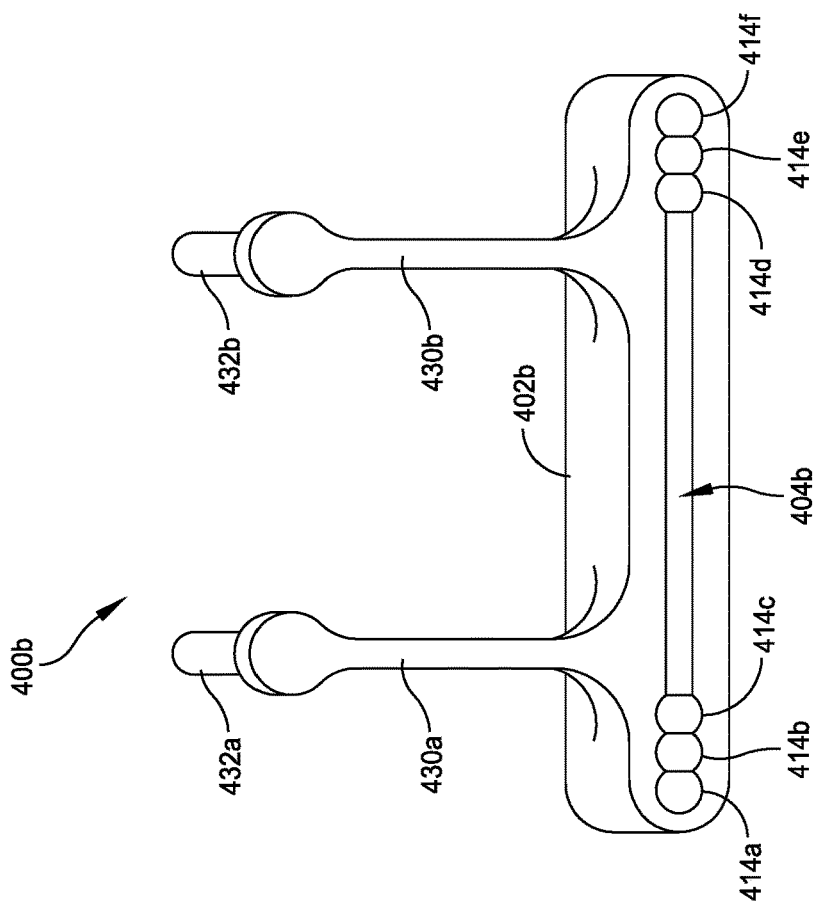
FIG. 58 illustrates a modular guide configured to be coupled to a channel defined by a corner protector inserted into a corner hole of a guide element, in accordance with some embodiments.

FIGS. 58-59 illustrate a modular guide 400b configured to be coupled to a channel 140 defined by a corner protector 44 inserted into a corner hole 92, 94 of the guide element 12, in accordance with some embodiments. The modular guide 400b is similar to the modular guides 400, 400a described above, and similar description is not repeated herein. The modular guide 400b includes a guide body 402b having a first coupling extension 430a and a second coupling extension 430b extending therefrom. In the illustrated embodiment, the first and second coupling extension 430a, 430b extend in a superior direction and are perpendicular to a plane defined by the guide slot 404b, although it will be appreciated that the coupling extension 430a, 430b may extend at any suitable angle with respect to the guide body 402b and/or the guide slot 404b.

A coupling pin 432a, 432b is formed on and/or coupled to a superior end of each of the coupling extensions 430a, 430b. The coupling pins 432a, 432b are sized and configured for insertion into the channels 140 defined by each of the corner protectors 138. Insertion of the coupling pins 432a, 432b provides a friction fit between the pins 432a, 432b and the channels 140 to maintain the modular guide 400b in a predetermined location with respect to the guide element 12 and/or the surgical site. The guide slot 404b is similar to the guide slot 404 discussed above, and may be used to guide one or more surgical procedures after coupling the modular guide 400b to the guide element 12.

Figure 61:
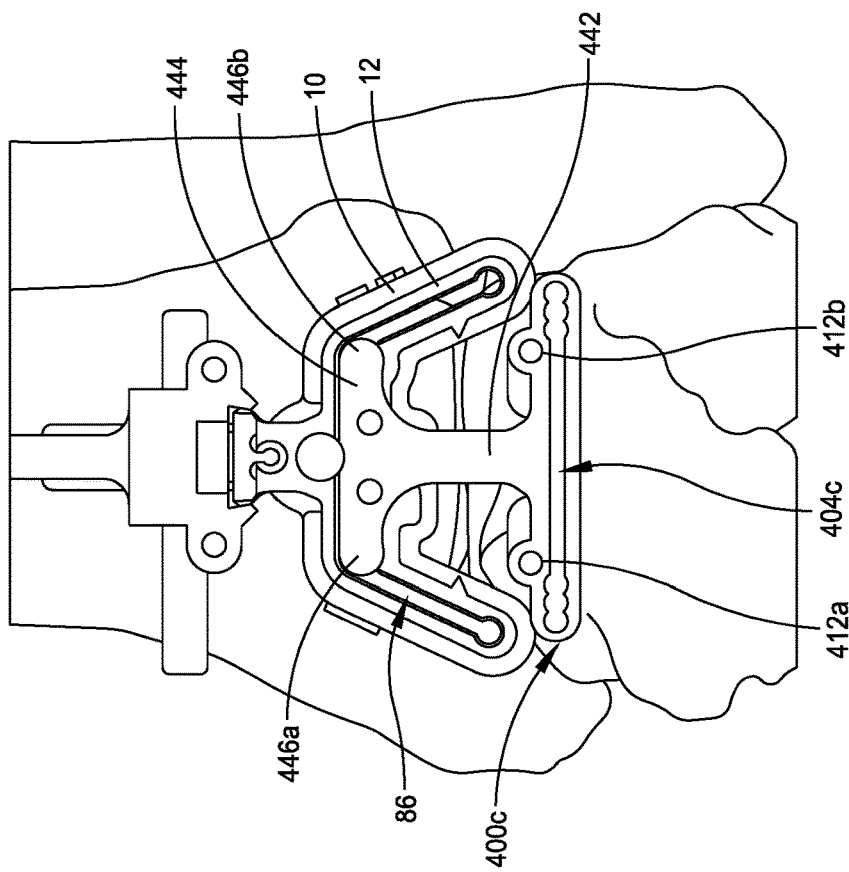
FIG. 61 illustrates a surgical site including a medical device having a guide locator, a guide element, and the modular guide of FIG. 60 coupled to the guide element, in accordance with some embodiments.
Figure 60:
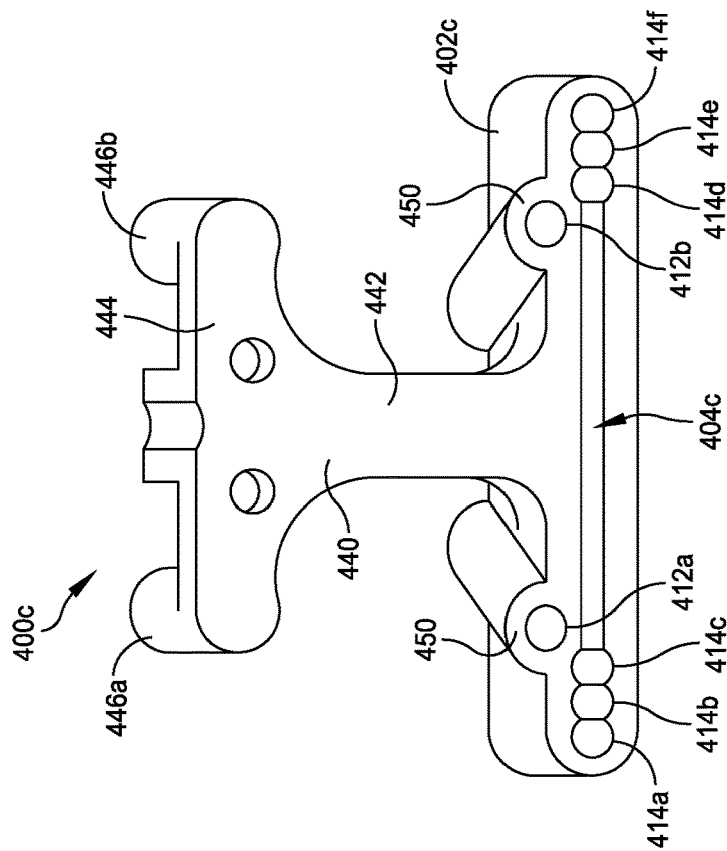
FIG. 60 illustrates a modular guide having a t-shaped coupling element, in accordance with some embodiments.

FIGS. 60-61 illustrate a modular guide 400c having a t-shaped coupling element 440, in accordance with some embodiments. The modular guide 400c is similar to the modular guides 400-400b discussed above, and similar description is not repeated herein. The modular guide 400c includes a t-shaped coupling element 440 having a single coupling extension 442 extending from the modular guide body 402c. The coupling extension 442 includes a cross-member 444 at a superior end of the coupling extension 442. The cross-member 444 includes a first coupling pin 446a and a second coupling pin 446b located at a first and second lateral end of the cross-member 444. The coupling pins 446a, 446b are sized and configured for insertion into corner holes 40a, 40b defined in a guide element 12. In some embodiments, the cross-member 444 defines one or more guide holes 448a, 448b sized and configured to receive a guide pin and/or temporary fixation element therein through. In some embodiments, the modular guide 400c includes oblique channels 412a, 412b defined by guide bodies 450a, 450b formed integrally with the modular guide body 402c.

Figure 62:
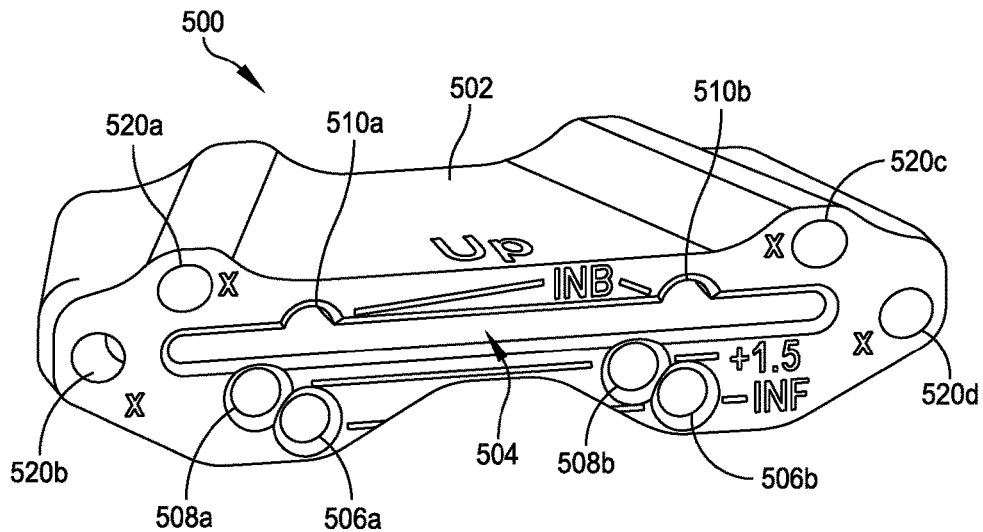
FIG. 62 illustrates a front perspective view of a modular guide configured to be coupled to one or more guide pins, in accordance with some embodiments.

In some embodiments, a modular guide may be configured to interface directly with one or more guide pins without interfacing with a medical device 15. For example, FIG. 62 illustrates a modular guide 500 configured to be coupled to one or more guide pins, such as talar guide pins 306a, 306b discussed above. The modular guide 500 includes a guide body 502 defining a guide slot 504. When properly positioned with respect to a bone, such as a talus, the guide slot 504 is sized and configured to guide a surgical operation, such as a resection cut, with respect to the bone. The modular guide 500 may be configured to be positioned in one of a plurality of positions and/or orientations. For example, a modular guide 500 may define multiple guide positions and/or may be configured to be invertible such that a resection depth can be easily changed by repositioning the modular guide 500. Enabling multiple positions minimizes the size of the guide and allows for the use of pinning locations that are configured for a specific operations, such as, for example, thinner resections where the pins have to be below the resection for stability and/or deeper resections where the pins are above the resection.

In some embodiments, the modular guide body 502 defines a first set of guide holes 506a, 506b sized and configured to receive a guide pin, such as a k-wire, therethrough. In some embodiments, the modular guide 500 is configured to be slidably coupled to a surgical site by inserting one or more pre-placed guide pins into the first set of guide holes 506a, 506b, as described in greater detail below. Inserting the guide pins into the first set of guide holes 506a, 506b positions the guide slot 504 at a first location with respect to the bone.

In some embodiments, the modular guide body 502 defines a second set of guide holes 508a, 508b sized and configured to receive a guide pin, such as a k-wire, therethrough. The second set of guide holes 508a, 508b have a predetermined offset with respect to the first set of guide holes 506a, 506b. Inserting the guide pins into the second set of guide holes 508a, 508b positions the guide slot at a second location with respect to the bone. For example, in some embodiments, the second set of guide holes 508a, 508b have a superior/inferior offset and a lateral/medial offset with respect to the first set of guide holes 506a, 506b. In some embodiments, the first set of guide holes 506a, 506b and the second set of guide holes 508a, 508b are configured to provide a variable position of the modular guide 500 with respect to the bone. For example, if a surgeon determines that a superior/inferior and/or lateral/medial offset is required due to patient anatomy, positioning of prior surgical procedures, etc., a surgeon may use the same guide by selecting either the first set of guide holes 506a, 506b or second set of guide holes 508a, 508b.

In some embodiments, the modular guide 500 may include one or more sets of guide holes 506a, 506b corresponding to a first implant and/or surgical procedure and an additional (e.g., third) set of guide holes 510a, 510b corresponding to a second implant and/or surgical procedure. For example, in the illustrated embodiment, the first set of guide holes 506a, 506b may correspond to a position of the guide slot 504 for a first resection cut for a first implant, such as an initial joint replacement implant. An addition, or third, set of guide holes 510a, 510b may correspond to a position of the guide slot 504 for a second resection cut for a second implant, such as a revision joint replacement implant. A user, such as a surgeon, may select the guide holes for the appropriate implant during surgery.

In some embodiments, the second set of guide holes 508a, 508b are configured as offset guide holes for either the first set of guide holes 506a, 506b and/or the third set of guide holes 510a, 510b. For example, the second set of guide holes 508a, 508b may be positioned such that the second set of guide holes 508a, 508b represents the same medial/lateral offset from the first set of guide holes 506a, 506b and the third set of guide holes 510a, 510b. Similarly, the second set of guide holes 508a, 508b may be positioned such that a superior offset with respect to a first set of guide holes 506a, 506b is equal to an inferior offset with respect to a third set of guide holes 510a, 510b. In such configurations, the second set of guide holes 508a, 508b may be configured to apply the same offset regardless of which surgical implant is selected.

In some embodiments, the modular guide body 504 defines one or more oblique, or angled, channels 520a-520d. Each of the oblique channels 520a-520d are sized and configured to receive a pin therein. A pin inserted into an oblique channel 520a-520d extends through the modular guide body 502 at an angle with respect to pins extending through the sets of guide holes 506a-510b and/or a direction of travel of a tool inserted through the guide slot 504. When a pin is inserted through an oblique holes 520a-520d, the pin applies a force to the modular guide body 502 to maintain a fixed position with respect to one or more anatomical structures, such as, for example, a bone having one or more guide pins inserted therein.

Figure 63:
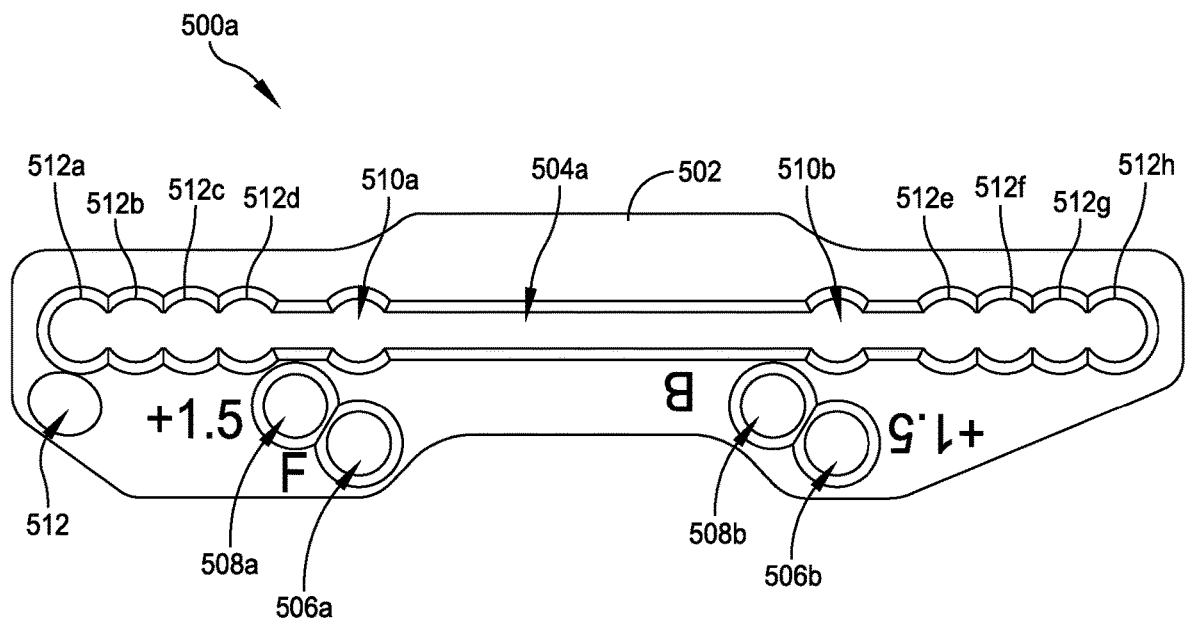
FIG. 63 illustrates a front view of a modular guide configured to be used in a plurality of orientations, in accordance with some embodiments.

In some embodiments, the first set of guide holes 506a, 506b are configured to be used with the modular guide 500 in a first orientation and the second set of guide holes 508a, 508b are configured to be used with the modular guide 500 in a second orientation. For example, FIG. 63 illustrates a modular guide 500a configured to be used in one of two orientations. The first set of guide holes 506a, 506b is configured to be used with the modular guide 500a in a first configuration, for example, having a guide slot 504a positioned superiorly to the first set of guide holes 506a, 506b, as shown in FIG. 64A. In the first configuration, the modular guide 500a is configured to guide a resection cut for installation of a first implant type, such as, for example, an initial replacement implant. As discussed above, in some embodiments, a second set of guide holes 508a, 508b may be configured to provide an offset position for the modular guide 500a in the first configuration.

Figure 66B:
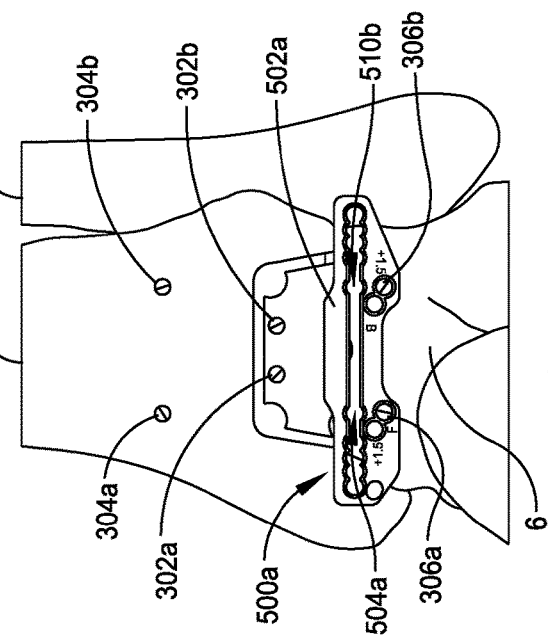
FIGS. 66A-66B illustrates the modular guide of FIG. 63 coupled to at least one guide pin coupled to at least one anatomical structure of the surgical site of FIG. 65 in a first orientation, in accordance with some embodiments.

In some embodiments, a third set of guide holes 510a, 510b is configured to be used with the modular guide 500b in a second configuration, for example, having a guide slot 504a positioned inferiorly to the first set of guide holes 506a, 506b, as shown in FIG. 66B. In the second configuration, the modular guide 500a is configured to guide a resection cut for installation of a second implant type, such as, for example, a revision replacement implant. The second set of guide holes 508a, 508b may be configured to provide an offset position for the modular guide 500a in the second configuration, for example, exclusively in the second configuration and/or in addition to providing an offset position in the first configuration.

In some embodiments, the modular guide body 502a includes a plurality of additional holes 512a-512h formed concentric with the guide slot 504a. The plurality of additional holes 512a-512h may be configured to provide one or more horizontal (e.g., lateral/medial) offset positions for the modular guide 500a in a predetermined configuration, such as the second configuration. For example, in the illustrated embodiment, the spacing between the third set of guide holes 510a, 510b and the spacing between sets of the additional holes 512a-512h (e.g., spacing between additional holes 512a, 512e; additional holes 512b, 512f, etc.) may be equal. A user may use the same set of guide pins inserted into a bone to select multiple horizontal (e.g., medial/lateral) positions for the modular guide 500a while maintaining the same vertical (e.g., superior/inferior) position.

In some embodiments, the modular guide body 502a includes at least one oblique channel 520 extending from a proximal face to a distal face. As shown in FIG. 64B, the oblique channel 520 may be exposed at an inferior/superior surface of the modular guide body 502a. An oblique pin inserted into the oblique channel 520 extends at an angle with respect to pins inserted through the guide holes 502-512h and is configured to apply a force to the modular guide body 502a to maintain the modular guide body 502a in a fixed position with respect to one or more anatomical structures, such as, for example, a talus.

Figure 65:
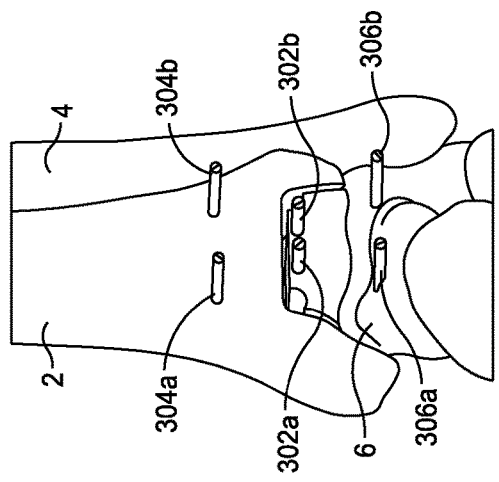
FIG. 65 illustrates a surgical site having a plurality of guide pins previously coupled to one or more anatomical structures, in accordance with some embodiments.

FIGS. 65-70 illustrate a method of positioning a modular guide, such as the modular guide 500a discussed above, in accordance with some embodiments. As shown in FIG. 65, guide pins 302a-306b have been previously inserted into a first bone 2 and a second bone 6 at a surgical location. As discussed above, the guide pins 302a-306a may be positioned using a medical device 15 which is subsequently slideably removed from the surgical site without removing the guide pins 302a-306a. In some embodiments, the method shown in FIGS. 65-70 may occur subsequent to the method shown in FIGS. 34A-51. For example, as shown in FIG. 65, a resection cut has been made in the first bone 2, but the resected surface has not yet been removed from the joint space.

Figure 66A:
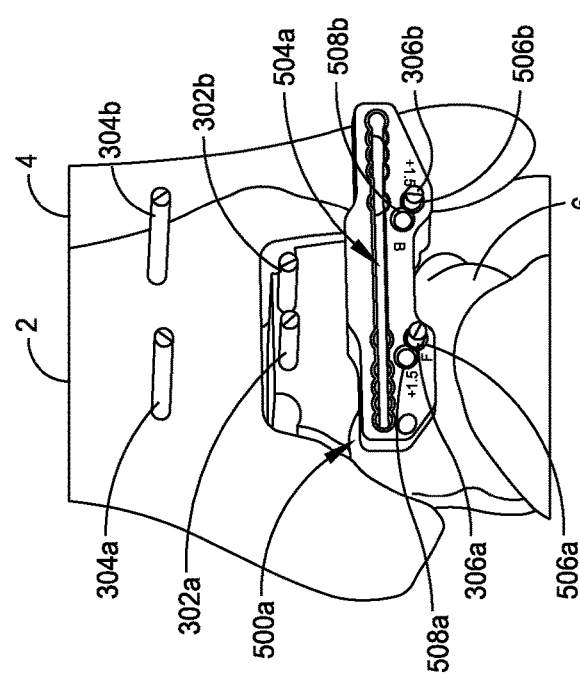

As shown in FIGS. 66A-66B, in some embodiments, a modular guide 500a is slideably inserted over a set of guide pins 306a, 306b inserted into a second bone 4. The set of guide pins 306a, 306b include a predetermined spacing, as determined by the spacing in the medical device 15 used for insertion of the guide pins. The modular guide 500a is coupled to the guide pins 306a, 306b by slideably inserting the guide pins through a first set of guide holes 506a, 506b defined in the guide body 502a.

Figure 68:
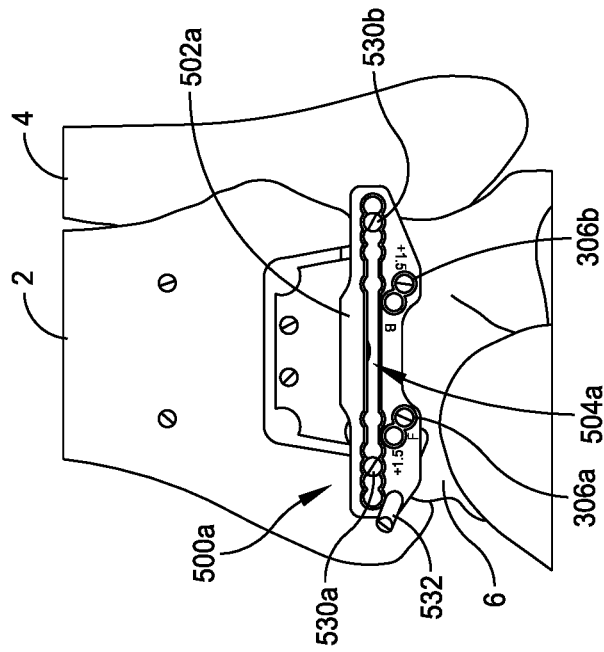
FIG. 68 illustrates an anterior view of the surgical site of FIG. 67, in accordance with some embodiments.
Figure 67:
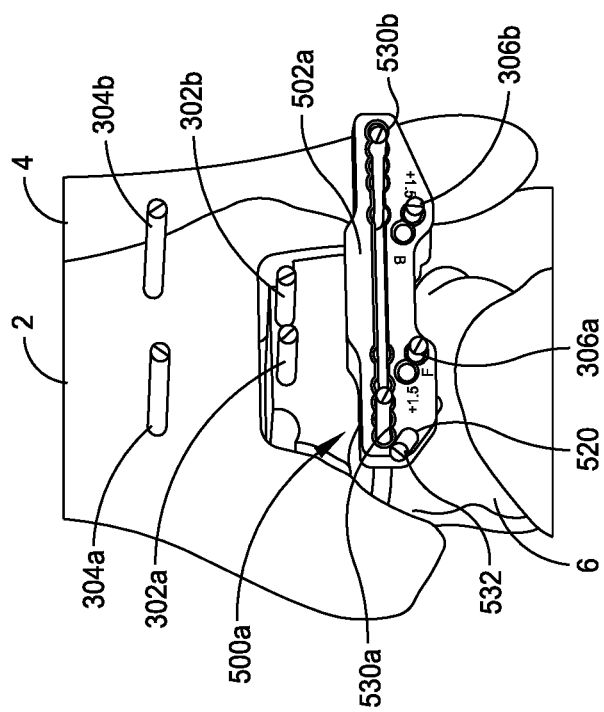
FIG. 67 illustrates insertion of one or more additional pins through guide holes formed in the modular guide and into one or more anatomical structures at a surgical site, in accordance with some embodiments.
Figure 72:
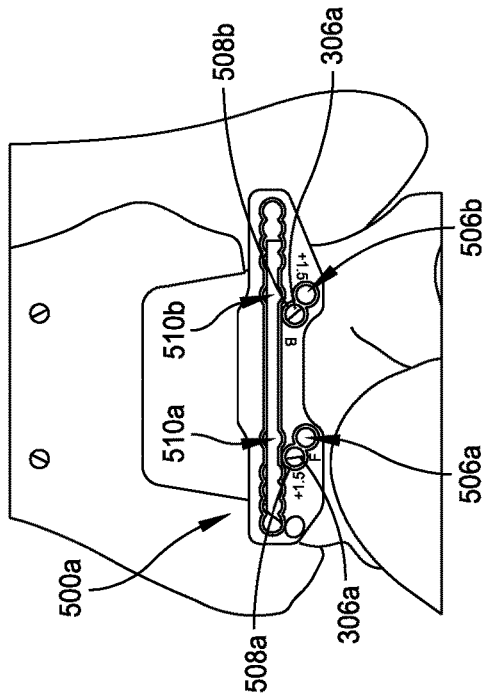
FIGS. 72-75 illustrate steps similar to the steps illustrated in FIGS. 66A-71 at a surgical site including a resected section of a first bone, in accordance with some embodiments.
Figure 73:
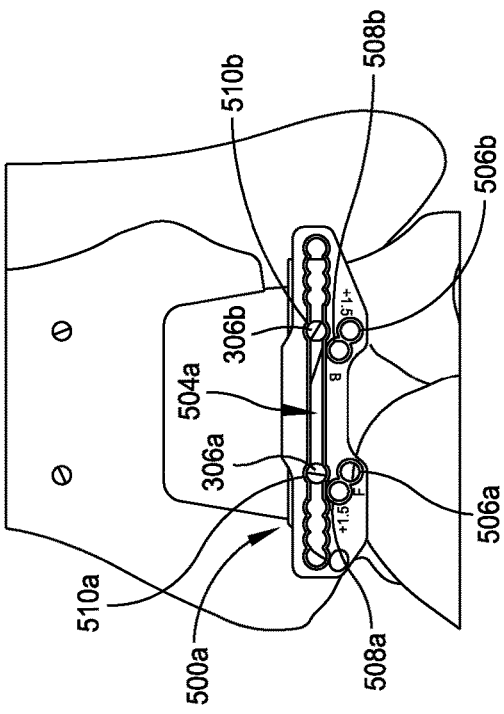
Figure 74:
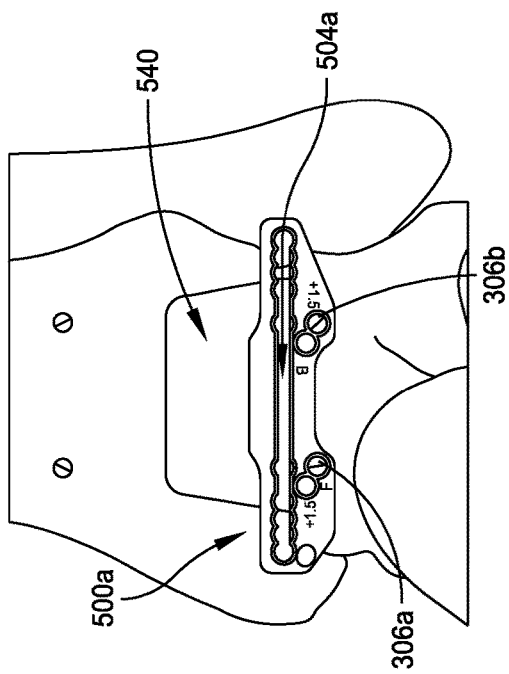
Figure 75:
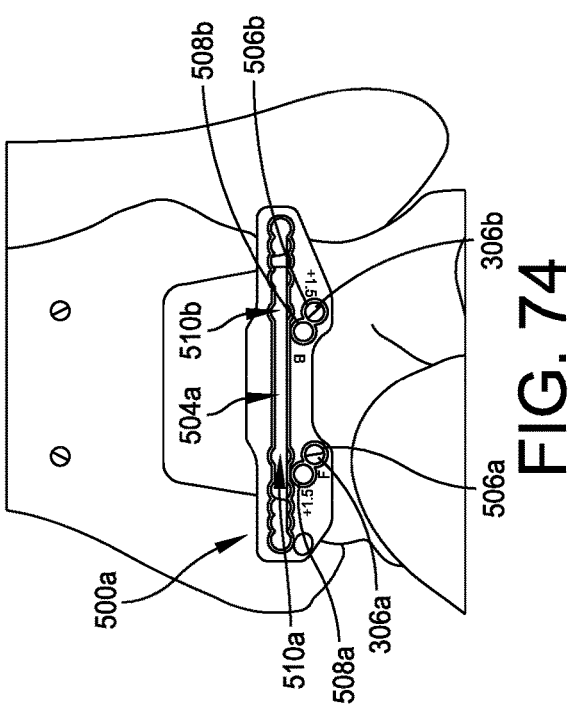
Figure 76:
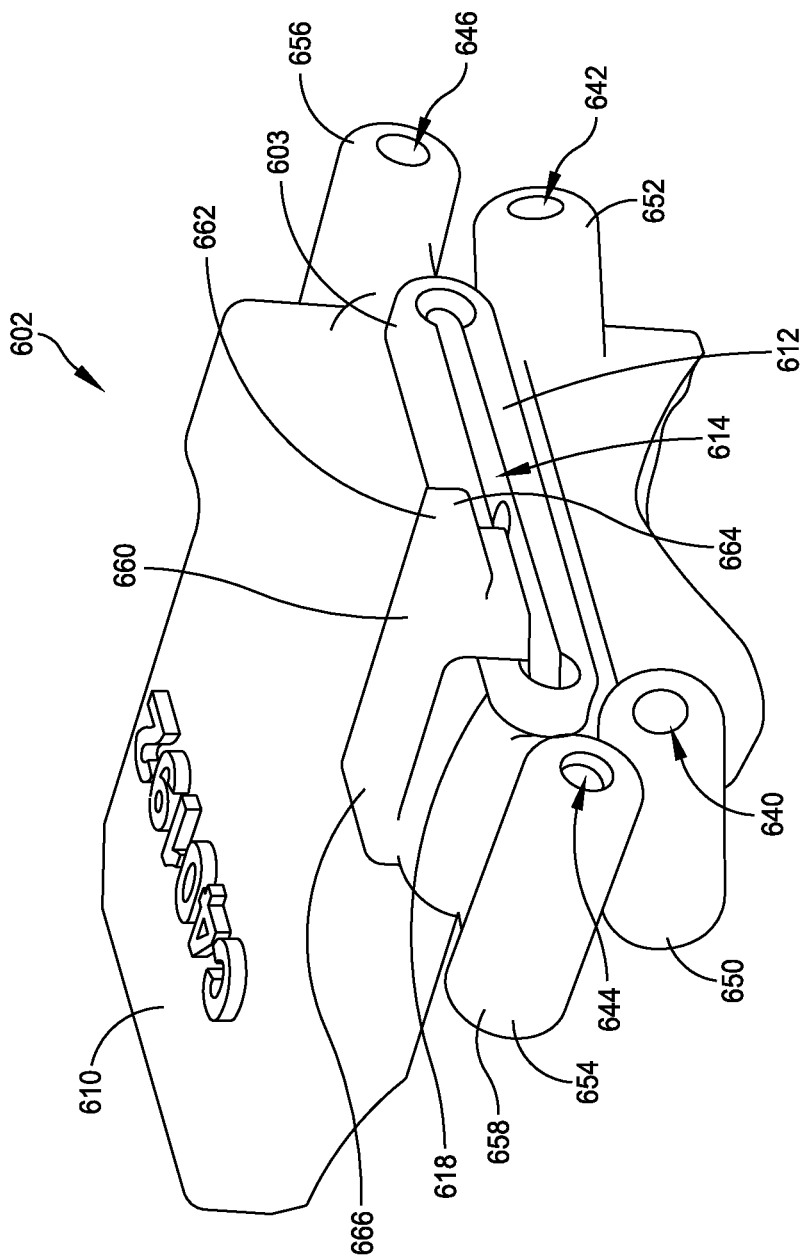
FIG. 76 illustrates a side perspective view of a medical device including a guide locator configured to be coupled to one or more anatomical structures and a guide element configured to guide insertion of at least one tool to a surgical site, in accordance with some embodiments.
Figure 77:
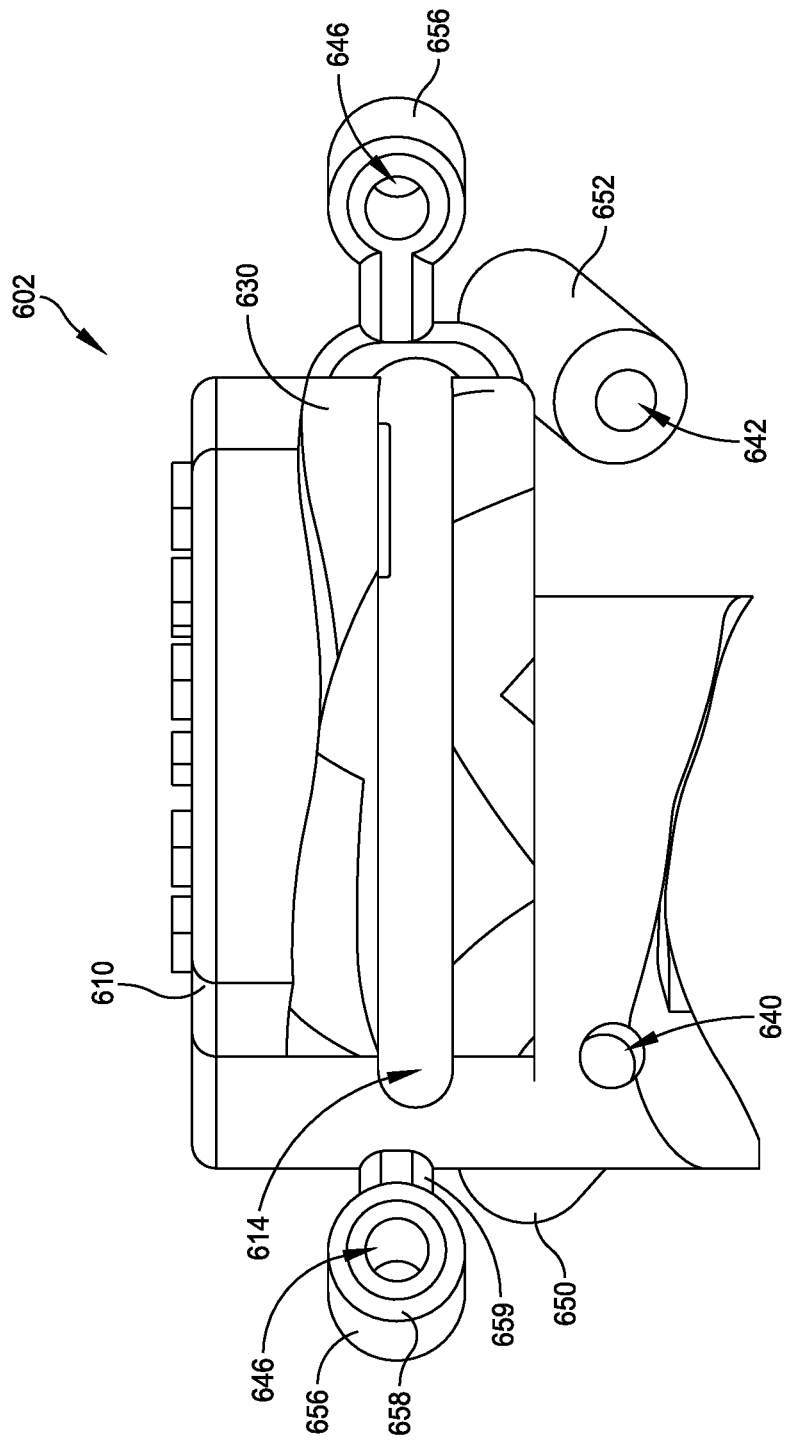
FIG. 77 illustrates a rear view of the medical device of FIG. 76, in accordance with some embodiments.

As shown in FIG. 67, in some embodiments, additional pins 530a, 530b may be inserted into one or more guide holes 512a-512g formed concentrically with the guide slot 504a. The additional pins 530a, 530b may be inserted prior to and/or after slideably coupling the modular guide 500a to the guide pins 306a, 306b. Also shown in FIG. 67, in some embodiments, an oblique pin 532 is inserted through the oblique channel 520 and into the second bone 6. As can be seen in FIGS. 67 and 68, a portion of the oblique pin 532 is exposed through an inferior surface of the modular guide body 502a, although it will be appreciated that the oblique channel 520 may be a closed channel and/or may be exposed through a superior surface of the modular guide body 502a.

FIGS. 66A-68 illustrate the modular guide 500a in a first orientation configured to form a resection cut through the guide slot 504a for a first implant type, such as, for example, an initial joint replacement implant. In some embodiments, the modular guide 500a may be positioned in a second orientation configured to form a resection cut through the guide slot 504a for a second implant type, such as, for example, a revision joint replacement implant.

As shown in FIG. 69, the orientation of the modular guide 500a may be reversed (e.g., flipped) and the guide pins 306a, 306b inserted through a set of guide holes 510a, 510b formed concentrically with the guide slot 504a. When configured in the second orientation and having the guide pins 306a, 306b inserted through the guide holes 510a, 510b, the modular guide 500a is configured to guide a cut for a second implant type.

In some embodiments, the location of a surgical procedure, such as a resection cut, must be adjusted during surgery. As shown in FIG. 70, the location of a resection cut formed using the guide slot 504a may be offset by a predetermined amount in both a lateral/medial direction and a superior/inferior direction by removing the modular guide 500a from the guide pins 306a, 306b and inserting the guide pins 306a, 306b into a different set of guide holes 508a, 508b defined by the modular guide body 502a. As discussed above, the second set of guide holes 508a, 508b may be configured to provide an offset position to the modular guide 500a in a first orientation and/or a second orientation. As shown in FIG. 71, in some embodiments, additional pins 530a, 530b may be inserted into guide holes 512a-512g formed concentrically with the guide slot 504a. The additional pins 530a, 530b may be inserted prior to and/or after slideably coupling the modular guide 500a to the guide pins 306a, 306b. In some embodiments, guide pins 306a, 306b, 530a, 530b may be removed prior to and/or after repositioning of the modular guide 500a, for example, to allow access to additional portions of a guide slot 504a.

FIGS. 72-75 illustrate a method similar to the method discussed with respect to FIGS. 66A-71, but the resected section of the first bone has been removed to define an implant cavity 540. As shown in FIGS. 72-75, function of the modular guide 500a is not impacted by resection of the first bone, as the position of the guide pins 306a, 306b is determined prior to forming the resection cut in the first bone, as discussed above.

FIGS. 76-91 illustrate a medical device 602, in accordance with some embodiments. The medical device 602 includes a guide locator 610 defining a guide receptacle 618 sized and configured to receive a guide element 612 therein. The medical device 602 is similar to the medical device 15 discussed previously, and similar description is not repeated herein. The medical device 602 is configured to interface with an anatomical structure, such as, for example a talus. Although embodiments are discussed herein including a medical device 602 configured to interface with a talus, it will be appreciated that the medical device 602 can be configured to interface with any suitable anatomical structure.

In some embodiments, the guide locator 610 comprises a unitary block structure with bone engaging features configured for complimentary matching with anatomical surface features of a selected region of the patient's natural bone (e.g., a portion of the tibia). The guide element 612 can itself be a guide, such as a cutting guide, for guiding an instrument during a surgical procedure. For instance, the guide element 612 may include features for guiding a saw, drill, planar tool, non-planar tool, or other tool during an operation, such as, for example, a cutting, drilling, planning, and/or other surgical operation.

The guide locator 610 may be formed from a resilient polymer material of the type that is suitable for use in connection with stereo lithography, selective laser sintering, or the like manufacturing equipment, e.g., a polyamide powder repaid prototype material is suitable for use in connection with selective laser sintering. The guide locator 610 includes a conformal bone engaging surface 630 that is complementary to the contours of a corresponding portion of a bone, such as, for example, an upper portion of a talus. Through the previously discussed imaging operations, the conformal bone engaging surface 630 of guide locator 610 can configured for complementary matching with anatomical surface features of a selected region of the patient's natural bone (e.g., upper surfaces of the patient's talus).

The guide locator 610 can include a unitary block structure that defines a central guide receptacle 618. The guide receptacle 618 may be formed as an elongated slot that is sized and configured to receive a guide element 612 therein. The guide element 612 may include any suitable surgical guide element, such as, for example, a cutting guide, drilling guide, etc. In some embodiments, the guide element 612 includes an outer wall 603 having a shape that is complementary to the inner wall 605 defining a shape of the guide receptacle 618.

In some embodiments, the guide element 612 defines a guide slot 614 sized and configured to receive a surgical instrument therethrough. The guide slot 614 may be configured to receive a cutting instrument to guide a resection cut in a bone, such as, for example, a talus. Although embodiments are discussed herein including a guide slot 614, it will be appreciated that the guide element 612 may include any suitable openings for performing one or more surgical procedures. As discussed above with respect to the medical device 15, in some embodiments, the guide element 12 is configured to couple to the guide locator 10 using a friction or press-fit.

In some embodiments, the guide locator 610 includes a positive coupling element 660 configured to apply a positive retention force to the guide element 612 when the guide element 612 is properly positioned within the guide receptacle 618. In the illustrated embodiment, the positive coupling element 660 includes a retention, or spring, clip 662 formed integrally with the guide locator 610. The retention clip 662 includes a clip portion 664 that extends at least partially over the guide receptacle 618. The clip portion 664 is coupled to a coupling portion 666 that biases the clip portion 664 into a first position and allows the clip portion 664 to be flexed or pushed out of plane with the guide receptacle 618 (e.g., transitioned to a second position) for insertion of the guide element 612. Once the guide element 612 is seated in the guide receptacle 618 and a displacement force is removed from the retention clip 662, the clip portion 664 returns to an initial position and overlaps a portion of the guide element 612. The retention clip 662 may apply a retention force to the guide element 612 when in the first position.

In some embodiments, the guide locator 610 can include features for enabling secure mounting of the guide locator 610 to an anatomical structure, such as, for example, defining through bores 640, 642. In some embodiments, the through-bores 640, 642 are arranged adjacent to the guide receptacle 618 and are configured to receive guide pins and/or temporary fixation elements therethrough, as discussed in greater detail below. Although embodiments are illustrated with two through-bores 640, 642, it will be appreciated that the guide locator 610 may define any suitable number of through-bores 640, 642 sized and configured to receive fixation elements, such as a k-wire, therethrough.

In some embodiments, the guide locator 610 includes through-bores 644, 646 configured to position a pin or other targeting element, such as a k-wire, adjacent to the guide receptacle 618 and substantially in-plane with the guide slot 614. The through-bores 644, 646 provide a path for guide element, referred to herein as a gutter pin, that are inserted into the space adjacent to a bone. For example, in an ankle, the spaces adjacent to the talus, the fibula, and the medial malleolus of the tibia may be referred to as ankle gutters. Gutter pins may be placed in the gutters in-plane with a predetermined resection to prevent the excursion of the saw into surrounding anatomical structures that are not intended to be resected and/or to provide guidance for a surgical operation. In manufacturing the guide locator 610 to be a patient-specific tool, the through-bores 644, 646 can be configured with an alignment that matches a path to a location of the gutters of the patient's anatomy, thereby providing assurance that the stationary through-bores 644, 646 will be positioned to direct the guide (e.g., gutter) pins correctly.

In some embodiments, the through-bores 640-646 may be defined by one or more guide structures 650-656 coupled to and/or formed integrally with the guide body 610. In the illustrated embodiment, the guide structures 650-656 include a cylindrical body 658 coupled to the guide body by a coupling extension 659. Although cylindrical bodies 658 are illustrated, it will be appreciated that the guide bodies 658 can include any suitable shape, such as, for example, any suitable geometric or non-geometric shape.

Figure 81:
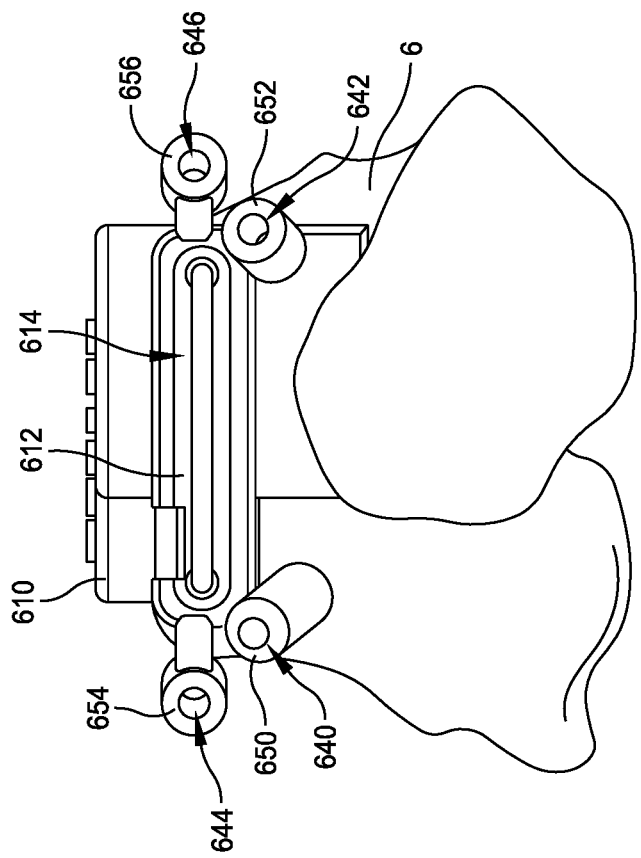
FIG. 81 illustrates an anterior view of the surgical site of FIG. 80, in accordance with some embodiments.
Figure 80:
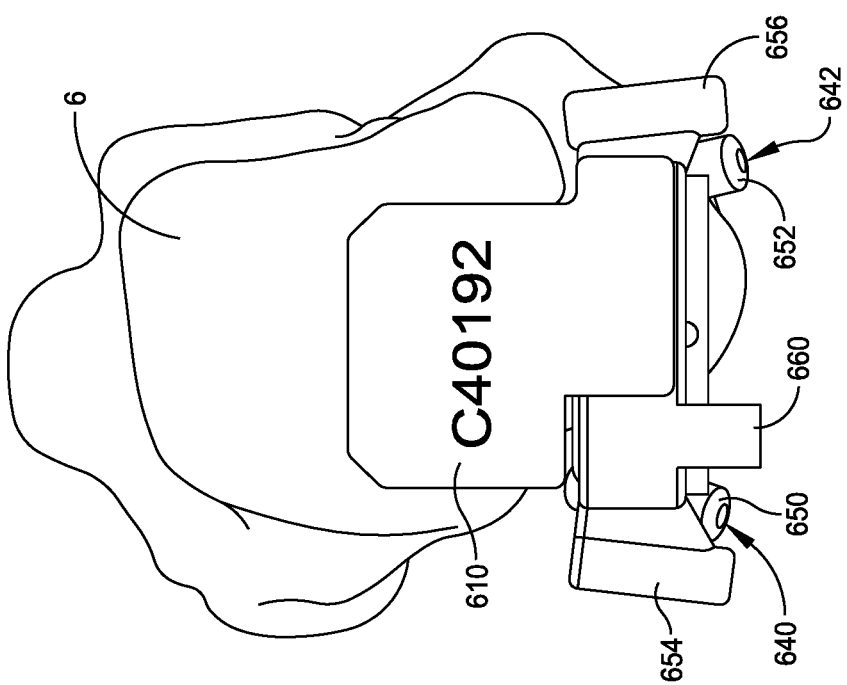
FIG. 80 illustrates a superior view of a surgical site including the medical device of FIG. 76 positioned adjacent to and in contact with a first anatomical structure, in accordance with some embodiments.

FIGS. 79-92 illustrate various steps of positioning a medical device 600 adjacent to a surgical site and coupling a guide locator 610 to the surgical site. As shown in FIG. 79, a guide element 612 may be inserted into a tapered guide receptacle 618 defined by a guide locator 610. As discussed above, the guide element 612 may be retained by a friction/press-fit and/or by a retention mechanism 660. As shown in FIGS. 80-81, the guide locator 610 is positioned adjacent to and in contact with one or more anatomical structures at a surgical site, such as a bone 6. Although embodiments are illustrated with insertion of the guide element 612 prior to positioning the guide locator 610 at a surgical site, it will be appreciated that the guide element 612 may be inserted into the guide receptacle prior to and/or after the guide locator 610 has been positioned at a surgical site and/or anchored to one or more anatomical structures.

As discussed above, the guide locator 610 includes at least one patient-specific surface 630 configured to match a patient-specific contour of one or more anatomical structures, such as a talus 6. As discussed above with respect to the guide locator 10, the guide locator 610 is configured to interface with the anatomical structure(s) in a single, predetermined position. In some embodiments, the guide locator 610 is configured to lock or fit with one or more anatomical structures to provide a single, fixed interface for the guide locator 610.

Figure 82:
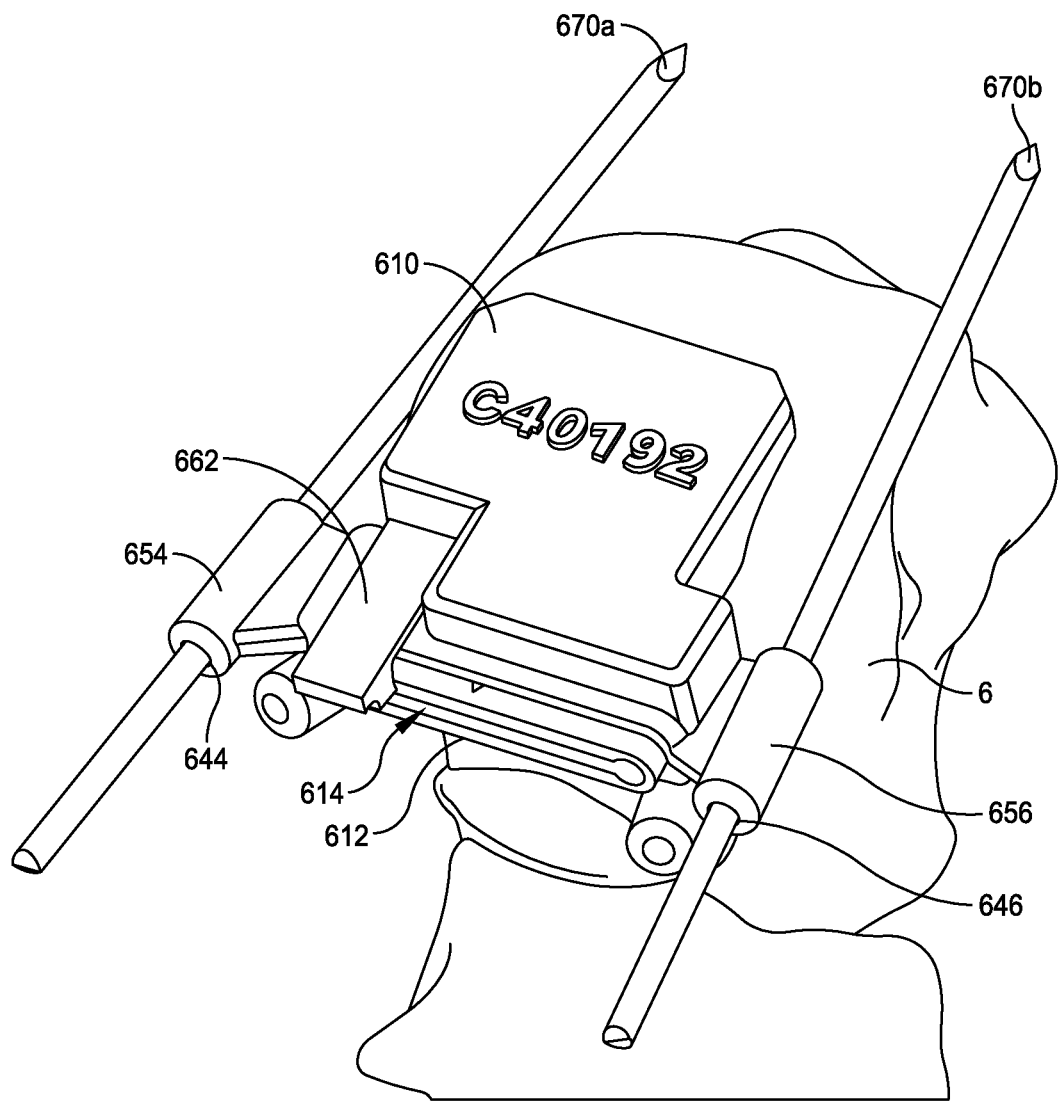
FIG. 82 illustrates an anterior perspective view of the surgical site of FIG. 80 including a plurality of gutter pins inserted through gutter pin guides of the guide locator, in accordance with some embodiments.
Figure 84:
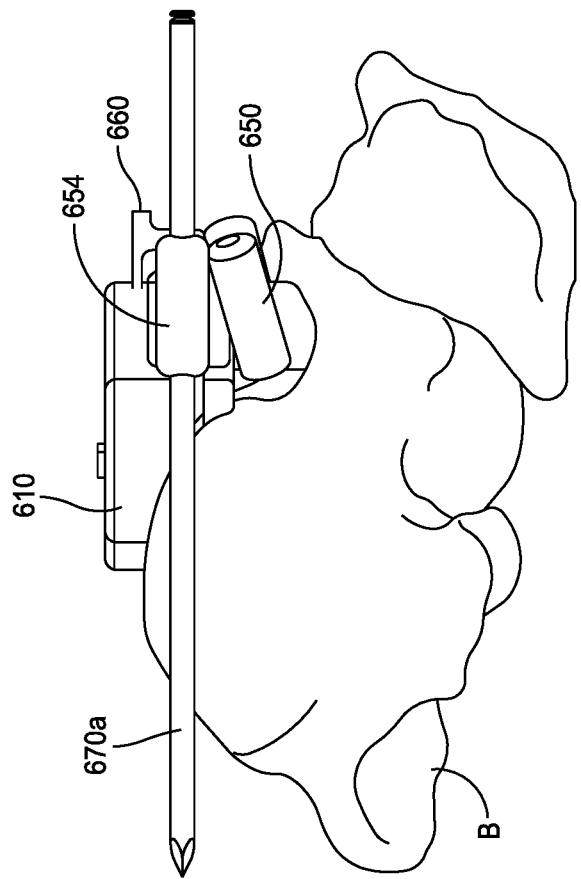
FIG. 84 illustrates a lateral view of the surgical site of FIG. 82, in accordance with some embodiments
Figure 83:
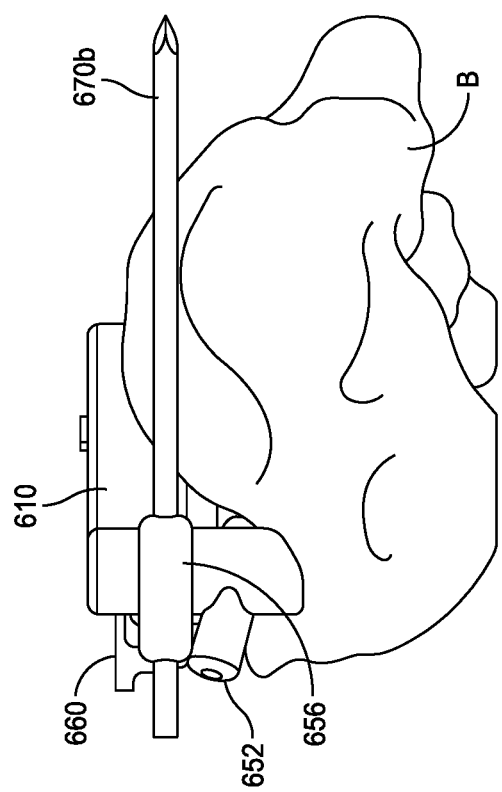
FIG. 83 illustrates a medial view of the surgical site of FIG. 82, in accordance with some embodiments.

As shown in FIGS. 82-84, in some embodiments, gutter pins 670a, 670b may be inserted through through-bores 644, 646 defined by guide structures 654, 656. As discussed above, the gutter pins 670a, 670b are inserted into gutter spaces defined between anatomical structures to provide a stop and/or guide for insertion of a surgical instrument, such as a cutting instrument. In some embodiments, the gutter pins 670a, 670b additionally provide alignment of the guide locator 610 with respect the gutter spaces and/or other anatomical structures.

As shown in FIGS. 85-91, in some embodiments, fixation pins 672a, 672b may be inserted through through-bores 640, 642 defined by guide structures 650, 652. As discussed above, the fixation pins 672a, 672b are inserted into an anatomical structure, such as a talus, to fix the position of the guide locator 610 with respect to the anatomical structure. As best shown in FIG. 88, in some embodiments, the fixation pins 672a, 672b may be inserted at an angle to increase fixation of the guide locator 610 with respect to the anatomical structure, e.g., may be obliquely inserted.

The disclosed embodiments provide a modular system for enabling secure connection and accurate placement of one or more cutting guides in relation to a resection guide locator while providing a variety of connection options for easily placing tools and/or cutting guides for use during the operation. The modular configuration of the system thereby enables cutting guides (shown or not shown) to be simply and securely positioned for use in a step of a surgical procedure, with multiple different connection options being provided (e.g., aligned holes, projections, etc.) In combination with patient-specific configuration of the components, a more robust surgical system can be produced with multiple cutting guide options, all easily implemented as desired.

Disclosed embodiments may be used in a variety of applications and methods, including surgical methods for operating on a patient, and, in particular, a joint (e.g., an ankle joint). The disclosed components may include features for positioning guide openings for receiving tools (e.g., saws, drills, drivers, etc.) for performing steps of a procedure. In one embodiment, a method includes positioning a resection guide locator with respect to a joint. For example, the resection guide locator may be positioned with respect to a first bone (e.g., tibia) of an ankle joint. A first component, such as resection guide may be attached to the resection guide locator, such as by inserting the resection guide into the receptacle of the resection guide locator. A first operative step may be performed using the resection guide, such as a resection cut of the tibia. With the resection guide locator and the first component in place, a second component, such as a second resection guide, may be attached. For example, a second resection guide may be attached to the receptacle of the first resection guide, and a second operative step performed. For example, a talar resection guide may be attached to a first resection guide and a talar resection step performed. In another embodiment, the second component may be a corner protector peg attached to the first resection guide. In some embodiments, components may be assembled on the patient, or may be pre-assembled prior to positioning with respect to the patient. The disclosed embodiments are thus applicable as a modular system providing a user with multiple options for performing a procedure.

Although the invention has been described in terms of exemplary embodiments, it is not limited thereto. Rather, the appended claims should be construed broadly, to include other variants and embodiments of the invention, which can be made by those skilled in the art without departing from the scope and range of equivalents of the invention.

What is claimed is:

1. A medical device comprising:
   a guide locator, comprising:
      a mount body having a conformal surface that is shaped to be complementary to a natural anatomical surface of a patient bone and defining a mount receptacle, wherein the mount body defines a guide receptacle; and
   a guide element, comprising;
      a guide body having a shape configured to fit within and attach to the guide receptacle of the guide locator wherein at least one of the mount body and the guide body includes one or more tapered surfaces to provide a friction fit;
      a guide slot formed in the guide body, the guide slot comprising at least one opening for receiving a tool therethrough; and
   a retention mechanism providing a friction fit between the guide element and the guide locator so as to be configured to hold the guide element within the guide receptacle of the guide locator wherein the guide body fits into only a portion of a depth of the mount body such that a clearance is present between a distal surface of the mount body and the guide body.

2. The medical device of claim 1, wherein the retention mechanism comprises a spring clip.

3. The medical device of claim 1, wherein the at least one opening of the guide receptacle comprises a plurality of slots.

4. The medical device of claim 1, wherein the at least one opening of the guide element is configured to position a tool with respect to a first bone of a joint, wherein the medical device further comprises a modular guide element configured to be coupled to the guide element, and wherein the modular guide element is configured to position a tool for with respect to a second bone of the joint.

5. The medical device of claim 4, wherein the modular resection guide element is configured to positioned in one of a plurality of positions, and wherein each position corresponds to an offset position for the tool with respect to the second bone.

6. The medical device of claim 1, wherein the mount body further defines a second guide receptacle configured to receive a second guide element.

7. The medical device of claim 1, wherein the guide element further comprises a fluoroscopic alignment reference.

8. The medical device of claim 7, wherein the alignment reference comprises a main post, a rear portion on a first side of the post and a front portion on a second, opposite side of the post, wherein the rear portion and the front portion form a recognizable pattern when viewed from a straight-on direction.

9. The medical device of claim 7, wherein the fluoroscopic alignment reference is integrally formed with the resection guide.

10. The medical device of claim 9, wherein the alignment reference comprises a cavity at a first side of a block and a projection at a second side of a block, and wherein the cavity and the projection are aligned in a straight-on view.

11. The medical device of claim 10, wherein the cavity and the projection are circular.

12. The medical device of claim 7, wherein the fluoroscopic alignment reference comprises a slender elongate feature representing an axis of the resection guide.

13. The medical device of claim 7, wherein the fluoroscopic alignment reference comprises reference cues corresponding to a theoretical joint line of the joint.

14. The medical device of claim 1, wherein one of the guide locator or the guide element further comprise an extension defining a pair of pin guide channels.

15. The medical device of claim 14, wherein the guide element is configured to provide access to a first bone of a joint and the pair of pin guide channels define an attachment location for a second bone of the joint.

16. The medical device of claim 15, further comprising a second guide element, wherein the second guide element is configured to be positioned in one of two orientations.

17. The medical device of claim 1, wherein the guide element comprises a plurality of pin holes for attaching the guide element to a bone.

18. A medical device comprising:
   a guide locator, comprising:
      a mount body having a conformal surface that is shaped to be complementary to a natural anatomical surface of a patient bone and defining a mount receptacle, wherein the mount body defines a guide receptacle; and
   a guide element, comprising;
      a guide body having a shape configured to fit within so as to attach to the guide receptacle of the guide locator;
      a guide slot formed in the guide body, the guide slot comprising at least one opening and including a plurality of interconnected slotted channels for receiving a tool therethrough; and
   at least one corner protector configured to be inserted through the guide slot of the guide element wherein the guide slot comprises at least one enlarged opening for receiving the corner protector and including a first hole formed at an intersection of two of the interconnected slotted channels.

19. The medical device of claim 18, wherein the at least one corner protector comprises a groove configured to define a stop for travel of the tool within the guide slot.

20. The medical device of claim 18, wherein the at least one corner protector comprises a locking shoulder configured to interface with a portion of the guide locator.

21. The medical device of claim 18, wherein the at least one corner protector peg comprises a retention feature for inhibiting removal of the corner protector peg.

22. The medical device of claim 21, wherein the retention feature comprises a projection configured to inserted through the guide slot of the guide element, and wherein the corner protector is rotatable after the projection is inserted through the guide slot to inhibit removal.

23. The medical device of claim 18, wherein the corner protector are cannulated.

24. The medical device of claim 23, further comprising a second guide element comprising an attachment feature configured to be coupled to the cannulated corner protectors.

25. A medical device comprising:
   a guide locator, comprising:
      a mount body having a conformal surface that is shaped to be complementary to a natural anatomical surface of a patient bone and defining a mount receptacle, wherein the mount body defines a guide receptacle for receiving a guide element therein;

a plurality of guide bodies coupled to the mount body wherein at least one of the mount body and the plurality of guide bodies includes one or more tapered surfaces to provide a friction fit, wherein each of the guide bodies defines a channel sized and configured to receive a guide element therethrough, wherein the channel defined by each of the guide bodies is configured to guide a pin into a respective gutter defined on opposing sides of a predefined anatomical structure wherein each one of the plurality of guide bodies fits into only a portion of a depth of the mount body such that a clearance is present between a distal surface of the mount body and the one of the plurality of guide bodies.

26. The medical device of claim 25, further comprising a guide element configured to be inserted into the guide receptacle, the guide element comprising at least one opening for receiving a tool.

27. The medical device of claim 26, wherein one or more surfaces of the mount receptacle and/or the resection guide are tapered to accommodate a press fit.

28. The medical device of claim 25, wherein the mount body further comprises a retention mechanism configured to attach the guide element to the guide locator.

29. The medical device of claim 28, wherein the retention mechanism comprises a spring clip configured to retain the guide element in the guide receptacle.

30. A method for a surgical procedure on a joint comprising at least a first bone and a second bone, the method comprising:

positioning a guide locator with respect to the joint, wherein the guide locator comprises a body defining a patient-specific surface having a surface contour complimentary to a portion of the joint, and wherein the body defines a guide receptacle;

positioning a first guide element within the guide receptacle, wherein the first guide element comprises a body defining a guide slot sized and configured to receive a tool therethrough, wherein the body comprises an outer perimeter complimentary to an inner perimeter of the guide receptacle such that the first guide element is coupled to the guide locator by inserting at least a portion of the guide element into the guide receptacle;

inserting a first tool through a portion of the guide slot to define at least one pilot hole in at least the first bone of the joint;

inserting at least one corner protector through the guide slot and the at least one pilot hole; and inserting a second tool through the guide slot to resect the first bone, wherein the travel path of the second tool is defined by the guide slot and the at least one corner protector; and coupling a second guide element to the first guide element, wherein the second guide element is configured to guide insertion of a tool with respect to the second bone of the joint.

31. The method of claim 30, comprising:

inserting one or more temporary fixation elements through one or more guide holes formed in the first guide element; and coupling a second guide element to the one or more temporary fixation elements, wherein the second guide element is configured to guide insertion of a tool with respect to the second bone of the joint.

32. The method of claim 31, wherein, prior to coupling the second guide element to the one or more temporary fixation elements, the guide locator is removed from the joint.

33. The method of claim 31, wherein the second guide element is configured to be positioned in a plurality of locations, wherein each of the plurality of locations defines an offset with respect to the second bone of the joint.

34. The method of claim 31, wherein the second guide element is configured to be positioned in one of two orientations, wherein each of the orientations corresponds to a different location for insertion of the tool with respect to the second bone.

* * * * *